US012590885B2

(12) United States Patent
Cheng et al.

(10) Patent No.: US 12,590,885 B2
(45) Date of Patent: Mar. 31, 2026

(54) STIMULATED RAMAN PHOTOTHERMAL MICROSCOPE WITH OPTICAL PARAMETRIC AMPLIFIER SOURCE

(71) Applicant: Trustees of Boston University, Boston, MA (US)

(72) Inventors: Ji-Xin Cheng, Newton, MA (US); Yifan Zhu, Allston, MA (US)

(73) Assignee: Trustees of Boston University, Boston, MA (US)

( * ) Notice: Subject to any disclaimer, the term of this patent is extended or adjusted under 35 U.S.C. 154(b) by 0 days.

(21) Appl. No.: 19/044,140

(22) Filed: Feb. 3, 2025

(65) Prior Publication Data
US 2025/0244231 A1 Jul. 31, 2025

Related U.S. Application Data

(63) Continuation of application No. 19/037,115, filed on Jan. 25, 2025.
(Continued)

(51) Int. Cl.
*G01J 3/44* (2006.01)
*G01N 21/17* (2006.01)
*G01N 21/65* (2006.01)

(52) U.S. Cl.
CPC ........... *G01N 21/171* (2013.01); *G01N 21/65* (2013.01); *G01N 2021/1714* (2013.01);
(Continued)

(58) Field of Classification Search
CPC ......... G01N 21/65; G01N 2201/06113; G01N 2201/105; G01J 3/44; G01J 3/10; A61B 5/0075; G02B 21/00
See application file for complete search history.

(56) References Cited

U.S. PATENT DOCUMENTS

2008/0130703 A1 6/2008 Spariosu
2010/0020318 A1* 1/2010 Lee ........................ G01J 3/0237
356/318
(Continued)

OTHER PUBLICATIONS

Yin, J.; Zhang, M.; Tan, Y.; Guo, Z.; He, H.; Lan, L.; Cheng, J. X., Video-rate mid-infrared photothermal imaging by single-pulse photothermal detection per pixel. Sci Adv 2023, 9 (24), eadg8814.
(Continued)

*Primary Examiner* — Abdullahi Nur
(74) *Attorney, Agent, or Firm* — Cesari and McKenna, LLP; Steven M. Mills

(57) ABSTRACT

A stimulated Raman photothermal (SRP) microscope for imaging a sample. A first optical source without an optical resonator emits a pump beam. A second optical source emits an intensity-modulated Stokes beam. The Stokes beam is combined with the pump beam to form a combined beam. The combined beam is directed to the sample to induce a thermal effect caused by the stimulated Raman process. A third optical source emits a probe beam, the probe beam is directed to the sample. An optical detector detects modulation of the probe beam after modulation by the sample to measure an SRP signal. Because noise in the pump and Stokes beam do not significantly effect the measurements from the probe beam, these beams can use a high-powered optical parametric amplifier (OPA) source for improved sensitivity and imaging speed compared to SRP microscopes using an optical parametric oscillator (OPO) source.

11 Claims, 39 Drawing Sheets

Related U.S. Application Data

(60) Provisional application No. 63/624,983, filed on Jan. 25, 2024.

(52) U.S. Cl.
CPC ................. *G01N 2021/655* (2013.01); *G01N 2201/06113* (2013.01); *G01N 2201/105* (2013.01)

(56) References Cited

U.S. PATENT DOCUMENTS

| | | | |
|---|---|---|---|
| 2010/0027000 A1* | 2/2010 | Pestov | G01J 3/44 356/301 |
| 2011/0013265 A1 | 1/2011 | Nishimura | |
| 2012/0050720 A1* | 3/2012 | Kim | G01J 3/10 356/51 |
| 2014/0361150 A1* | 12/2014 | Cheng | G01J 3/2803 250/214 A |
| 2015/0056645 A1* | 2/2015 | Vacca | G01N 15/1459 435/29 |
| 2016/0290928 A1* | 10/2016 | Krishnamachari | G02B 21/0076 |
| 2016/0344158 A1* | 11/2016 | Onose | H01S 3/10015 |
| 2024/0255429 A1 | 8/2024 | Cheng | |

OTHER PUBLICATIONS

Gaiduk, A.; Ruijgrok, P. V.; Yorulmaz, M.; Orrit, M., Detection limits in photothermal microscopy. Chemical Science 2010, 1 (3).

Novais, S.; Ferreira, M. S.; Pinto, J. L., Determination of thermo-optic coefficient of ethanol-water mixtures with optical fiber tip sensor. Optical Fiber Technology 2018, 45, 276-279.

Maggioni, M.; Katkovnik, V.; Egiazarian, K.; Foi, A., Nonlocal transform-domain filter for volumetric data denoising and reconstruction. IEEE Trans Image Process 2013, 22 (1), 119-33.

Luther, B. M.; Tracy, K. M.; Gerrity, M.; Brown, S.; Krummel, A. T., 2D IR spectroscopy at 100 KHz utilizing a Mid-IR OPCPA laser source. Opt. Express 2016, 24 (4), 4117-27.

Chatterley, A. S.; Golbek, T. W.; Weidner, T., Measuring Protein Conformation at Aqueous Interfaces with 2D Infrared Spectroscopy of Emulsions. J Phys Chem Lett 2022, 13 (31), 7191-7196.

Min, W., Freudiger, C. W., Lu, S. & Xie, X. S. Coherent nonlinear optical imaging: beyond fluorescence microscopy. Annu. Rev. Phys. Chem. 62, 507-530 (2011).

Ji, M. et al. Detection of human brain tumor infiltration with quantitative stimulated Raman scattering microscopy. Sci. Transl. Med. 7, 309ra163 (2015).

Bowen, E. J. & Sahu, J. The Effect of Temperature on Fluorescence of Solutions. J. Phys. Chem. 63, 4-7 (1959).

Ao, J. et al. Stimulated Raman scattering microscopy enables Gleason scoring of prostate core needle biopsy by a convolutional neural network. Cancer Res. CAN-22-2146 (2023) doi:10.1158/0008-5472.CAN-22-2146.

Yin, J. et al. Nanosecond-resolution photothermal dynamic imaging via MHZ digitization and match filtering. Nat. Commun. 12, 7097 (2021).

Sauerbrei, A. Diagnosis, antiviral therapy, and prophylaxis of varicella-zoster virus infections. Eur. J. Clin. Microbiol. Infect. Dis. Off. Publ. Eur. Soc. Clin. Microbiol. 35, 723-734 (2016).

Xia, Q., Yin, J., Guo, Z. & Cheng, J.-X. Mid-Infrared Photothermal Microscopy: Principle, Instrumentation, and Applications. J. Phys. Chem. B 126, 8597-8613 (2022).

Li, J. et al. Lipid Desaturation Is a Metabolic Marker and Therapeutic Target of Ovarian Cancer Stem Cells. Cell Stem Cell 20, 303-314.e5 (2017).

Lee, D. et al. Visualizing Subcellular Enrichment of Glycogen in Live Cancer Cells by Stimulated Raman Scattering. Anal. Chem. 92, 13182-13191 (2020).

Figueroa, B., Hu, R., Rayner, S. G., Zheng, Y. & Fu, D. Real-Time Microscale Temperature Imaging by Stimulated Raman Scattering. J. Phys. Chem. Lett. 11, 7083-7089 (2020).

Huang, K.-C., Li, J., Zhang, C., Tan, Y. & Cheng, J.-X. Multiplex Stimulated Raman Scattering Imaging Cytometry Reveals Lipid-Rich Protrusions in Cancer Cells under Stress Condition. iScience 23, 100953 (2020).

Zong, C. et al. Wide-Field Surface-Enhanced Coherent Anti-Stokes Raman Scattering Microscopy. ACS Photonics 9, 1042-1049 (2022).

Bai, Y., Yin, J. & Cheng, J.-X. Bond-selective imaging by optically sensing the mid-infrared photothermal effect. Sci. Adv. 7, eabg1559 (2021).

International Search Report and Written Opinion mailed Apr. 16, 2025 for International Application No. PCT/US2025/013076 filed Jan. 25, 2025 for Trustees of Boston University, 10 pages.

Freudiger, C. W.; Min, W.; Saar, B. G.; Lu, S.; Holtom, G. R.; He, C.; Tsai, J. C.; Kang, J. X.; Xie, X. S., Label-free biomedical imaging with high sensitivity by stimulated Raman scattering microscopy. Science 2008, 322 (5909), 1857-61.

Min, W.; Freudiger, C. W.; Lu, S.; Xie, X. S., Coherent nonlinear optical imaging: beyond fluorescence microscopy. Annu. Rev. Phys. Chem. 2011, 62, 507-30.

Cheng, J. X.; Xie, X. S., Vibrational spectroscopic imaging of living systems: An emerging platform for biology and medicine. Science 2015, 350 (6264), aaa8870.

Zhao, Z.; Shen, Y.; Hu, F.; Min, W., Applications of vibrational tags in biological imaging by Raman microscopy. Analyst 2017, 142 (21), 4018-4029.

Ji, M.; Orringer, D. A.; Freudiger, C. W.; Ramkissoon, S.; Liu, X.; Lau, D.; Golby, A. J.; Norton, I.; Hayashi, M.; Agar, N. Y.; Young, G. S.; Spino, C.; Santagata, S.; Camelo-Piragua, S.; Ligon, K. L.; Sagher, O.; Xie, X. S., Rapid, label-free detection of brain tumors with stimulated Raman scattering microscopy. Sci. Transl. Med. 2013, 5 (201), 201ra119.

Orringer, D. A.; Pandian, B.; Niknafs, Y. S.; Hollon, T. C.; Boyle, J.; Lewis, S.; Garrard, M.; Hervey-Jumper, S. L.; Garton, H. J. L.; Maher, C. O.; Heth, J. A.; Sagher, O.; Wilkinson, D. A.; Snuderl, M.; Venneti, S.; Ramkissoon, S. H.; McFadden, K. A.; Fisher-Hubbard, A.; Lieberman, A. P.; Johnson, T. D.; Xie, X. S.; Trautman, J. K.; Freudiger, C. W.; Camelo-Piragua, S., Rapid intraoperative histology of unprocessed surgical specimens via fibre-laser-based stimulated Raman scattering microscopy. Nat Biomed Eng 2017, 1.

Hu, F.; Chen, Z.; Zhang, L.; Shen, Y.; Wei, L.; Min, W., Vibrational Imaging of Glucose Uptake Activity in Live Cells and Tissues by Stimulated Raman Scattering. Angew. Chem. Int. Ed. Engl. 2015, 54 (34), 9821-5.

Shi, L.; Zheng, C.; Shen, Y.; Chen, Z.; Silveira, E. S.; Zhang, L.; Wei, M.; Liu, C.; de Sena-Tomas, C.; Targoff, K.; Min, W., Optical imaging of metabolic dynamics in animals. Nat. Commun. 2018, 9 (1), 2995.

Li, J.; Cheng, J. X., Direct visualization of de novo lipogenesis in single living cells. Sci Rep 2014, 4, 6807.

Tan, Y.; Li, J.; Zhao, G.; Huang, K. C.; Cardenas, H.; Wang, Y.; Matei, D.; Cheng, J. X., Metabolic reprogramming from glycolysis to fatty acid uptake and beta-oxidation in platinum-resistant cancer cells. Nat. Commun. 2022, 13 (1), 4554.

Chen, C.; Zhao, Z.; Qian, N.; Wei, S.; Hu, F.; Min, W., Multiplexed live-cell profiling with Raman probes. Nat. Commun. 2021, 12 (1), 3405.

Lee, H. J.; Chen, Z.; Collard, M.; Chen, F.; Chen, J. G.; Wu, M.; Alani, R. M.; Cheng, J. X., Multimodal Metabolic Imaging Reveals Pigment Reduction and Lipid Accumulation in Metastatic Melanoma. BME Front 2021, 2021, 9860123.

Du, J.; Su, Y.; Qian, C.; Yuan, D.; Miao, K.; Lee, D.; Ng, A. H. C.; Wijker, R. S.; Ribas, A.; Levine, R. D.; Heath, J. R.; Wei, L., Raman-guided subcellular pharmaco-metabolomics for metastatic melanoma cells. Nat. Commun. 2020, 11 (1), 4830.

Yue, S.; Li, J.; Lee, S. Y.; Lee, H. J.; Shao, T.; Song, B.; Cheng, L.; Masterson, T. A.; Liu, X.; Ratliff, T. L.; Cheng, J. X., Cholesteryl ester accumulation induced by PTEN loss and PI3K/AKT activation underlies human prostate cancer aggressiveness. Cell Metab. 2014, 19 (3), 393-406.

Ge, X.; Pereira, F. C.; Mitteregger, M.; Berry, D.; Zhang, M.; Hausmann, B.; Zhang, J.; Schintlmeister, A.; Wagner, M.; Cheng, J.

(56)                 References Cited

OTHER PUBLICATIONS

X., SRS-FISH: A high-throughput platform linking microbiome metabolism to identity at the single-cell level. Proc. Natl. Acad. Sci. U. S. A. 2022, 119 (26), e2203519119.

Zhang, M.; Hong, W.; Abutaleb, N. S.; Li, J.; Dong, P. T.; Zong, C.; Wang, P.; Seleem, M. N.; Cheng, J. X., Rapid Determination of Antimicrobial Susceptibility by Stimulated Raman Scattering Imaging of D(2)O Metabolic Incorporation in a Single Bacterium. Adv Sci (Weinh) 2020, 7 (19), 2001452.

Rock, W.; Bonn, M.; Parekh, S. H., Near shot-noise limited hyperspectral stimulated Raman scattering spectroscopy using low energy lasers and a fast CMOS array. Opt. Express 2013, 21 (13), 15113-20.

Liao, C. S.; Slipchenko, M. N.; Wang, P.; Li, J.; Lee, S. Y.; Oglesbee, R. A.; Cheng, J. X., Microsecond Scale Vibrational Spectroscopic Imaging by Multiplex Stimulated Raman Scattering Microscopy. Light Sci Appl 2015, 4.

Gao, X.; Li, X.; Min, W., Absolute Stimulated Raman Cross Sections of Molecules. J Phys Chem Lett 2023, 14 (24), 5701-5708.

De Andrade, R. B.; Kerdoncuff, H.; Berg-Sørensen, K.; Gehring, T.; Lassen, M.; Andersen, U. L., Quantum-enhanced continuous-wave stimulated Raman scattering spectroscopy. Optica 2020, 7 (5).

Xu, Z.; Oguchi, K.; Taguchi, Y.; Takahashi, S.; Sano, Y.; Mizuguchi, T.; Katoh, K.; Ozeki, Y., Quantum-enhanced stimulated Raman scattering microscopy in a high-power regime. Opt. Lett. 2022, 47 (22), 5829-5832.

Wei, L.; Chen, Z.; Shi, L.; Long, R.; Anzalone, A. V.; Zhang, L.; Hu, F.; Yuste, R.; Cornish, V. W.; Min, W., Super-multiplex vibrational imaging. Nature 2017, 544 (7651), 465-470.

Wei, L.; Min, W., Electronic Preresonance Stimulated Raman Scattering Microscopy. J Phys Chem Lett 2018, 9 (15), 4294-4301.

Zhuge, M.; Huang, K. C.; Lee, H. J.; Jiang, Y.; Tan, Y.; Lin, H.; Dong, P. T.; Zhao, G.; Matei, D.; Yang, Q.; Cheng, J. X., Ultrasensitive Vibrational Imaging of Retinoids by Visible Preresonance Stimulated Raman Scattering Microscopy. Adv Sci (Weinh) 2021, 8 (9), 2003136.

Zong, C.; Premasiri, R.; Lin, H.; Huang, Y.; Zhang, C.; Yang, C.; Ren, B.; Ziegler, L. D.; Cheng, J. X., Plasmon-enhanced stimulated Raman scattering microscopy with single-molecule detection sensitivity. Nat. Commun. 2019, 10 (1), 5318.

Xiong, H.; Shi, L.; Wei, L.; Shen, Y.; Long, R.; Zhao, Z.; Min, W., Stimulated Raman Excited Fluorescence Spectroscopy and Imaging. Nat. Photonics 2019, 13 (6), 412-417.

Michael, Y.; Bello, L.; Rosenbluh, M.; Pe'er, A., Squeezing-enhanced Raman spectroscopy. npj Quantum Information 2019, 5 (1).

Xu, Z.; Oguchi, K.; Taguchi, Y.; Sano, Y.; Miyawaki, Y.; Cheon, D.; Katoh, K.; Ozeki, Y., Stimulated Raman scattering spectroscopy with quantum-enhanced balanced detection. Opt. Express 2022, 30 (11), 18589-18598.

Casacio, C. A.; Madsen, L. S.; Terrasson, A.; Waleed, M.; Barnscheidt, K.; Hage, B.; Taylor, M. A.; Bowen, W. P., Quantum-enhanced nonlinear microscopy. Nature 2021, 594 (7862), 201-206.

Zong, C.; Cheng, J.-X., Origin of dispersive line shapes in plasmon-enhanced stimulated Raman scattering microscopy. Nanophotonics 2020, 10 (1), 617-625.

Zong, C.; Xie, Y.; Zhang, M.; Huang, Y.; Yang, C.; Cheng, J. X., Plasmon-enhanced coherent anti-stokes Raman scattering vs plasmon-enhanced stimulated Raman scattering: Comparison of line shape and enhancement factor. J. Chem. Phys. 2021, 154 (3), 034201.

Xiong, H.; Qian, N.; Miao, Y.; Zhao, Z.; Min, W., Stimulated Raman Excited Fluorescence Spectroscopy of Visible Dyes. J Phys Chem Lett 2019, 10 (13), 3563-3570.

Shi, L.; Hu, F.; Min, W., Optical mapping of biological water in single live cells by stimulated Raman excited fluorescence microscopy. Nat. Commun. 2019, 10 (1), 4764.

Xiong, H.; Qian, N.; Zhao, Z.; Shi, L.; Miao, Y.; Min, W., Background-free imaging of chemical bonds by a simple and robust frequency-modulated stimulated Raman scattering microscopy. Opt. Express 2020, 28 (10), 15663-15677.

Xiong, H.; Qian, N.; Miao, Y.; Zhao, Z.; Chen, C.; Min, W., Super-resolution vibrational microscopy by stimulated Raman excited fluorescence. Light Sci Appl 2021, 10 (1), 87.

Wang, H.; Fu, Y.; Cheng, J.-X., Experimental observation and theoretical analysis of Raman resonance-enhanced photodamage in coherent anti-Stokes Raman scattering microscopy. Journal of the Optical Society of America B 2007, 24 (3).

Adhikari, S.; Spaeth, P.; Kar, A.; Baaske, M. D.; Khatua, S.; Orrit, M., Photothermal Microscopy: Imaging the Optical Absorption of Single Nanoparticles and Single Molecules. ACS Nano 2020, 14 (12), 16414-16445.

Gaiduk, A.; Yorulmaz, M.; Ruijgrok, P. V.; Orrit, M., Room-temperature detection of a single molecule's absorption by photothermal contrast. Science 2010, 330 (6002), 353-6.

Long, M. E.; Swofford, R. L.; Albrecht, A. C., Thermal lens technique: a new method of absorption spectroscopy. Science 1976, 191 (4223), 183-5.

Li, C.; Zhang, D.; Slipchenko, M. N.; Cheng, J. X., Mid-Infrared Photothermal Imaging of Active Pharmaceutical Ingredients at Submicrometer Spatial Resolution. Anal. Chem. 2017, 89 (9), 4863-4867.

Li, Z.; Aleshire, K.; Kuno, M.; Hartland, G. V., Super-Resolution Far-Field Infrared Imaging by Photothermal Heterodyne Imaging. J. Phys. Chem. B 2017, 121 (37), 8838-8846.

Fu, P.; Cao, W.; Chen, T.; Huang, X.; Le, T.; Zhu, S.; Wang, D.-W.; Lee, H. J.; Zhang, D., Super-resolution imaging of non-fluorescent molecules by photothermal relaxation localization microscopy. Nat. Photonics 2023, 17 (4), 330-337.

Zhu, Y.; Ge, X.; Ni, H.; Yin, J.; Lin, H.; Wang, L.; Tan, Y.; Prabhu Dessai, C. V.; Li, Y.; Teng, X.; Cheng, J. X., Stimulated Raman photothermal microscopy toward ultrasensitive chemical imaging. Sci Adv 2023, 9 (43), eadi2181.

Soleilhac, A.; Girod, M.; Dugourd, P.; Burdin, B.; Parvole, J.; Dugas, P. Y.; Bayard, F.; Lacote, E.; Bourgeat-Lami, E.; Antoine, R., Temperature Response of Rhodamine B-Doped Latex Particles. From Solution to Single Particles. Langmuir 2016, 32 (16), 4052-8.

Li, M.; Razumtcev, A.; Yang, R.; Liu, Y.; Rong, J.; Geiger, A. C.; Blanchard, R.; Pfluegl, C.; Taylor, L. S.; Simpson, G. J., Fluorescence-Detected Mid-Infrared Photothermal Microscopy. J. Am. Chem. Soc. 2021, 143 (29), 10809-10815.

Zhang, Y.; Zong, H.; Zong, C.; Tan, Y.; Zhang, M.; Zhan, Y.; Cheng, J. X., Fluorescence-Detected Mid-Infrared Photothermal Microscopy. J. Am. Chem. Soc. 2021, 143 (30), 11490-11499.

Berciaud, S.; Lasne, D.; Blab, G. A.; Cognet, L.; Lounis, B., Photothermal heterodyne imaging of individual metallic nanoparticles: Theory versus experiment. Phys. Rev. B 2006, 73 (4).

Paulo, P. M. R.; Gaiduk, A.; Kulzer, F.; Krens, S. F. G.; Spaink, H. P.; Schmidt, T.; Orrit, M., Photothermal Correlation Spectroscopy of Gold Nanoparticles in Solution. J. Phys. Chem. C 2009, 113 (27), 11451-11457.

Selmke, M.; Braun, M.; Cichos, F., Photothermal single-particle microscopy: detection of a nanolens. ACS Nano 2012, 6 (3), 2741-9.

Eilers, P. H., A perfect smoother. Anal. Chem. 2003, 75 (14), 3631-6.

* cited by examiner

Nuclear matrix
Cytoplasm
Cell membrane
Lipid & ER
Nucleolus
Nuclear membrane

630

$$Q = -kA \frac{dT}{dr} = -k(4\pi r^2) \frac{dT}{dr}$$

240

250

| Thermal property | Unit | DMSO | hexane | glycerol | water |
|---|---|---|---|---|---|
| Heat Capacity | J/(kg·K) | 1966 | 2251 | 2400 | 4184 |
| Thermal conductivity | W/(m·K) | 0.200 | 0.124 | 0.283 | 0.598 |
| Thermo-optic coefficient dn/dT ($10^{-4}$) | $K^{-1}$ | -4.93 | -5.20 | -2.30 | -1.13 |
| Refractive index | | 1.479 | 1.375 | 1.473 | 1.333 |
| Relative signal intensity | a.u. | 10.3 | 8.83 | 4.27 | 1 |

FIG. 9

STIMULATED RAMAN PHOTOTHERMAL MICROSCOPE WITH OPTICAL PARAMETRIC AMPLIFIER SOURCE

CROSS REFERENCE TO RELATED APPLICATIONS

This application is a continuation of U.S. patent application Ser. No. 19/037,115, filed on Jan. 25, 2025, and entitled "Stimulated Raman Photothermal Microscope with Optical Parametric Amplifier Source" which claims priority to and the benefit of U.S. Provisional Patent Application No. 63/624,983, filed on Jan. 25, 2024, and entitled "Single Pulse Stimulated Raman Photothermal Microscope and Uses Thereof", the contents of each of which are incorporated herein by reference as though fully set forth herein.

GOVERNMENT SUPPORT

This invention was made with government support under Grant number R35GM136223, awarded by the National Institutes of Health. The Government has certain rights in this invention.

FIELD OF THE TECHNOLOGY

The subject disclosure relates to microscopy, and particularly to stimulated Raman photothermal (SRP) microscopy.

BACKGROUND OF THE TECHNOLOGY

Stimulated Raman scattering (SRS) microscopy has been sharpened to one of the most powerful tools in the field of label-free imaging. In SRS, two spatial-temporally overlapped laser pulse trains (e.g. 102, 104 of FIG. 1a), namely pump and Stokes, are introduced to coherently interact with Raman-active molecules resonating at the laser beating frequency, leading to a stimulated Raman gain (SRG) or loss (SRL) in either of two laser beams at a modulation depth of $10^{-7} \sim 10^{-3}$ level. While providing similar molecular vibrational features to conventional Raman spectroscopy, SRS offers greater than six orders of sensitivity improvement compared to spontaneous Raman. Such sensitivity improvement has enabled SRS to bring countless insights to many crucial questions (e.g., volumetric tissue mapping, cancer metabolism and bacteria heterogencities. Unfortunately, further sensitivity improvement of SRS is often challenged by the fundamental barrier of shot noise limitation, where conventional methods (i.e., increasing the number of photons) can easily exceed the power tolerance of the sample.

Pushing the fundamental limit of SRS sensitivity requires either the reduction of measurement noise, or the boost of SRS signal. On reduction of SRS measurement noise, efforts focus on using squeezed light, termed "quantum enhanced SRS". SRS signal-to-noise-ratio (SNR) enhancements of 3.6 dB[24] with continuous wave squeezed light, or 2.89 dB[25] with pulsed squeezed light have been demonstrated with no additional perturbation on sample. The future of this technique is bright, but currently it is still limited by the low squeeze efficiency and decoherence in complex imaging systems. On boost of SRS signal, different photophysical processes have been utilized to increase the cross section and, therefore, signal intensity of SRS, including electronic pre-resonance SRS, Plasmon enhanced SRS, and Stimulated Raman excited fluorescence (SREF). Very high enhancement factor ($10^4 \sim 10^7$) of SRS signal, and even single molecule SRS measurement, have been achieved.

However, the requirement of special target molecules or plasmonic nanostructures have constrained the scope of these techniques.

To seek approaches towards boosting the signal, one can revisit the fundamental photophysics of SRS, specifically, from the perspective of the thermal effect of SRS, namely Stimulated Raman photothermal (SRP) microscopy. As illustrated in FIG. 1B, when pump and Stokes pulses (109, 111, respectively) with appropriate wavelengths interact with Raman-active molecules, SRS happens with photon transfer from pump to Stokes, creating a modulation on the laser intensities. Meanwhile, the target molecules are pumped to their Raman active vibrational excited states at a higher energy level, with the total number of excitations equaling the total number of photons transferred from pump to Stokes pulses. After SRS excitation, the populated vibrationally excited molecules will then lose their energies through non-radiative decay, consequently, heat up the surrounding environment, causing SRP.

Optical detection and imaging of photothermal effect has been described in the art and is well-known for its high sensitivity down to single molecule. As for its mechanism, any photothermal process (mostly absorption) will increase the local temperature of and around the sample, creating local refractive indices change, which can then be measured with a probing beam. Conventional photothermal microscopy is mostly applied at the electronic absorption region, targeting majorly non-fluorescent dye molecules or metal nanostructures. The limited scope of analytes and lack of meaningful spectroscopic features has constrained the application of photothermal microscopy in biological systems.

One breakthrough happened when mid-infrared pump was introduced to the field of photothermal microscopy named mid-infrared photothermal (MIP), which provided universal IR active vibrational spectroscopic features while maintaining the advantage of high sensitivity. However, water absorbs strongly at IR region, which diminishes the IR pump at a very high rate, meanwhile create background at the most often used Amide I region. In contrast, SRP microscopy can not only provide the spectroscopic information of SRS, but can also improve the sensitivity of SRS measurement. Meanwhile, SRP operates at near-infrared (NIR) region, where the water absorption is negligible.

SUMMARY OF THE TECHNOLOGY

As discussed, SRP is a newly developed spectroscopic and chemical imaging modality. In an SRP measurement, a pair of laser pulse trains are sent to the sample to excite the SRS process, and a third probe laser beam then measures the thermal lensing effect caused by the SRS process. Previous demonstrations have shown the advantages in high detection sensitivity, low NA requirement for signal collection, and low susceptibility towards ultrafast laser noises.

These advantages have shown great potential for SRP as the next generation of coherent Raman measurement. However, previous demonstrations of SRP are all based on an optical parametric oscillator (OPO) system that operates at relatively low peak power and high laser repetition rate (>40 MHZ). To the contrary, the thermal process is much slower, usually at microsecond level, thus modulation or pulse picking is necessary for OPO based SRP measurement, wasting a large portion of energy.

Systems and methods of the present invention, however, use optical parametric amplifier (OPA) sources for the pump and/or Stokes beam. OPA systems are another type of laser source that has been widely applied in nonlinear spectroscopy measurement, due to its high peak power and wide spectral tunability. However, it is difficult to measure SRS with an OPA laser system, due to its relatively high laser intensity noise.

However, the systems and methods described herein recognize that, in an SRP measurement, the ultrafast laser beams are not directly measured, therefore the laser intensity noise of the ultrafast lasers will induce minimal degradation of spectra and image qualities. By replacing the OPO laser with an OPA laser, the high peak power allows for nonlinear excitation of the SRS process, which leads to the potential to further improve the sensitivity of SRP measurement. On top of that, the relatively low laser repetition rate (~1 MHZ) allows sufficient cooling between heating period without the necessity of laser modulation or pulse picking, enabling high speed SRP measurement imaging at a maximal speed of 1 μs per pixel.

In certain aspects, a stimulated Raman photothermal (SRP) microscope for imaging a sample is provided, comprising: a first optical source emitting a pump beam and lacking an optical resonator; a second optical source emitting a Stokes beam, wherein the Stokes beam is combined with the pump beam to form a combined beam, the combined beam being directed to the sample to induce a thermal effect caused by the stimulated Raman process; a third optical source emitting a probe beam, wherein the probe beam is directed to the sample; and one or more optical detectors configured to detect modulation of the probe beam after modulation by the sample to measure an SRP signal.

In some embodiments, the first optical source can comprise an optical parametric amplifier (OPA). The first optical source can include a noncollinear OPA (NOPA). The pump beam may have a repetition rate of 40 MHz or less. The pump beam can have a repetition rate of 10 MHz or less. In some embodiments, the pump beam may have a repetition rate of 1 MHz or less.

The first optical source can have a peak power of 100 kW or more. The first optical source may have a peak power of 1000 kW or more. In certain embodiments, the probe beam may be directed to the sample colinear with the combined beam. Microscopes of the invention may further comprise at least one lens positioned within an optical path of the combined beam and probe beam, wherein the at least one lens adjusts the collimation of the probe beam to make the probe beam focus axially off a focus of the combined beam. Microscopes may further comprise a motorized delay stage operable to control temporal delay of the Stokes beam.

In certain embodiments the microscope may further comprise at least one scanning mirror configured to scan the sample with the combined beam and the probe beam. In various embodiments, the microscope can comprise a spectral filter operable to block the combined beam after modulation by the sample, wherein the optical detector detects the probe beam after modulation by the sample and filtering by the spectral filter.

The measured SRP signal may be based on the local refractive index modulation of the sample, determined from the detected probe beam.

Aspects of the invention can include a method for stimulated Raman photothermal (SRP) microscopy for imaging a sample. Methods can include the steps of emitting a pump beam from a first optical source without an optical resonator; emitting a Stokes beam from a second optical source; combining the Stokes beam with the pump beam to form a combined beam; directing the combined beam to the sample to induce a thermal effect caused by a stimulated Raman process; emitting a probe beam from a third optical source;

directing the probe beam to the sample; and detecting modulation of the probe beam with one or more optical detectors after modulation by the sample to measure an SRP signal.

BRIEF DESCRIPTION OF THE DRAWINGS

So that those having ordinary skill in the art to which the disclosed system pertains will more readily understand how to make and use the same, reference may be had to the following drawings.

Signal acquired from a single 100 nm PMMA nanoparticle at 2930 cm$^{-1}$ immersed in glycerol-d8.

FIG. 9 shows thermal and thermos-optic properties and estimated relative signal intensity of various mediums.

Figure 10:
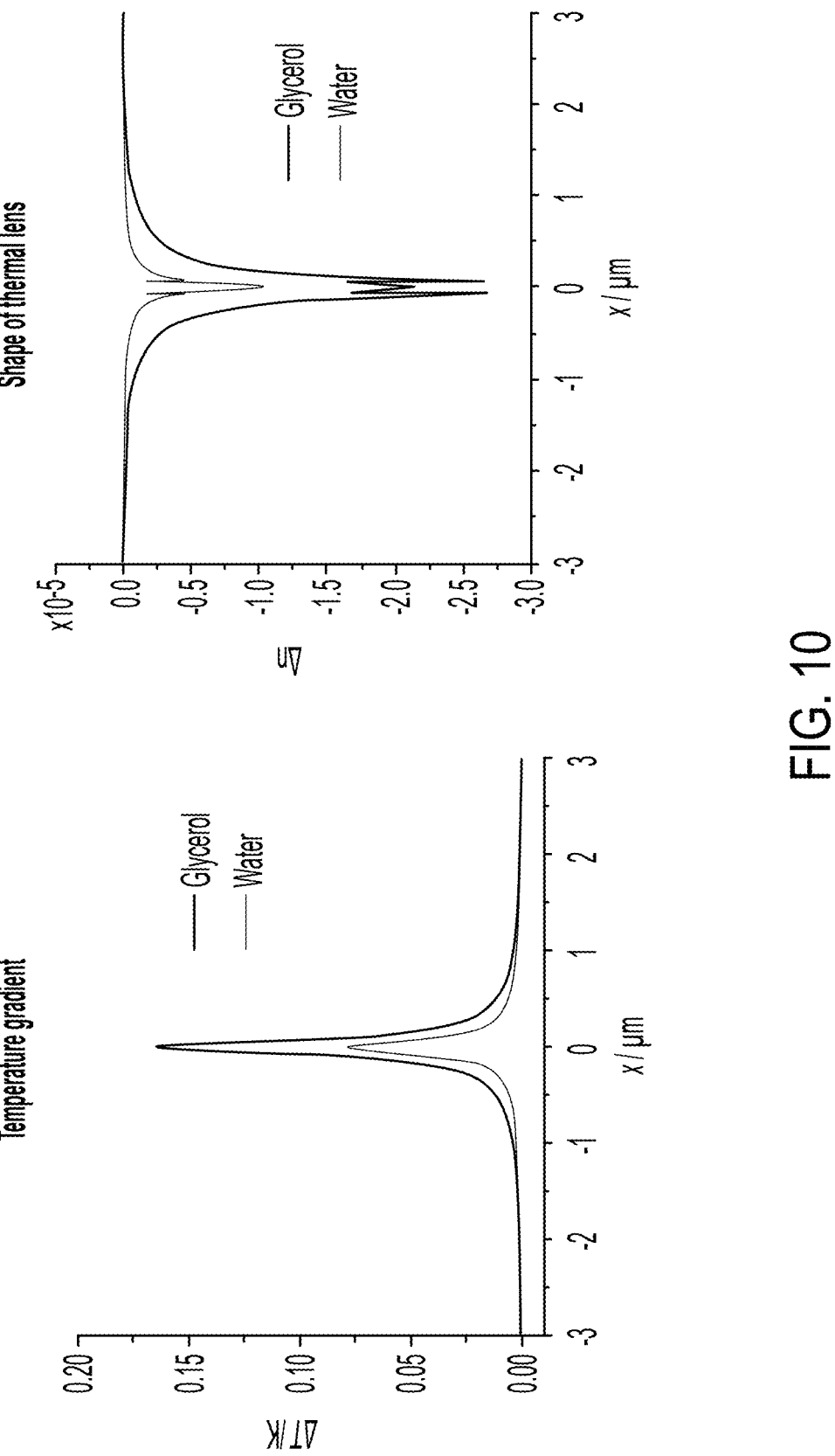

FIG. 10 shows SRP simulation results for the shape of temperature gradient and thermal lens induced by a 100 nm PMMA particle in glycerol or water.

Figure 3A:
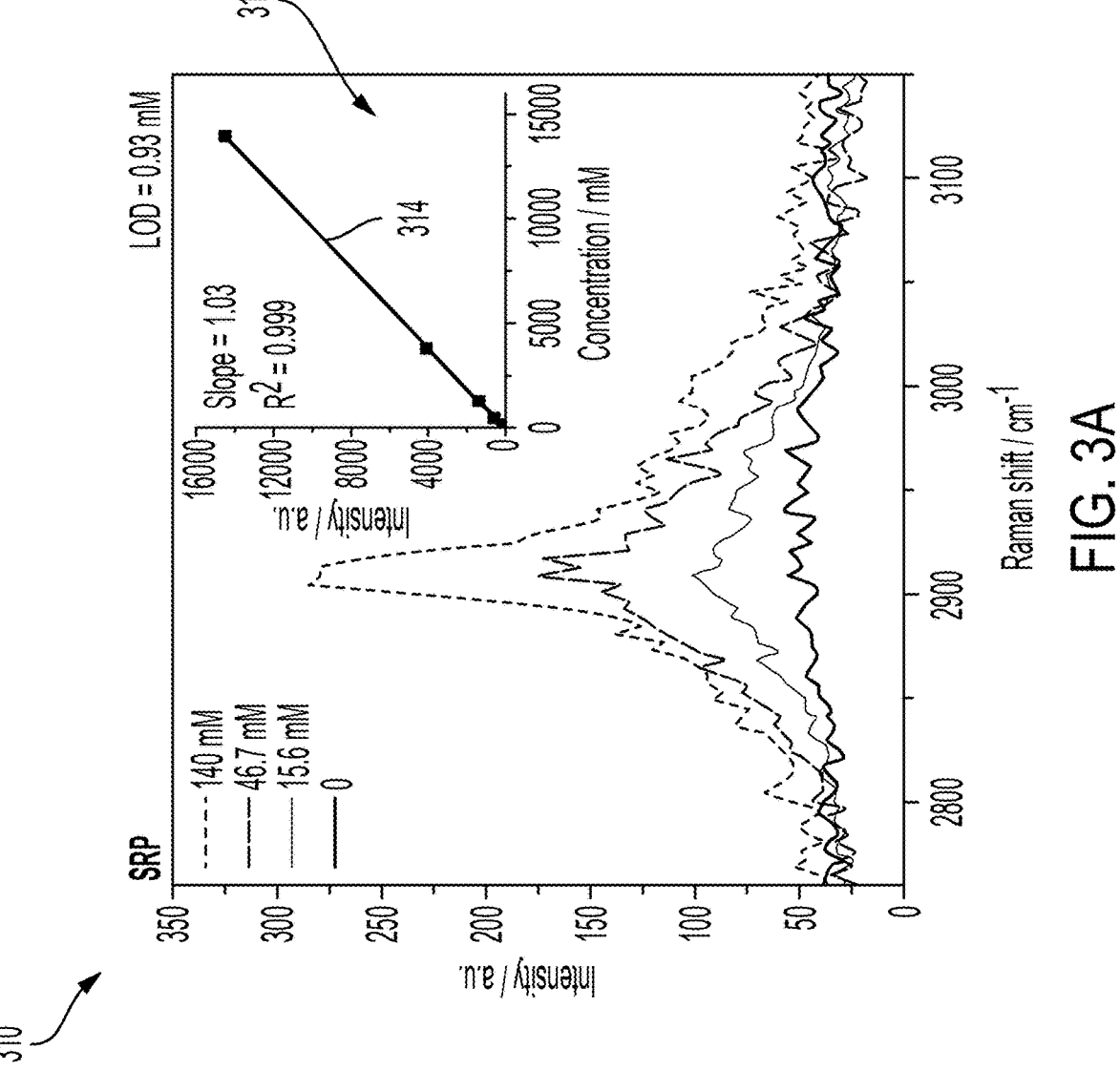
FIG. 3A is a graph of SRP obtained with a microscope in accordance with the subject technology.
Figures 11A, 11B:
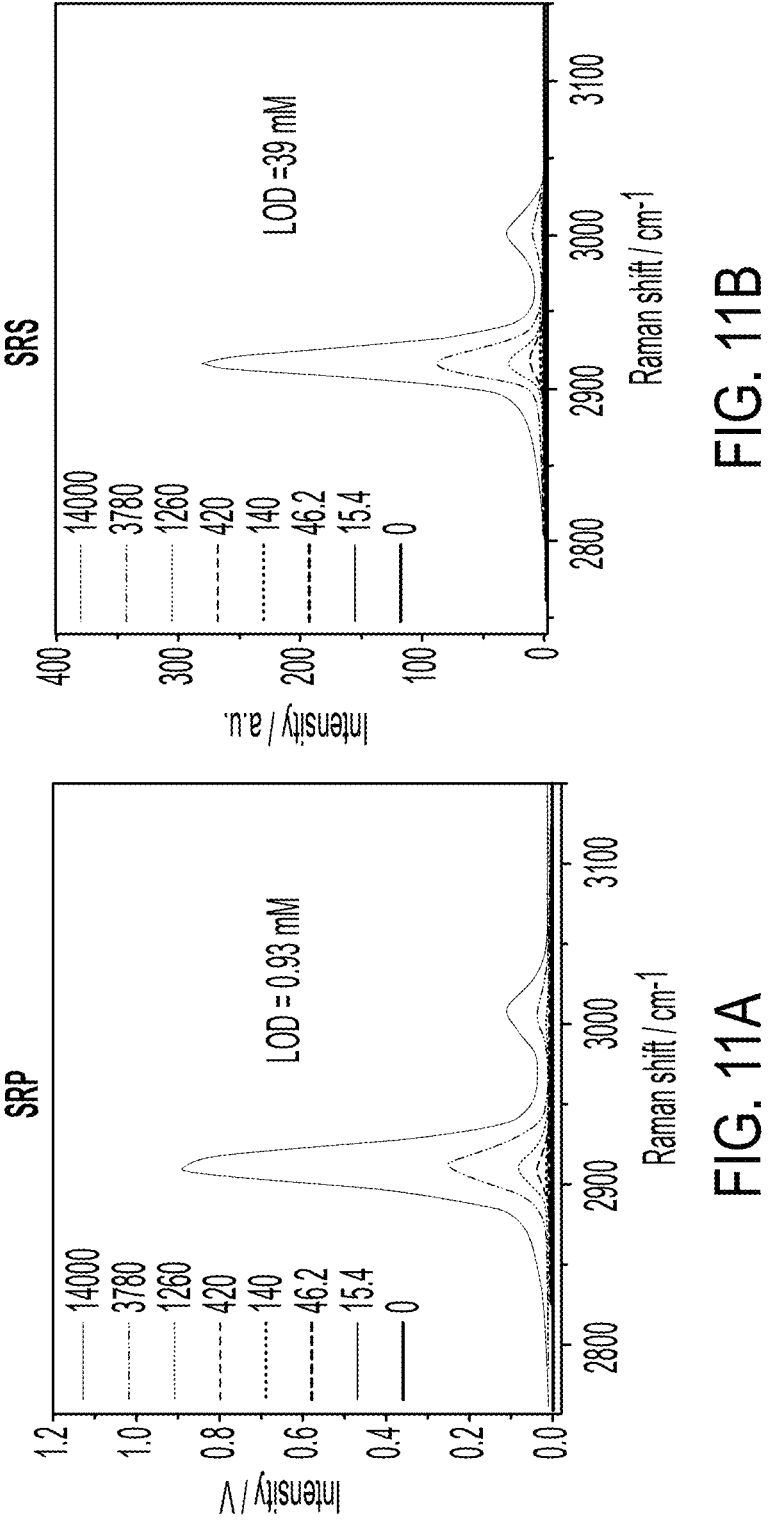

FIG. 11A shows a complete data set of LOD measurement of DMSO dissolved in DMSO-d6 using SRP depicted in FIG. 3A.

Figure 3B:
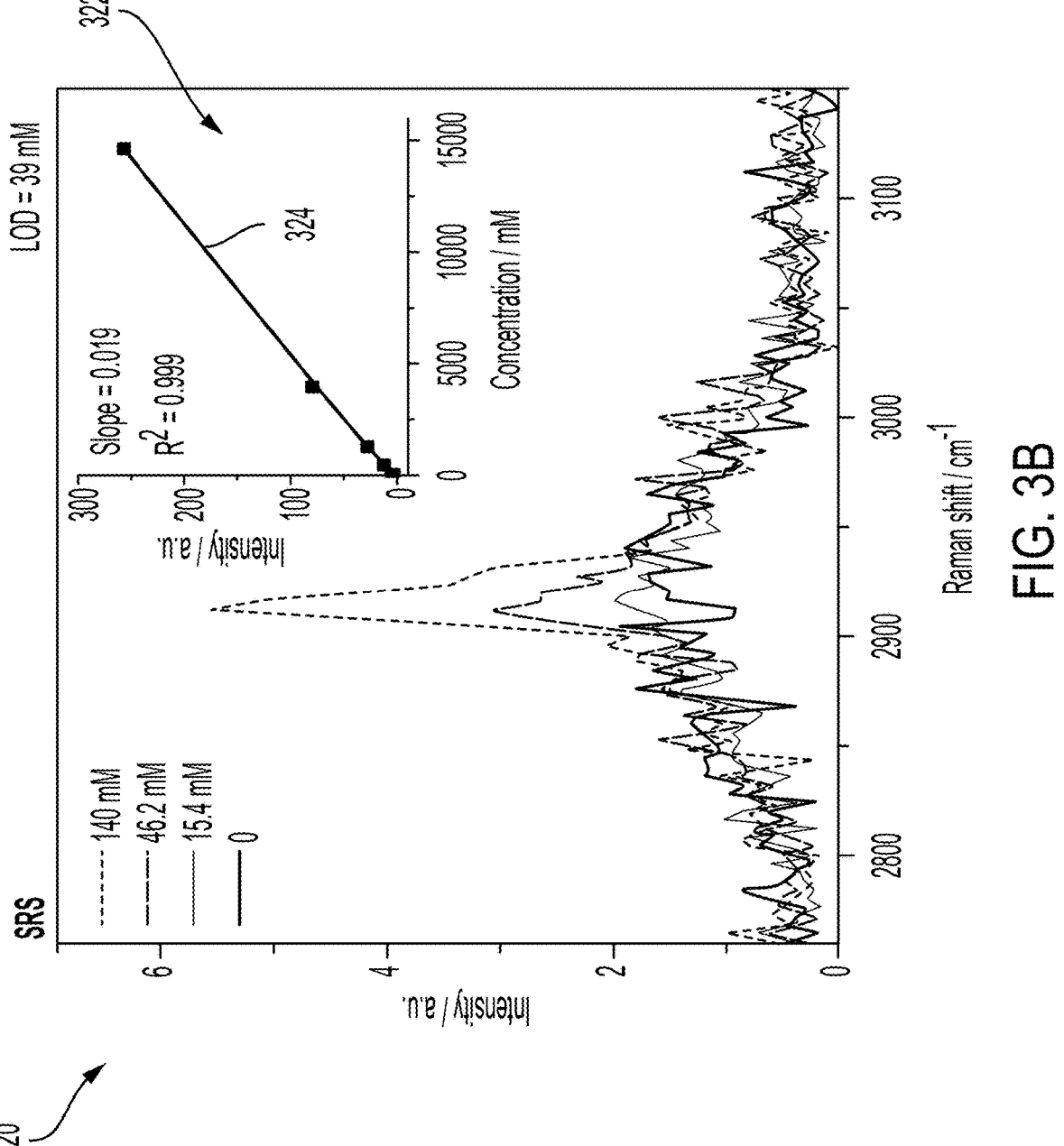
FIG. 3B is a graph of SRS obtained with a microscope in accordance with the subject technology.

FIG. 11B shows a complete data set of LOD measurement of DMSO dissolved in DMSO-d6 using SRS depicted in FIG. 3B.

Figures 12A, 12B:
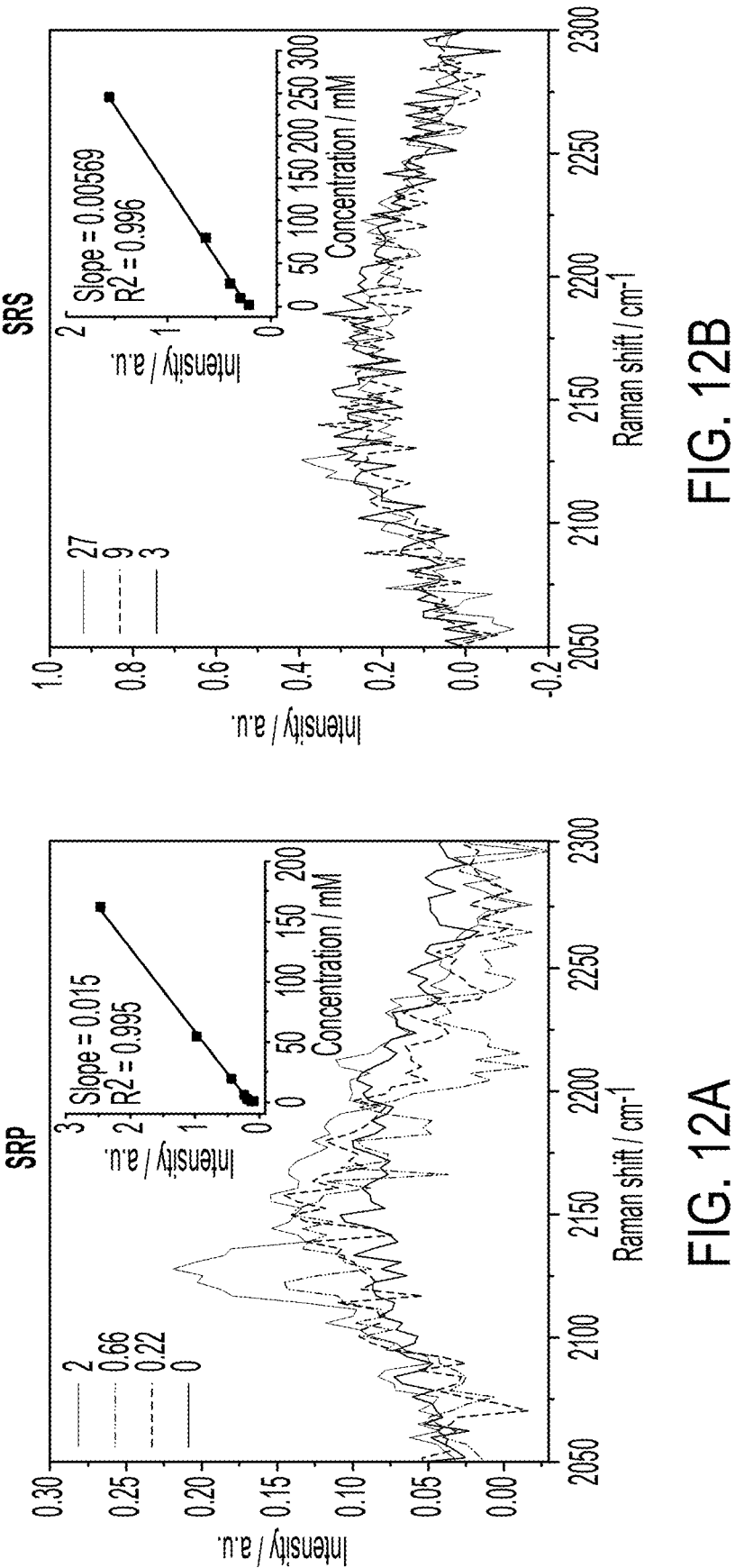

FIG. 12A shows SRP signal with gradient concentration for 1,7-Octadiyne dissolved in DMSO with a concentration unit of mM.

FIG. 12B shows SRS signal with gradient concentration for 1,7-Octadiyne dissolved in DMSO with a concentration unit of mM.

Figure 12D:
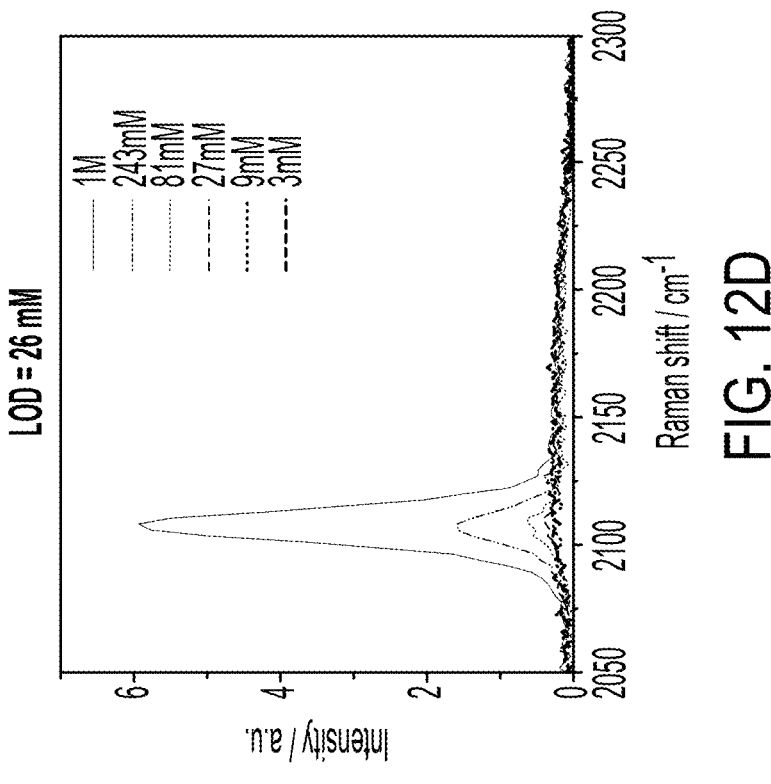
Figure 12C:
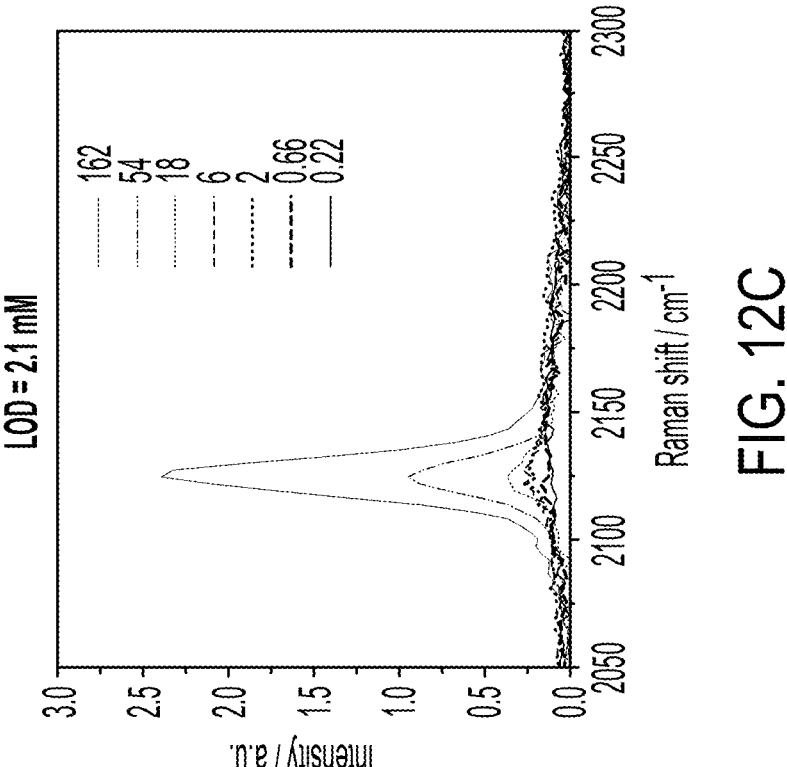

FIG. 12C shows the complete data set of LOD measurement with SRP for 1,7-Octadiyne dissolved in DMSO.

FIG. 12D shows the complete data set of LOD measurement with SRS for 1,7-Octadiyne dissolved in DMSO.

Figure 13B:
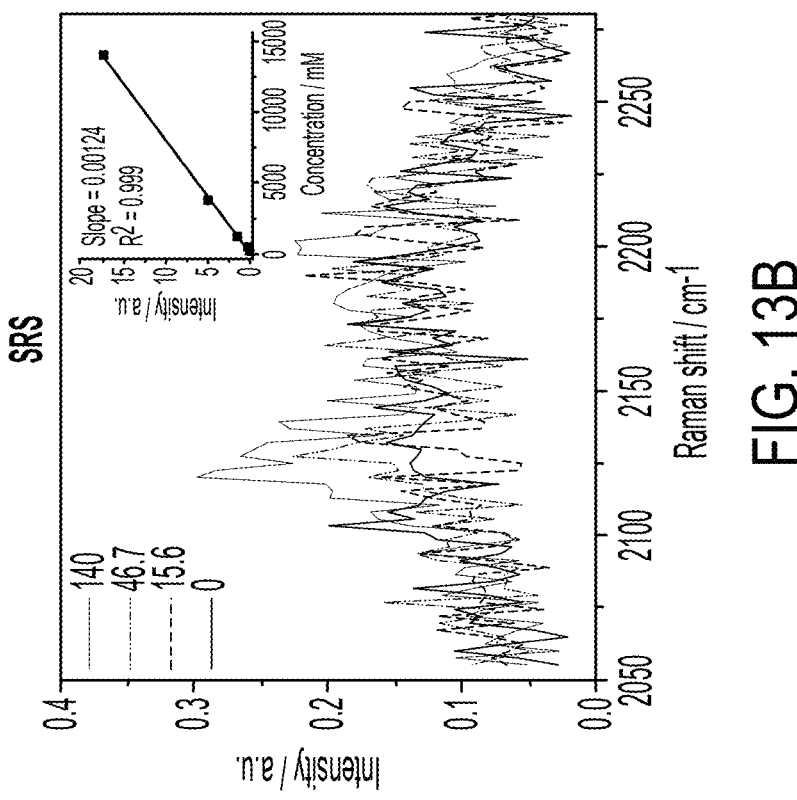
Figure 13A:
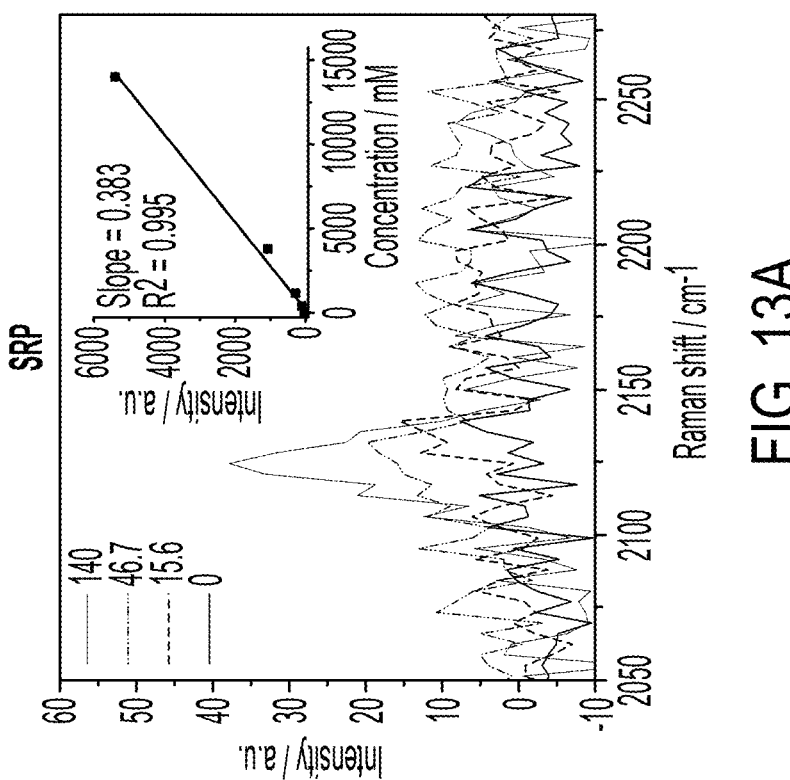

FIG. 13A shows SRP signal with gradient concentration for DMSO-d6 dissolved in DMSO with a concentration unit of mM.

FIG. 13B shows SRS signal with gradient concentration for DMSO-d6 dissolved in DMSO with a concentration unit of mM.

Figure 13D:
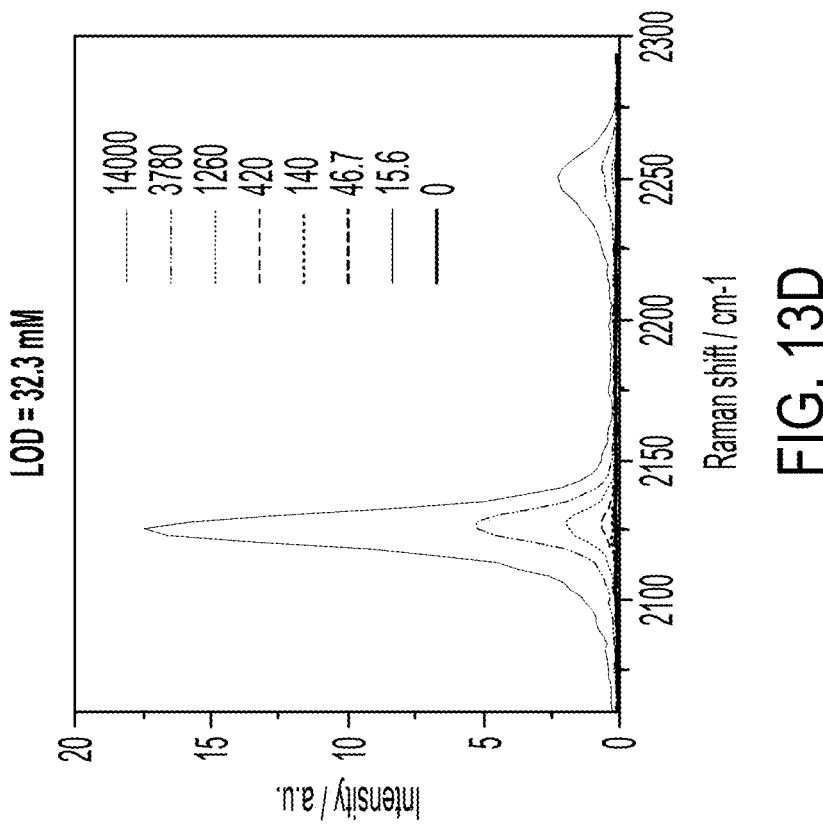
Figure 13C:
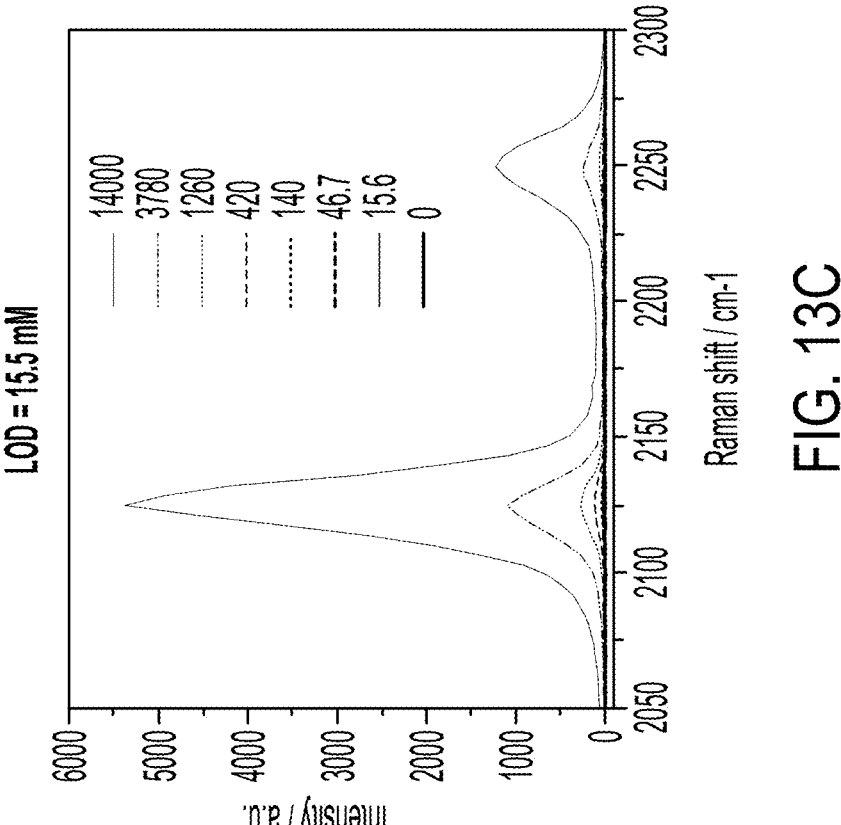

FIG. 13C shows the complete data set of LOD measurement with SRP for DMSO-d6 dissolved in DMSO.

FIG. 13D shows the complete data set of LOD measurement with SRS for DMSO-d6 dissolved in DMSO.

Figure 14A:
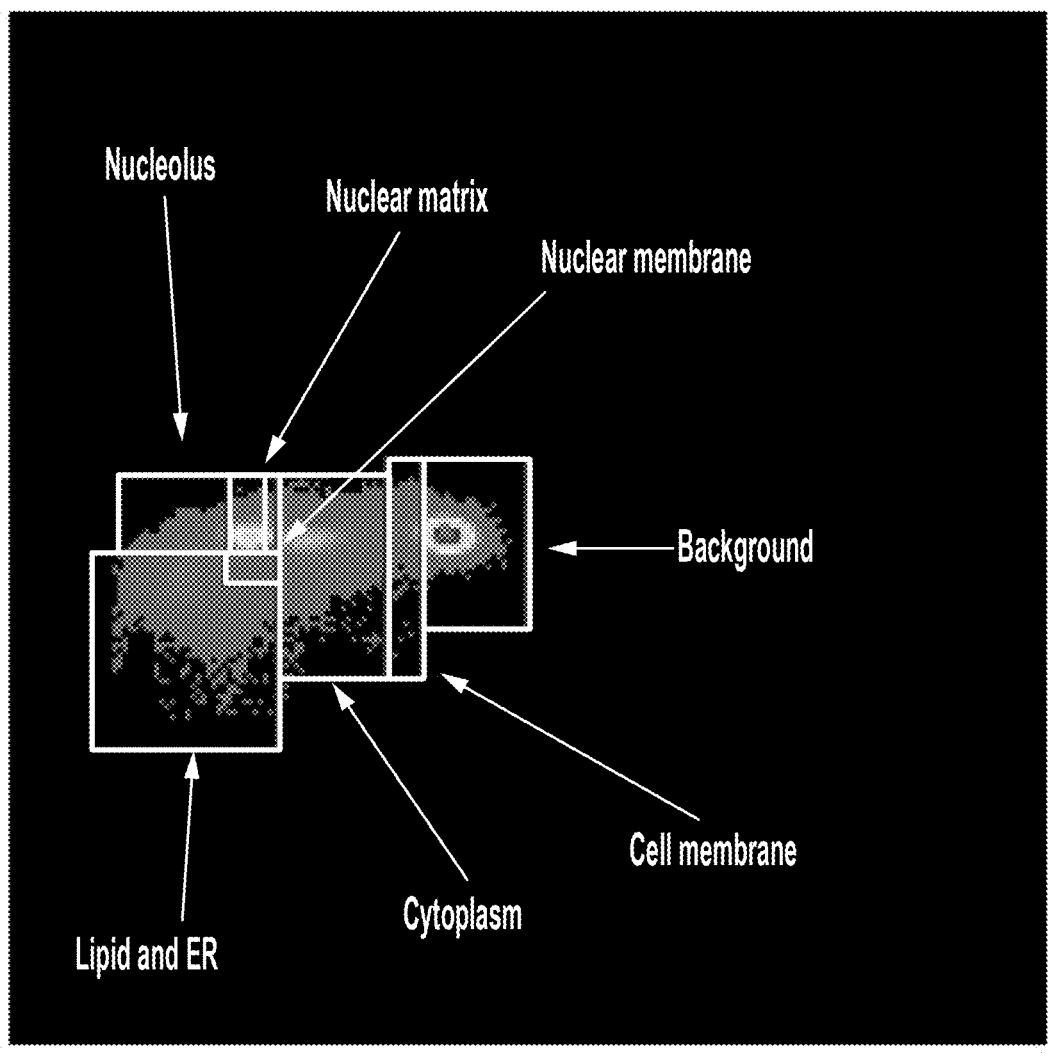

FIG. 14A shows segmentation of the SRP image of glycerol-d8 immersed Mia PACA-2 cells in phasor domain.

Figure 14B:
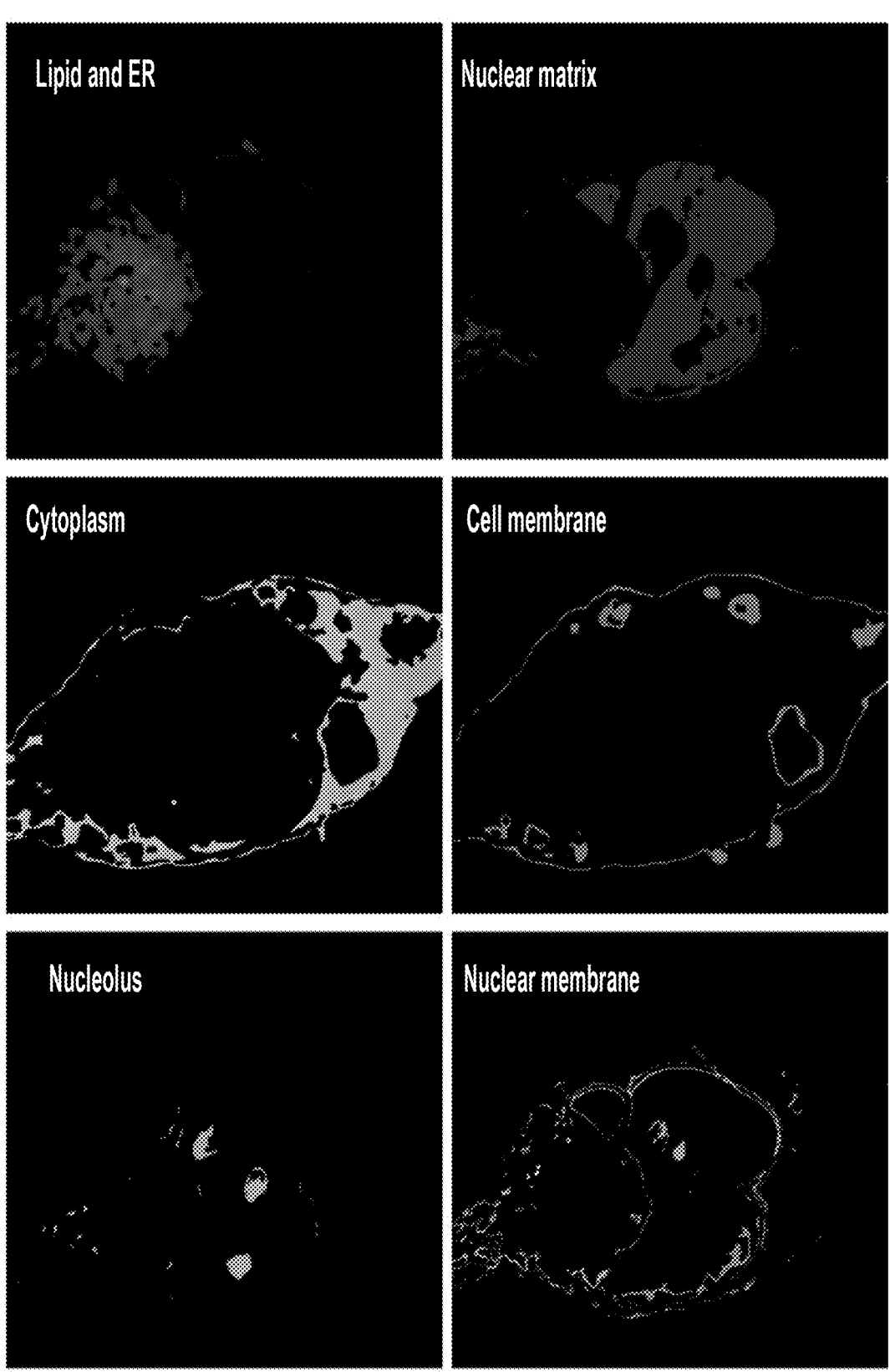

FIG. 14B shows mapping of each component of the glycerol-d8 immersed Mia PACA-2 cells from phasor analysis.

Figure 14C:
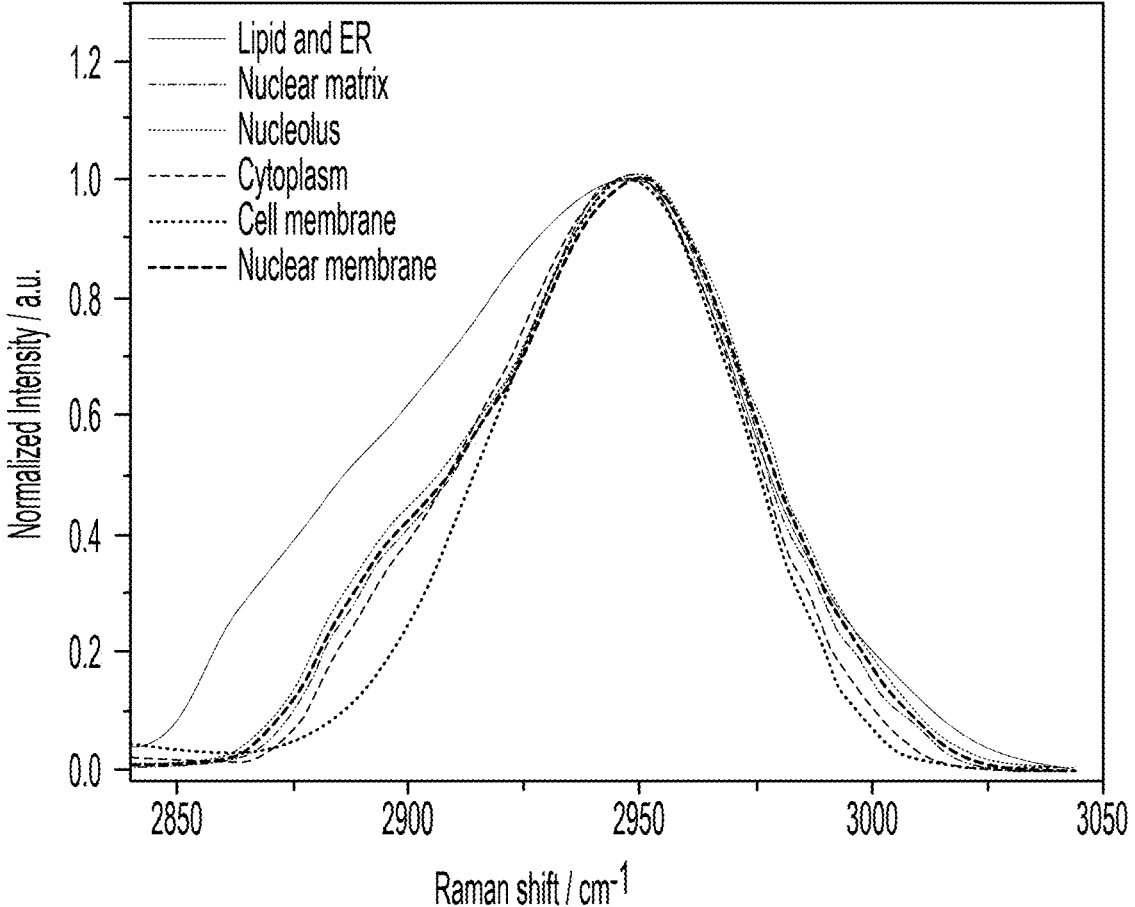

FIG. 14C shows the SRP spectrum at C-H region for each component of the glycerol-d8 immersed Mia PACA-2 cells.

Figure 15:
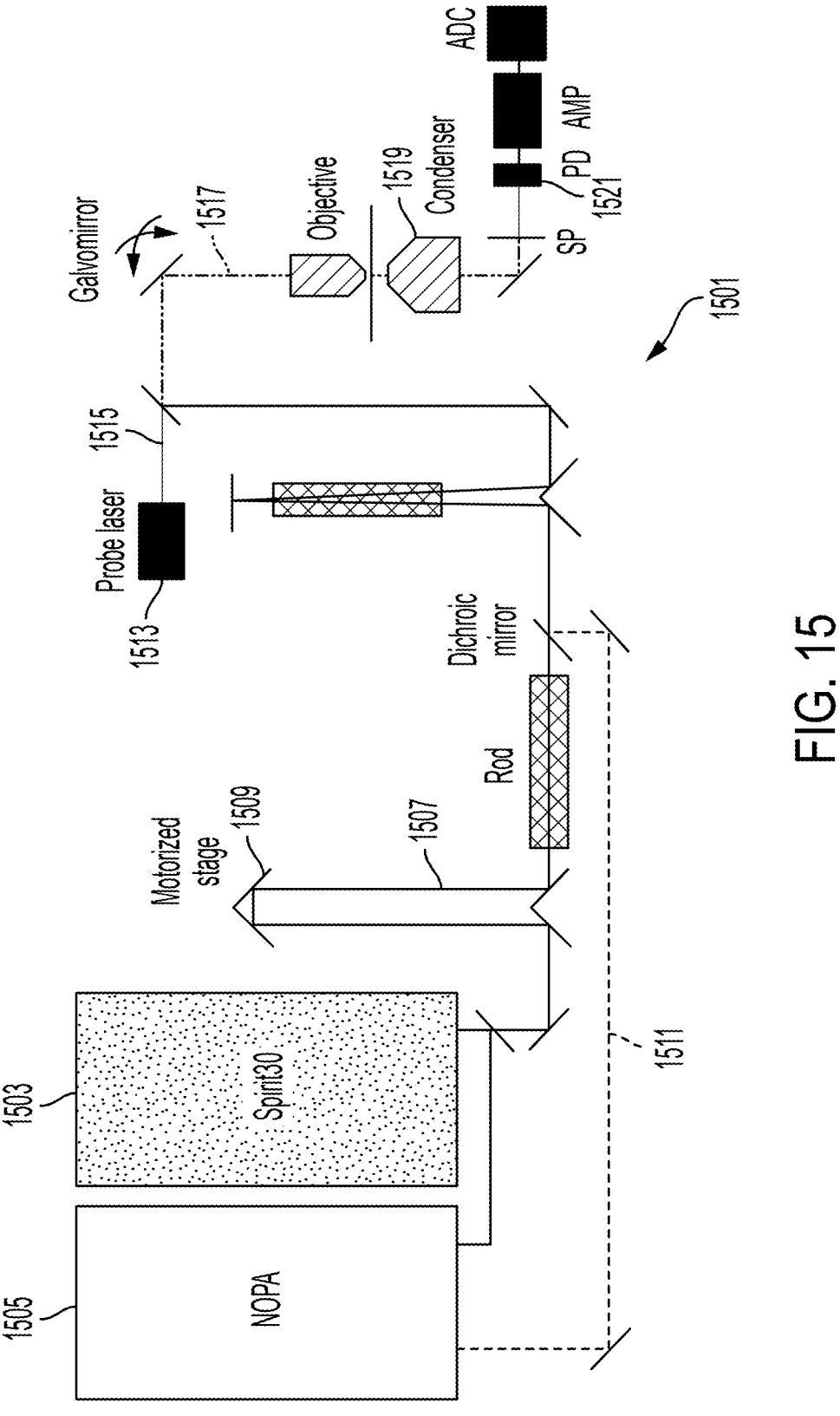

FIG. 15 shows a non-collinear optical parametric amplifier (NOPA)-SRP microscope with NOPA as the laser source where SP: spectral filter; PD: photodiode; AMP: amplifier; and ADC: analog-to-digital converter.

Figure 16B:
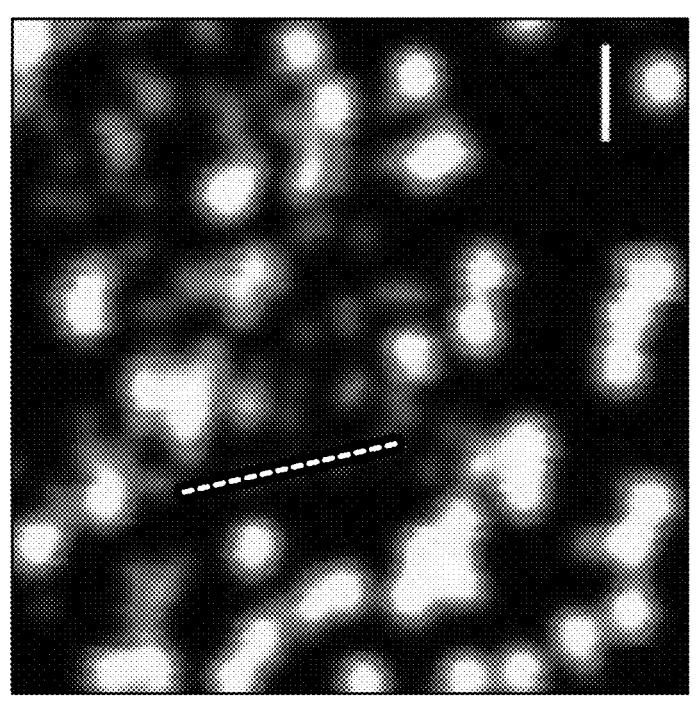
Figure 16A:
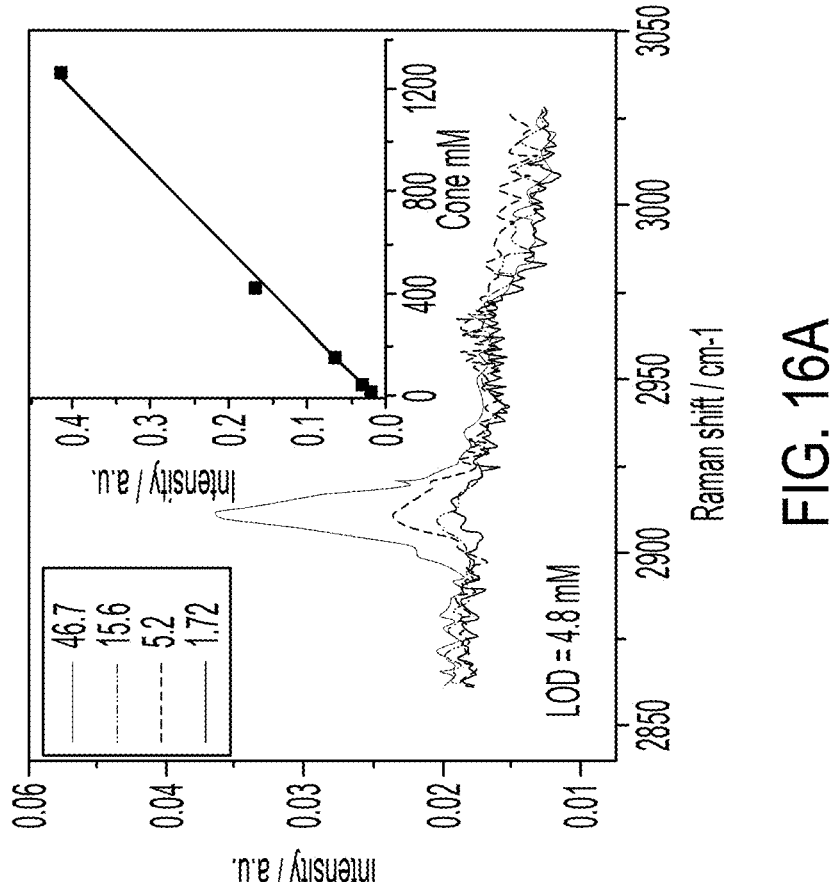

FIG. 16A shows limit of detection (LoD) of DMSO, with NOPA-SRP.

FIG. 16B shows an NOPA-SRP image of a mixture of 500 nm and 200 nm PMMA nanoparticles, at 2950 cm$^{-1}$. Scale bar: 1 μm.

Figure 16D:
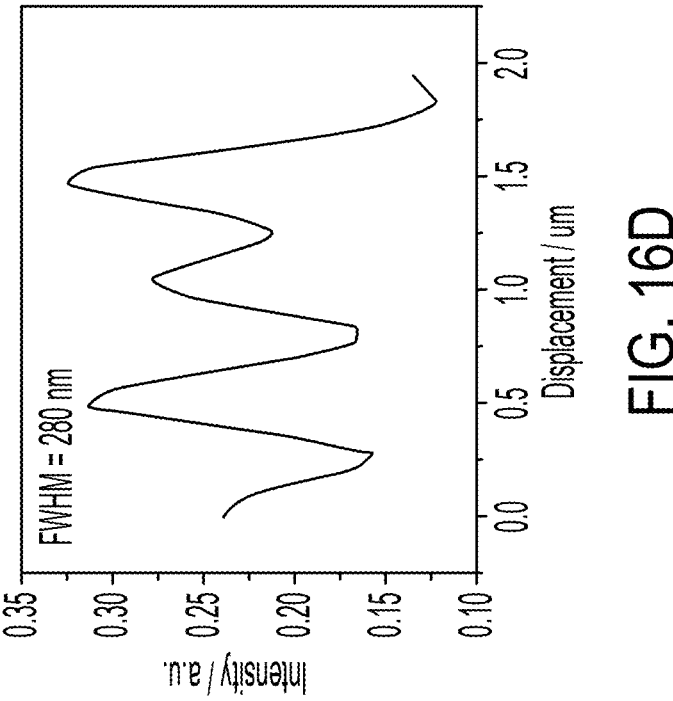
Figure 16C:
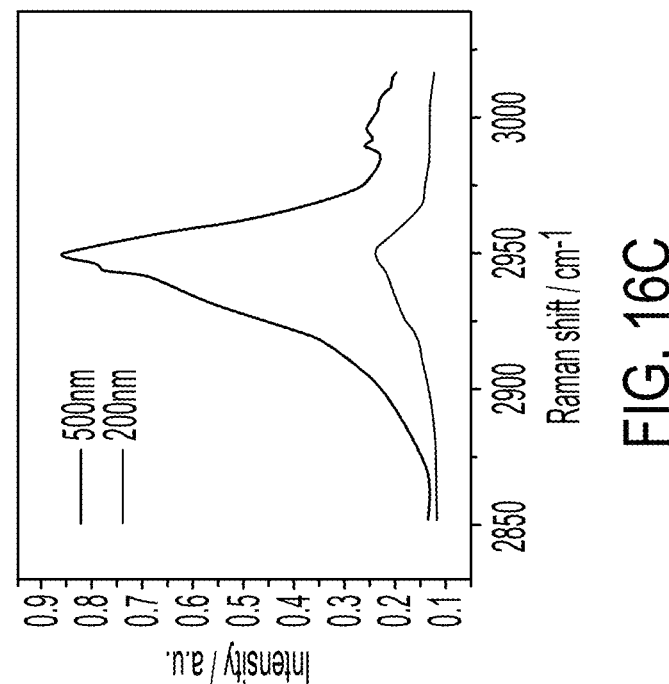

FIG. 16C shows NOPA-SRP spectra of single PMMA nanoparticles.

FIG. 16D shows the profile of the dotted line in FIG. 16C.

Figure 17C:
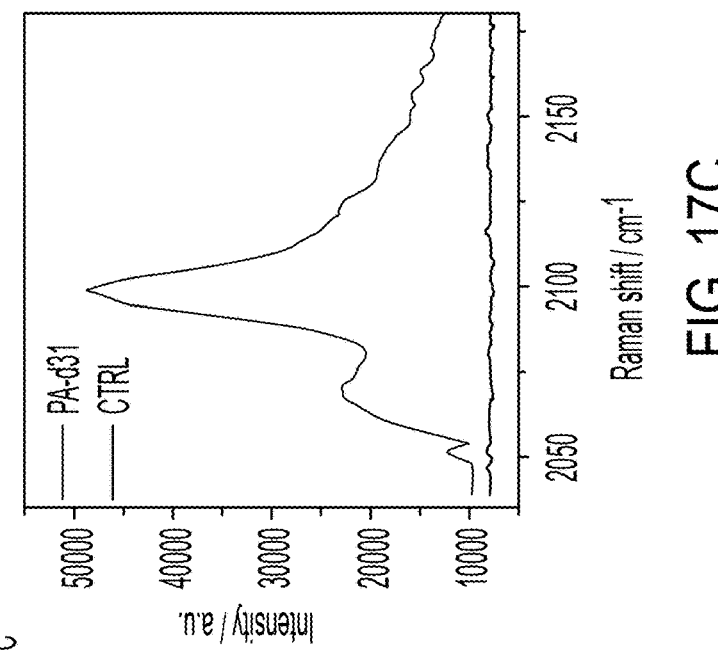
Figure 17B:
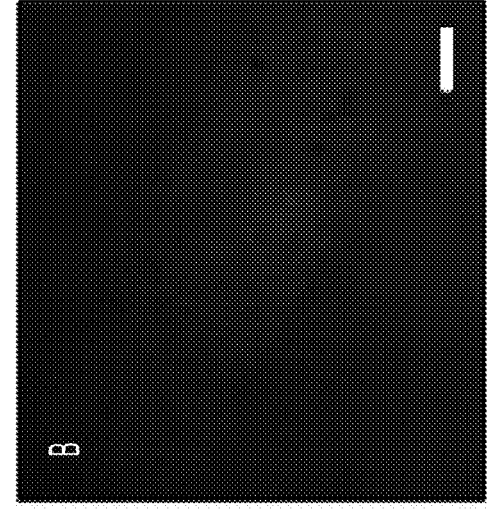
Figure 17A:
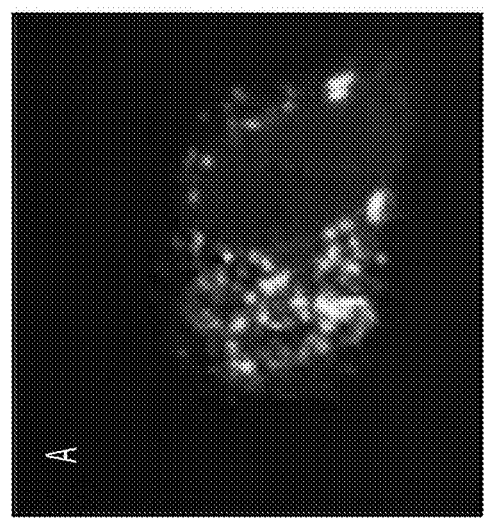

FIG. 17A shows NOPA-SRP imaging of an SJSA-1 cell cultured with palmitic acid-d31 (PA-d31) at 2100 cm$^{-1}$. Scale bar: 5 μm.

FIG. 17B shows NOPA-SRP imaging of an SJSA-1 cell cultured without palmitic acid-d31 (PA-d31) at 2100 cm$^{-1}$. Scale bar: 5 μm.

FIG. 17C shows NOPA-SRP spectra of lipid droplets in cultured or control SJSA-1 cell.

Figure 17F:
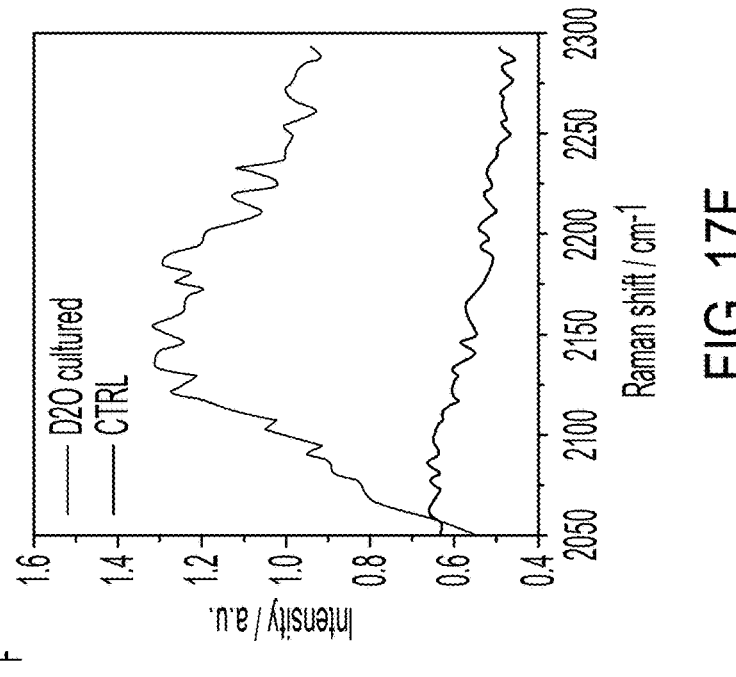
Figure 17E:
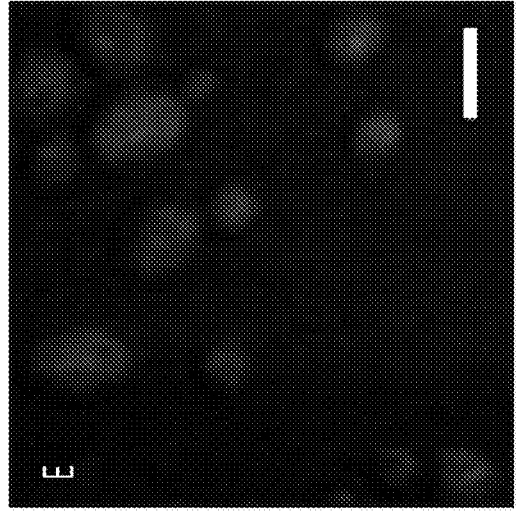
Figure 17D:
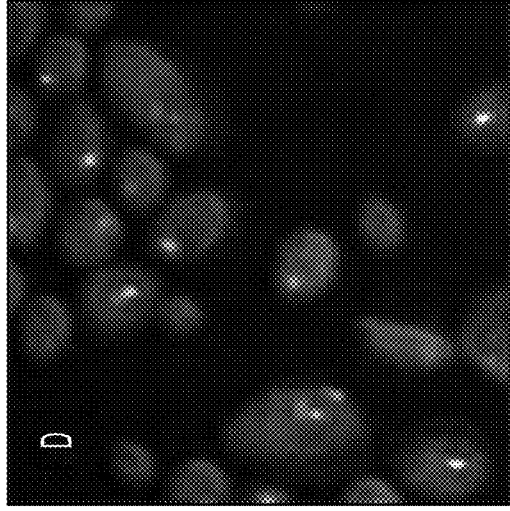

FIG. 17D shows NOPA-SRP imaging of C. albicans cultured with deuterated water (D$_2$O) at 2150 cm$^{-1}$. Scale bar: 5 μm.

FIG. 17E shows NOPA-SRP imaging of C. albicans cultured without deuterated water (D$_2$O) at 2150 cm$^{-1}$. Scale bar: 5 μm.

FIG. 17F shows NOPA-SRP spectra of lipid droplets in cultured or control C. Albicans.

Figure 17I:
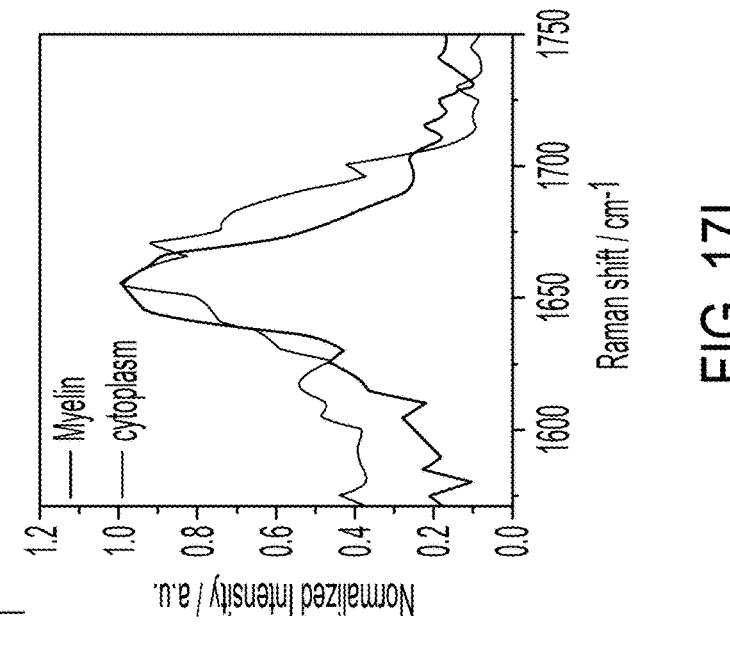
Figure 17H:
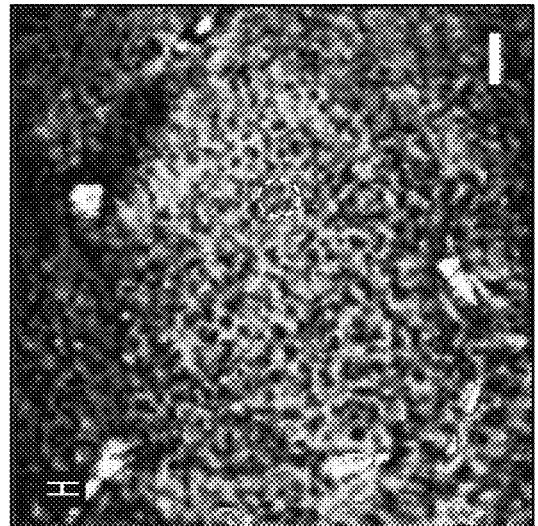
Figure 17G:
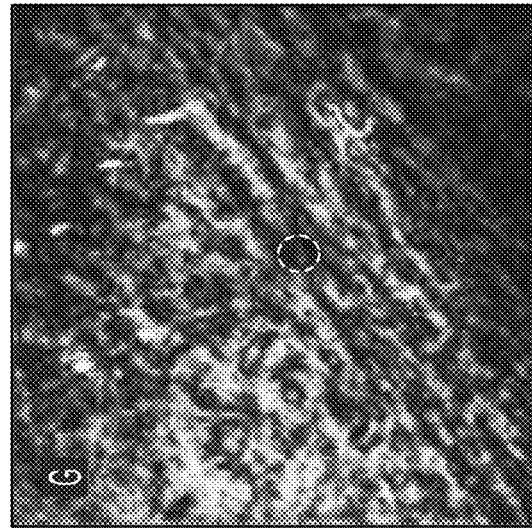

FIG. 17G shows NOPA-SRP image of mouse brain tissue at 1650 cm$^{-1}$ focused on myelin. Scale bar: 10 μm.

FIG. 17H shows NOPA-SRP image of mouse brain tissue at 1650 cm$^{-1}$ focused on cytoplasm.

FIG. 17I shows NOPA-SRP spectra of different field of views of imaging from FIG. 17G (myelin) and FIG. 17H (cytoplasm), indicated by the respective circles therein.

Figure 18:
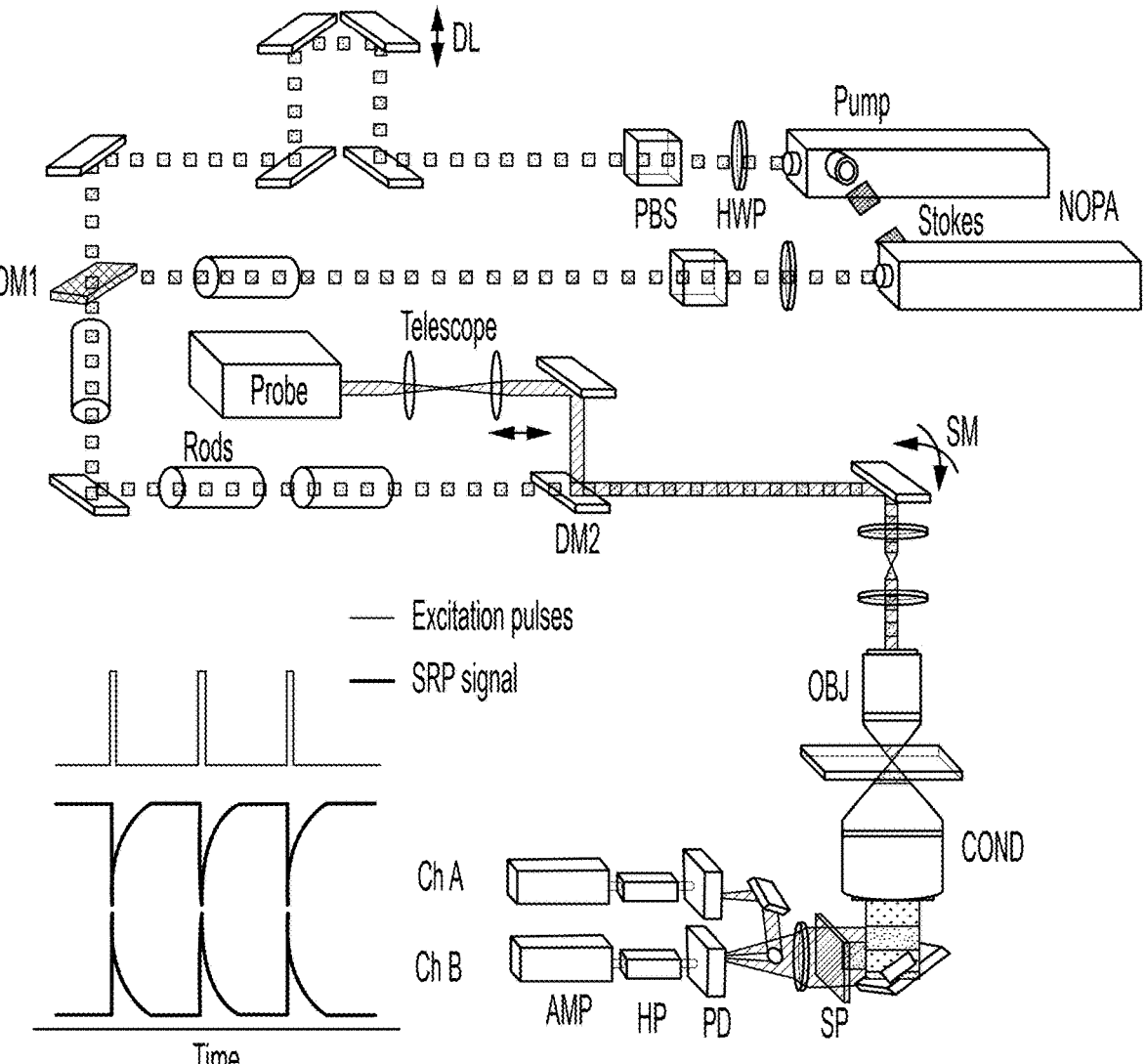

FIG. 18 depicts an exemplary setup for an OPA-based SRP microscope design and characterization of SRP modulation depth as a function of duty cycle and modulation frequency.

Figures 19A, 19B:
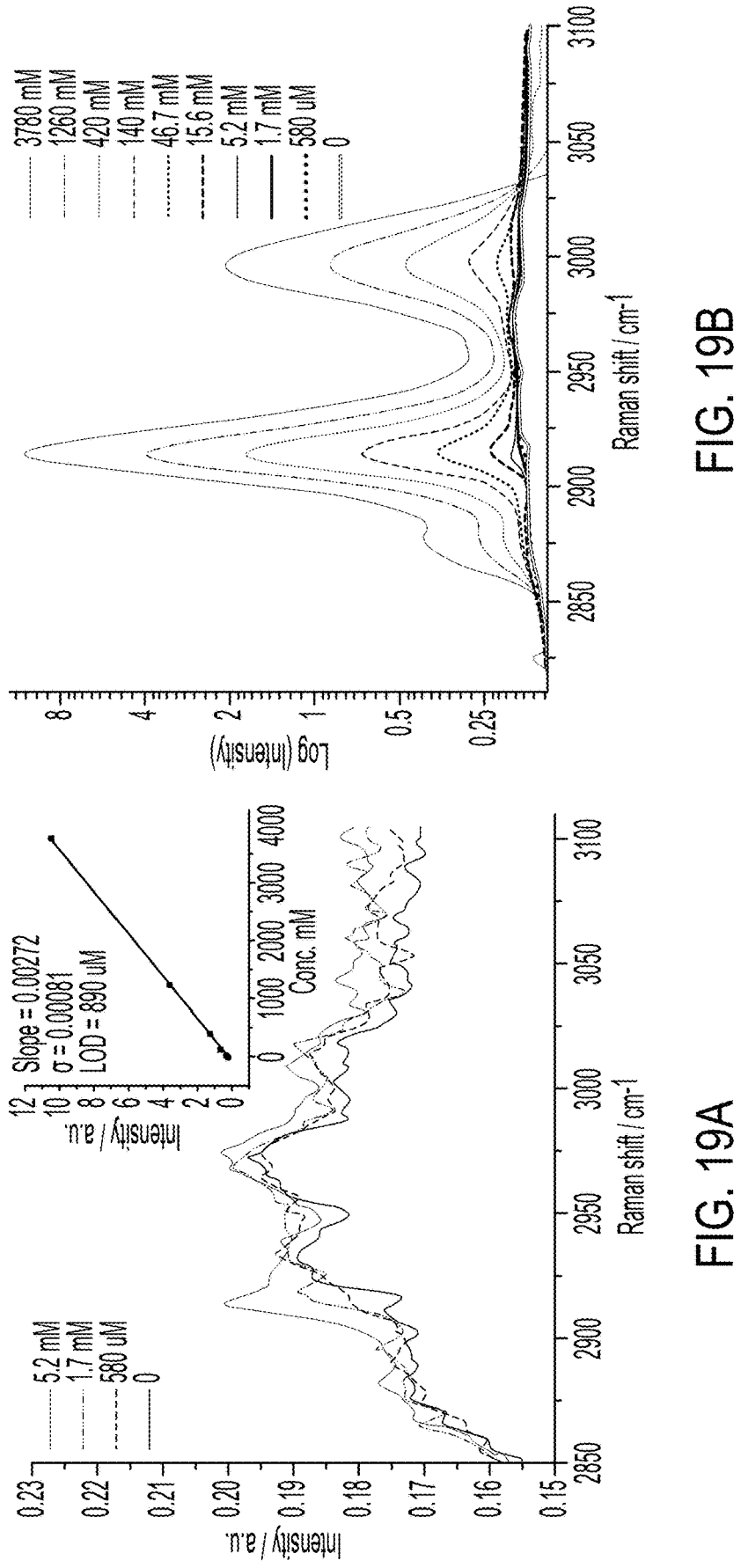

FIG. 19A shows NOPA-SRP signal with a gradient concentration of DMSO dissolved in DMSO-d6. Insert shows the signal intensity as a function of concentration.

FIG. 19B shows the complete data set of LOD measurement with NOPA-SRP as depicted in FIG. 19A.

Figures 20A, 20B:
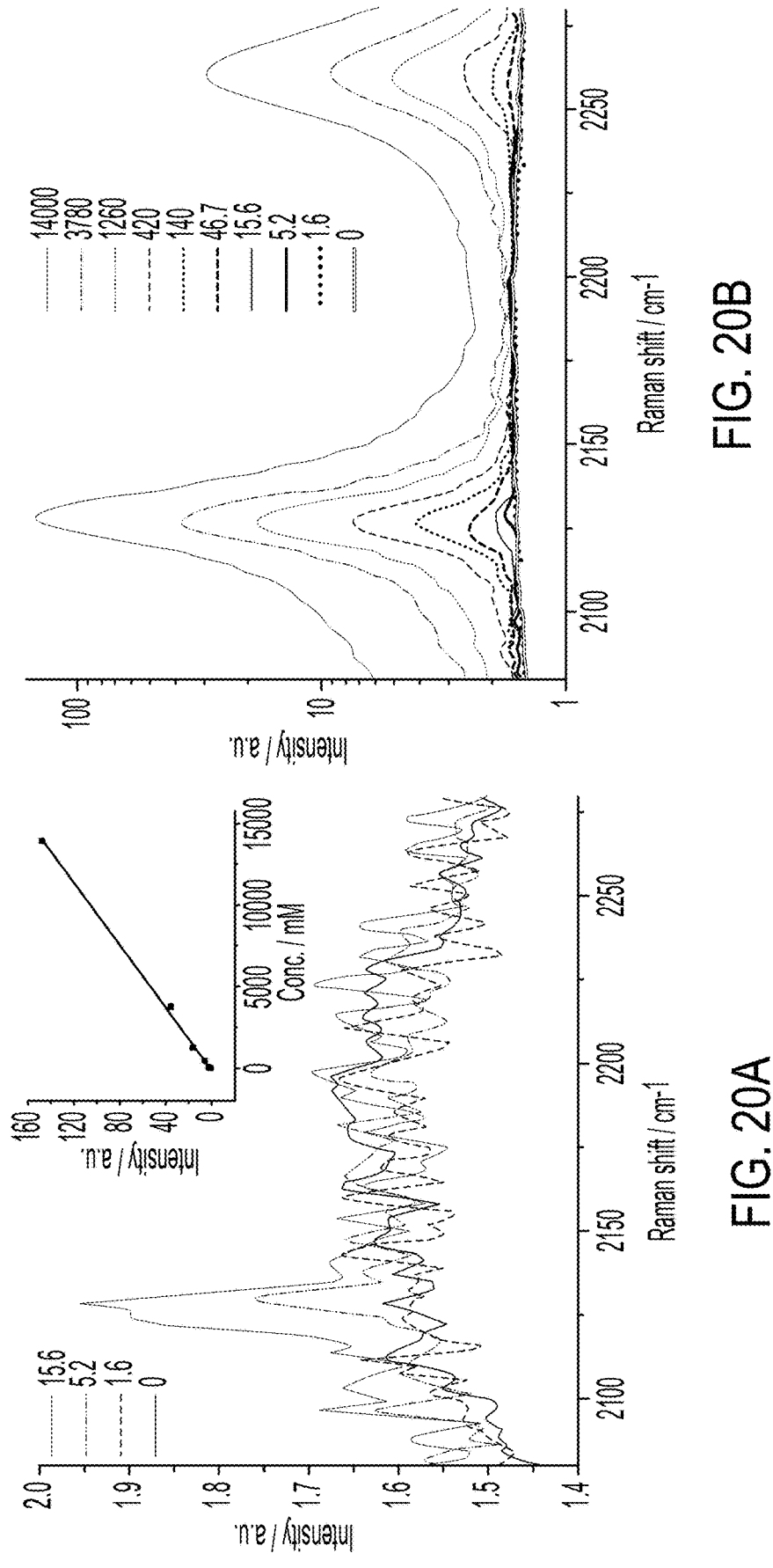

FIG. 20A shows NOPA-SRP signal with a gradient concentration of C-D bonds in DMSO dissolved in DMSO-d6. Insert shows the signal intensity as a function of concentration.

FIG. 20B shows the complete data set of LOD measurement with NOPA-SRP as depicted in FIG. 20A.

Figure 21C:
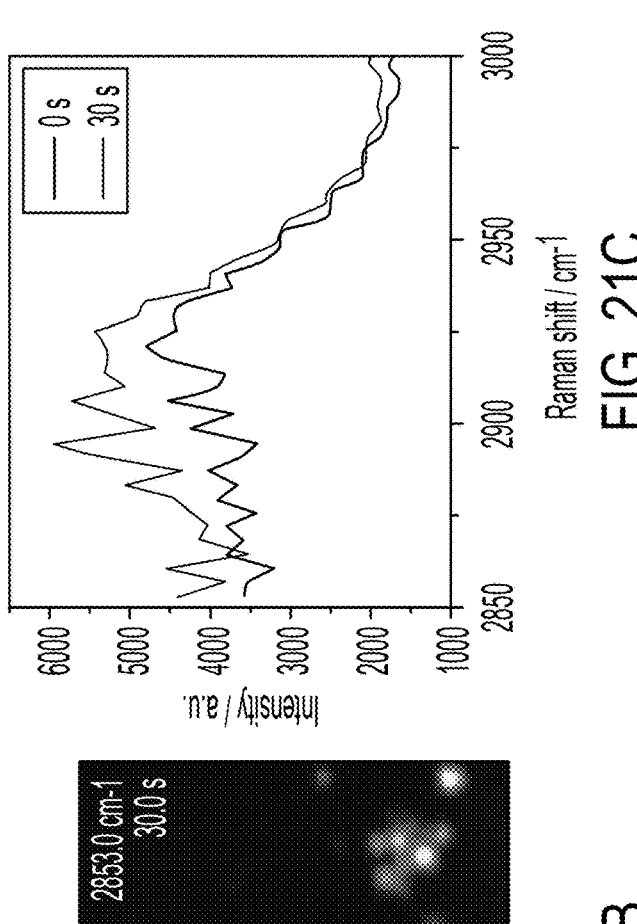
Figure 21B:
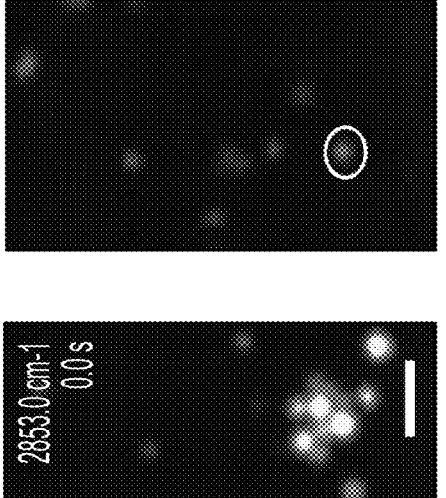
Figure 21A:
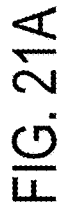

FIG. 21A shows video-rate hyperspectral SRP imaging of live Hela cells at 0 s.

FIG. 21B shows video-rate hyperspectral SRP imaging of live Hela cells as 30 s.

FIG. 21C shows that the spectrum of moving lipid droplets can be measured. Scale bar: 2 μm.

Figures 22A, 22B:
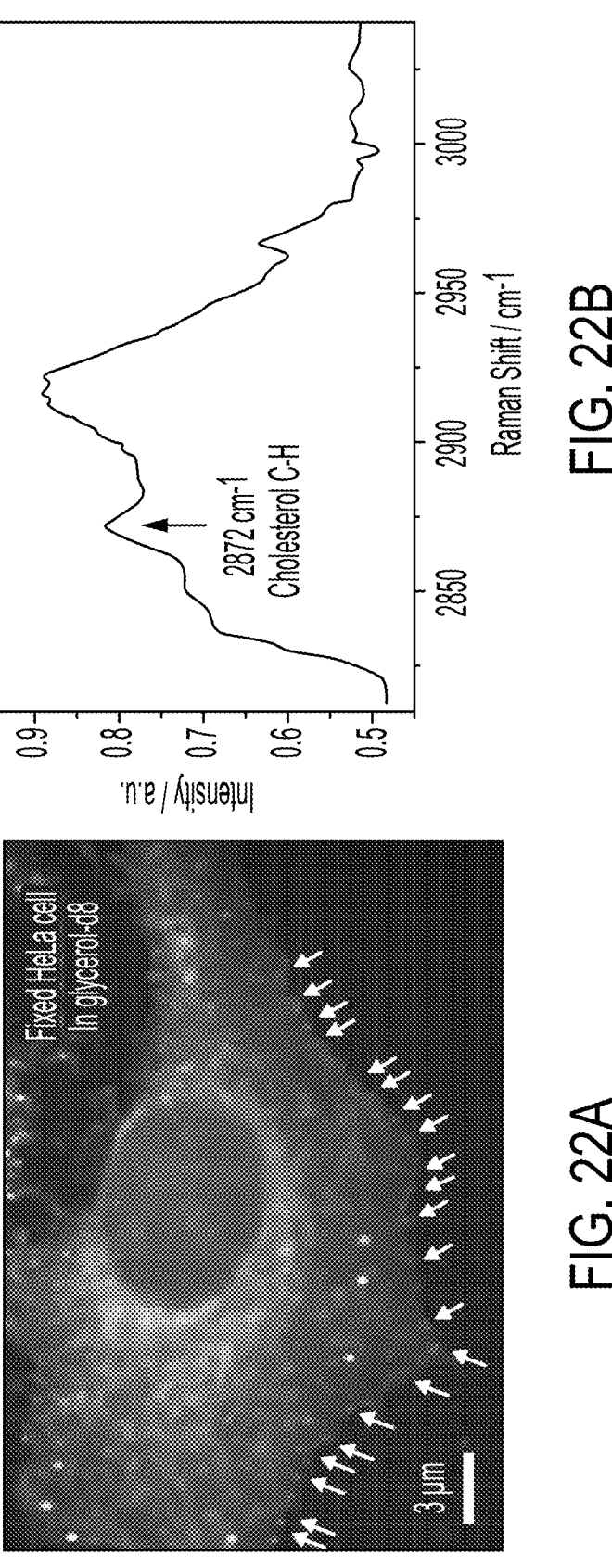

FIG. 22A shows NOPA-SRP imaging of fixed Hela cells immersed in glycerol-d8.

FIG. 22B shows the spectrum of the granules on the cell membrane in FIG. 22A as indicated by the arrows therein.

DETAILED DESCRIPTION

The subject technology overcomes many of the prior art problems associated with stimulated Raman microscopy while recognizing the advantages of using an OPA source as opposed to an OPO source due to SRP's decreased sensitivity to laser noise relative to SRS. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always at a higher elevation).

SRP microscopy, with superior sensitivity than SRS, functions by measuring the thermal lensing effect caused by SRP effect. That SRP effect can induce Kelvin scale temperature rise at the focal center of SRS and confirm the simulation result with fluorescence thermometer measurement. On that basis, an SRP microscope can be developed that measures the thermal lensing effect of SRP. Surprisingly high modulation depth (~22.3%) can be observed in SRP measurement, much higher than in SRS (~0.04% 23) with identical average laser power. Arising from the high modulation depth, very high sensitivity is obtained from SRP microscope. SRP allows for versatile applications of microscopy in bio-imaging at different spatial scales and Raman bands.

Figure 1A:
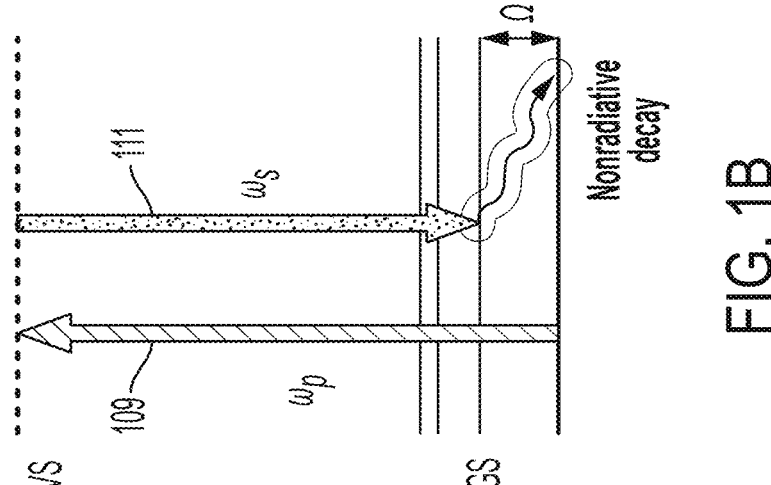
FIG. 1A. is a schematic of stimulated Raman scattering (SRS).
Figure 1B:
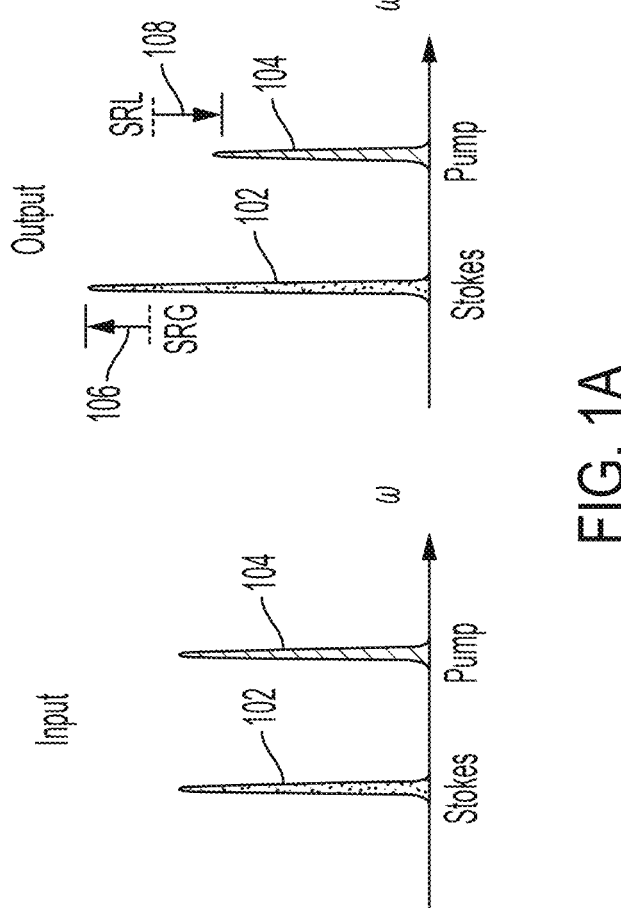
FIG. 1B is a schematic of the stimulated Raman photo-thermal (SRP) effect.
Figures 1C, 1D:
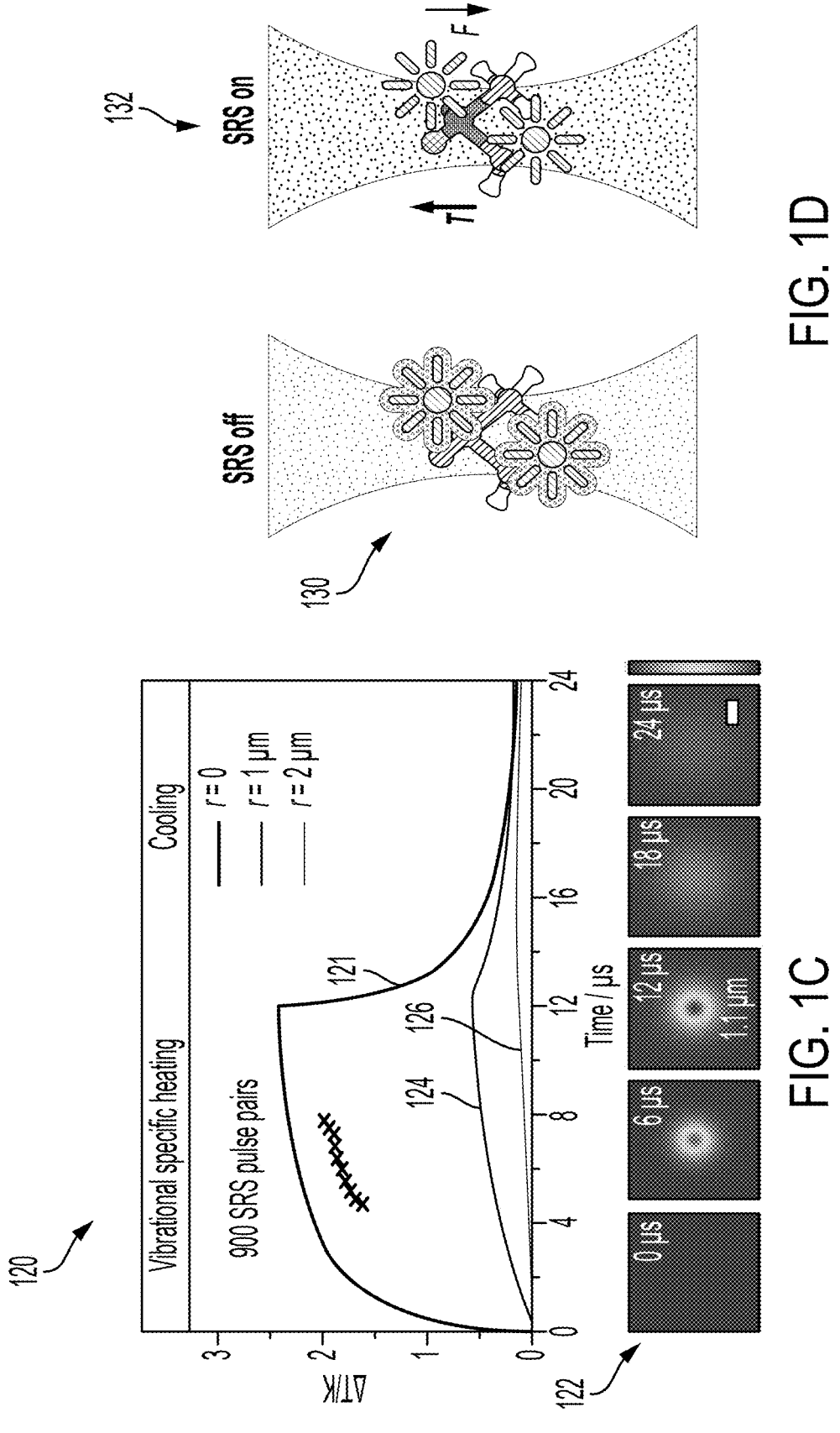
FIG. 1C is a graph of a simulation of temperature rise induced by SRP in temporal and spatial domains.
FIG. 1D is an illustration of fluorescence thermometer measurement of SRP-mediated temperature rise.
Figures 1E, 1F:
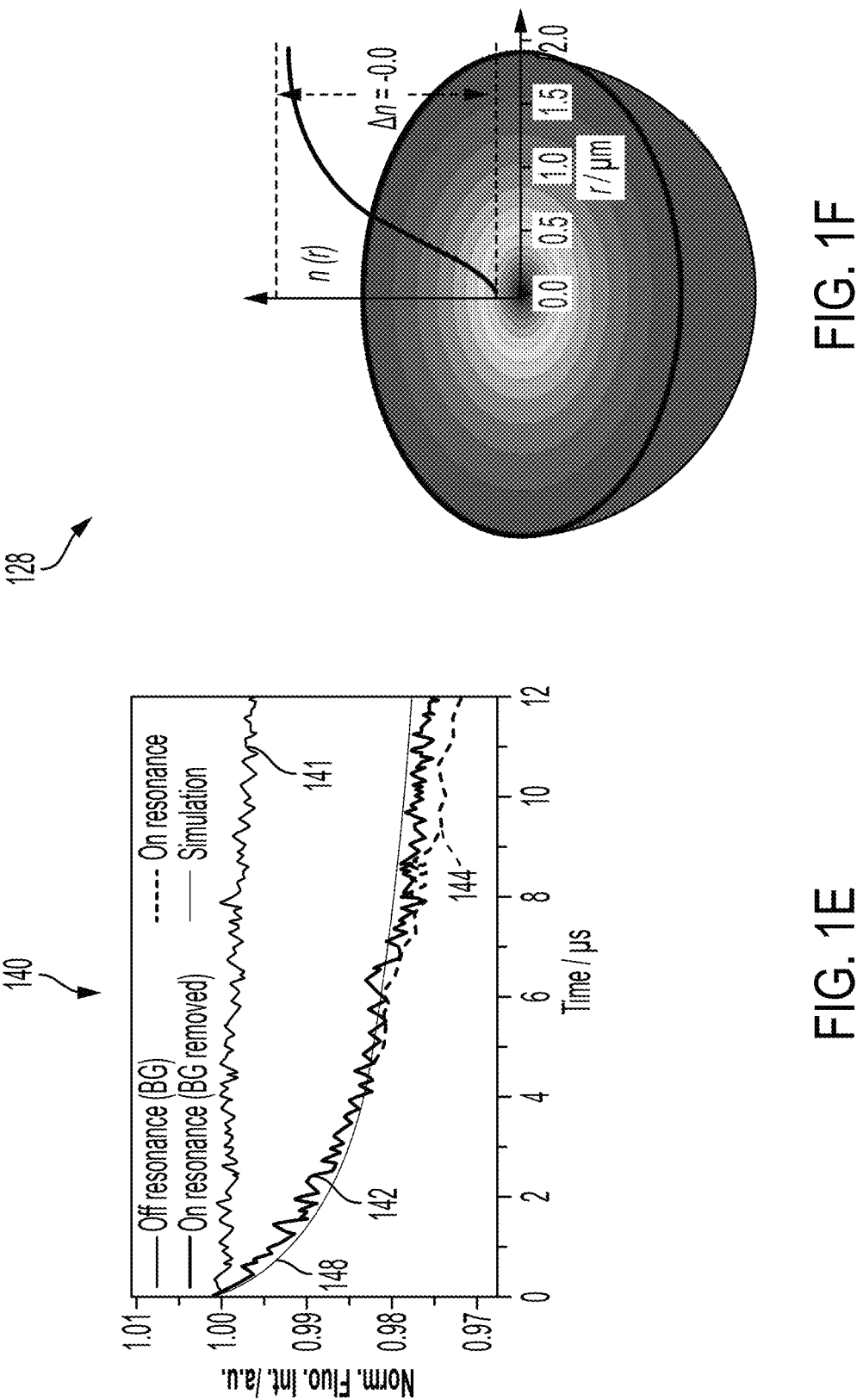
FIG. 1E is a graph of Fluorescence intensity of rhodamine B in DMSO during an SRS process.
FIG. 1F is a simulated profile of thermal lens induced by SRP in pure DMSO.

Referring now to FIGS. 1A-1F, the theoretical simulation and experimental observation of the SRP effect is shown. More particularly, FIG. 1A shows a schematic of an exemplary pump 102 and stokes pulse 104, and stimulated Raman gain 106 and loss 108. FIG. 1B is a schematic of the stimulated Raman photothermal (SRP) effect. FIG. 1C shows a simulation of temperature rise induced by SRP in temporal (graph 120) and spatial (images 122) domains, with a spatial scale bar: 1 μm. FIG. 1D shows the illustration of fluorescence thermometer measurement of SRP-mediated temperature rise with SRS off (130) and SRS on (132). FIG. 1E is a graph 140 of fluorescence intensity of rhodamine B in DMSO during an SRS process. FIG. 1F is a simulated profile 128 of thermal lens induced by SRP in pure DMSO.

Quantitatively, for an SRL measurement with modulation transfer scheme, the relationship between measured pump laser intensity Ip, modulation depth η, and estimated number of transferred photons per pulse ΔN can be written as:

$$\eta = \frac{2 \cdot \Delta N \cdot h\omega_p \cdot f_{rep}}{I_p}$$

where h is Plank's constant, $\omega_p$ is pump wavenumber, and $f_{rep}$ is the repetition rate of laser source. With this, one can easily estimate the energy deposition per pair of SRS pulses by:

$$E = \Delta N \cdot h\omega R$$

Where $\omega_R$ is the target Raman shift. Measurement has been published that with 25 mW (intensity modulated to 50% duty cycle) and 15 mW on sample powers for 80 MHz Stokes and pump beams, respectively, the SRS modulation depth on 2913 cm$^{-1}$ mode of dimethyl sulfoxide (DMSO) reached 0.04%. By inserting these measured values into the equations, it can be obtained that the energy deposition per pair of laser pulses is 8.7 fJ, equivalent to 0.7 μW with 80 MHZ repetition rate.

With the energy deposition estimation, we applied Fourier's law to build a finite unit model 630 (FIG. 5B) to quantitatively simulate the SRP induced temperature rise in pure DMSO. Simulation results (graph 120) showed that (FIG. 1C), when using an objective with N.A.=0.8, and routinely used laser power (25 mW and 50 mW for pump and Stokes, respectively, on sample), the temperature rise at the center of the laser focus can reach as high as 2.4 K after 12 μs of SRS heating (graph line 121).

The simulation results were then experimentally confirmed with fluorescence thermometer. It has been documented that the emission intensities of some fluorophores change upon the change of temperature, for instance, the fluorescence intensity of Rhodamine B will decrease by ~2%/K at around room temperature. This property has been utilized in mid-infrared photothermal spectroscopy with decent results. This method can be adapted to measure the temperature rise at SRS focus, with Rhodamine B as the fluorescence thermometer.

When picosecond pump and Stokes lasers are focused into a DMSO solution of Rhodamine B, the Rhodamine B molecules can be electronically excited through multiphoton absorption. Meanwhile, when the beating frequency between pump and Stokes is tuned to resonate with Raman mode of DMSO, SRP will occur to rise the temperature and decrease the fluorescence intensity of surrounding Rhodamine B molecules (FIG. 1D). With this design and identical parameters as in the simulation, it was measured that the fluorescence intensity drops ~3% after 12 μs of on-resonance SRP, corresponding to ~1.5 K of temperature rise (graph line 144 of FIG. 1E). Without wishing to be held to any particular theory, it is believed that the difference between this value and the previous simulated result (2.4 K) arose from the different region of interest as well as uneven excitation of multiphoton fluorescence across the laser focus. The model was then updated to simulate the fluorescence change under the risen temperature, and the prediction agreed very well with the experimental results, as shown in FIG. 1E. The average temperature rise was measured across the whole laser focus, while the simulation result only showed the temperature rise at the center of the laser focus (~20 nm diameter). After taking weighted-average of temperature increases throughout the heating region and accounting for the two-photon excitation intensity of a Gaussian beam, the fluorescence change curve (graph line 144) aligned closely with the simulation (graph line 148).

The elevated local temperature can modulate the local refractive indices through thermal-optic effect. At the moment of t=12 μs, the SRP heating causes a refractive index change of −0.0011 at the focal center. That temperature field, and therefore refractive indices field, extends ~2 μm into the surroundings through heat propagation, where the temperature and refractive indices change is ~5% as high as at the focal center.

Figure 2A:
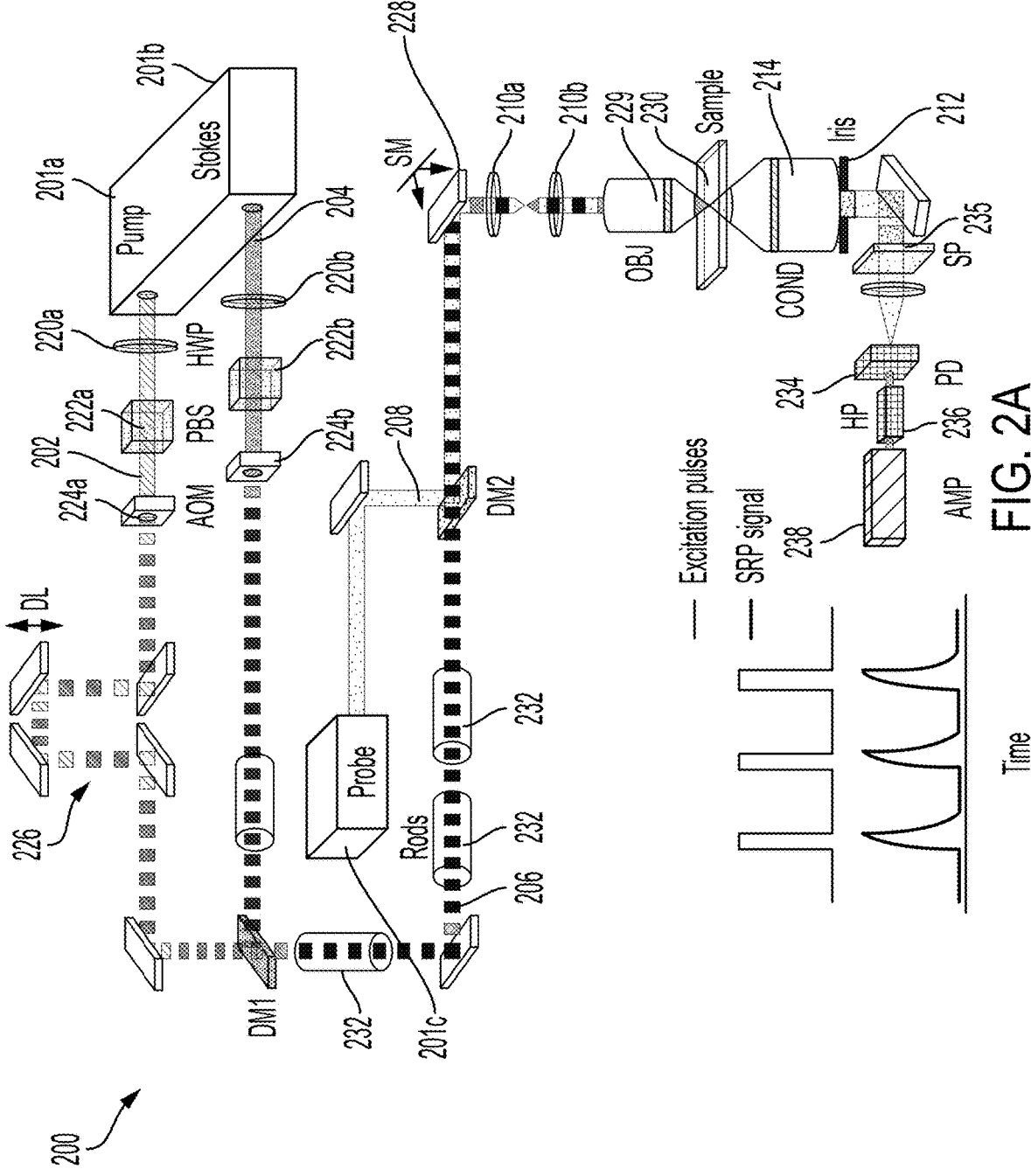
FIG. 2A is a schematic of an SRP microscope in accordance with the subject technology.

The presence of local refractive indices modulation gave rise to the potential to probe such thermal effect with a third beam of laser. An exemplary SRP microscope 200 setup is illustrated in FIG. 2A. The microscope 200 includes optical sources including lasers 201a, 201b, emitting a pump beam 202 and a Stokes beam 204. An additional optical source in laser 201c provides a probe beam 208. The system includes dichroic mirrors 216a, 216b which direct the lasers and facilitate combining of the pump and Stokes beams 202, 204 into a combined pump beam 206, while also allowing the pump beam 206 to be collinearly aligned with the probe beam 208. The pump beam 202 travels through a half-wave plate 220, a polarizing beam splitter 222, an acousto-optic modulator 224, and a delay line 226. The Stokes beam 204 travels through a half-wave plate 220b, a polarizing beam splitter 222b, and an acousto-optic modulator 224b before combining with the pump beam 202. The combined pump beam 206 and probe beam 208 pump beam travel are directed colinearly toward the sample 230 (i.e. along a shared optical path) and are scanned by scanning mirror 228 before traveling through lenses 210a, 210b, objective 229, and then reaching the sample 230.

The SRP microscope 200 senses the local refractive index modulation using the third continuous wave beam 208. The synchronized pump and Stokes pulse trains 202, 204 are intensity-modulated by the two acousto-optic modulators (AOM, 204a, 204b), combined, and chirped by glass rods 232. Here, chirping of femtosecond pulses generates spectral focusing for excitation of specific Raman modes. The probe beam 208 is collinearly aligned, along a shared optical path, with the SRS beams 202, 204. The pair of lenses 210a, 210b adjusts the collimation of the probe beam 208 to make the probe laser 201c focus axially off the SRS focus, thereby maximizing the photothermal signal. An iris 212 at the back focal plane of the condenser lens 214 is set to an NA of 0.3 or 0.4 to convert the probe beam refraction modulation to intensity modulation. An optical detector 234 (e.g. a fast photodiode 234) detects the probe beam intensity after passing through a spectral filter 235. The detected signal is then provided to a highpass filter 236 and a broadband amplifier 238. The SRP modulation induced by synchronized pump and Stokes pulses is digitized in real time by a high-speed digitization card.

It should be understood, that other typical optical components (e.g. lenses, mirrors) and/or electrical components (power supplies, amplifiers, processing equipment) may be included to allow the microscope 200 to function as described herein. Further, the various components of the microscope 200 can be implemented using different components than those particularly shown and described, as would be understood by one of skill in the art. Unlike SRS, both the pump and Stokes beams 202, 204 are intensity-modulated in the SRP microscope 200.

In summary, the SRP microscope functions with a pair of synchronized pulse trains that are intensity modulated, combined, and chirped to excite the SRS process, and a third probe beam can then be then collinearly aligned with the SRS beam. A pair of lenses can be set to separately adjust the collimation of the probe beam, to make the probe laser focus slightly offset away from the SRS focus, to maximize the contrast of photothermal measurement. An iris at the back focal plane of the condenser lens can be used to convert the probe beam refraction modulation to intensity modulation. When SRP occurs, the local heating will effectively create a divergent lens, which reduces the effective N.A. of the probe laser focus and thus increases the transmission of the probe beam through the iris.

The modulation scheme can be designed based on the character of SRP measurement. Since the SRS interaction intensity is proportional to the product of pump and Stokes peak power, with conserved average laser power, reduction of laser duty cycle will lead to higher laser peak power, hence more SRS energy deposition. Experimental results shown in FIGS. 6A and 6B confirmed this idea and showed much higher signal intensity with lower duty cycle, and the duty cycle was set to 5~10% as a compromise between signal intensity and laser power. Under 5% duty cycle, the SRP induced modulation on the probe beam was so strong that the signal in the D channel could be directly measured without any amplification. With reasonable laser powers on sample to excite the C-H symmetric stretching mode (2913 cm$^{-1}$) of pure DMSO, the modulation depth reached 22.3%, which was 500-fold higher than SRS modulation depth with identical average power (0.04%). The tremendously higher modulation depth built the foundation for better sensitivity.

Figure 2B:
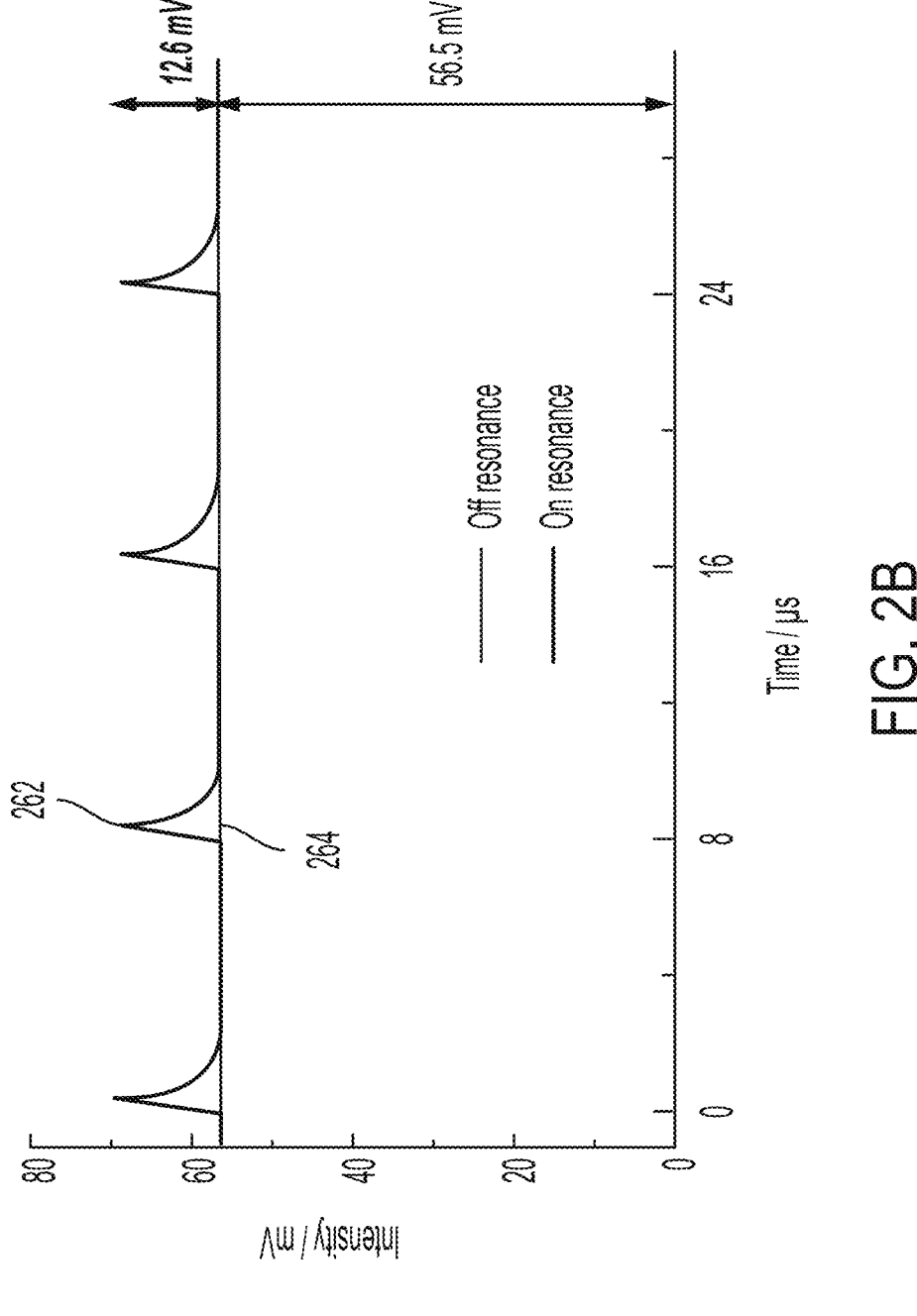
FIG. 2B is a graph of traces that were obtained using the microscope of FIG. 2A.
Figure 6A:
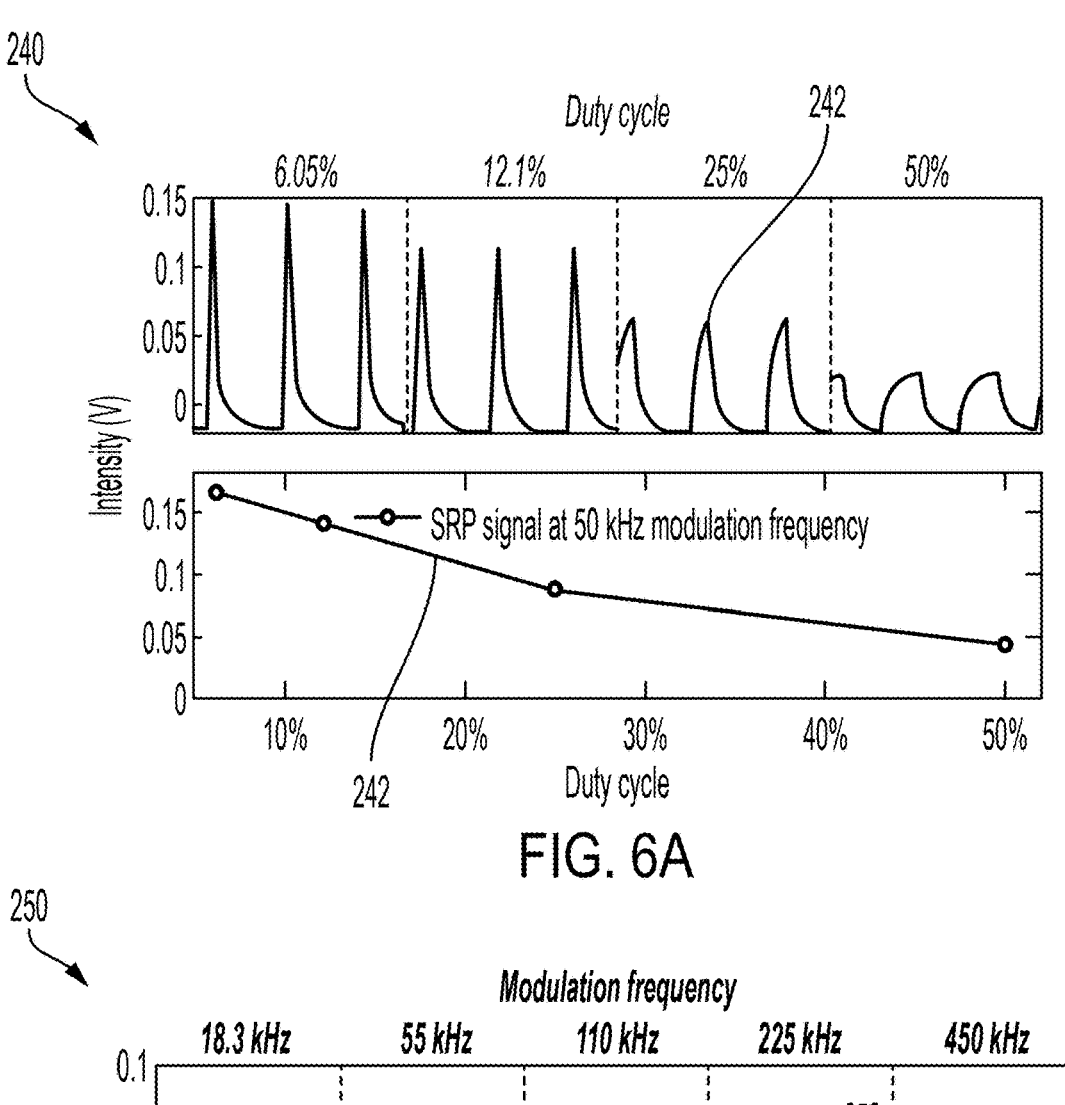
FIG. 6A is a graph of the measured SRP signal as a function of modulation duty cycle of the microscope of FIG. 2A.
Figure 6B:
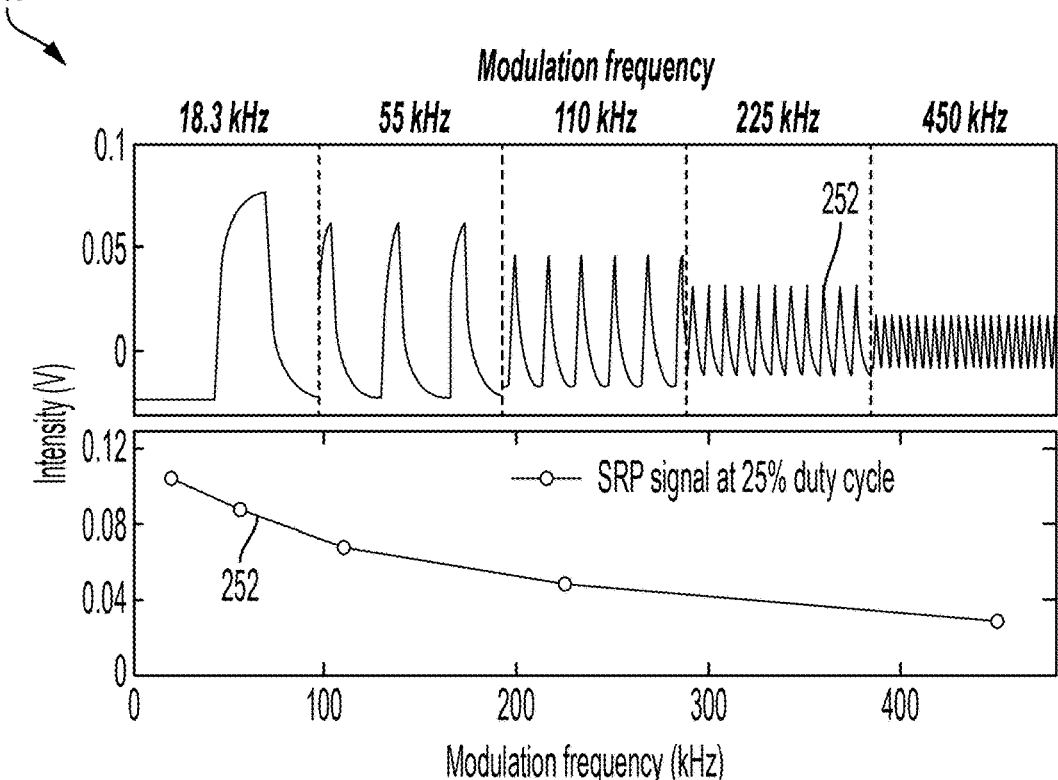
FIG. 6B is a graph of measured SRP signal as a function of modulation frequency of the microscope of FIG. 2A.

Referring now to FIGS. 2B and 6A and 6B, an experimental setup of an SRP microscope is shown generally at 200 (FIG. 2A), as well as characterizations of SRP modulation depth as a function of duty cycle and modulation frequency. Graph 240 (FIG. 6A) shows measured SRP signal 242 as a function of modulation duty cycle. Graph 250 (FIG. 6B) shows measured SRP signal 252 as a function of modulation frequency. Graph 260 (FIG. 2B) shows on-resonance (262) and off-resonance (264) traces obtained with the Raman shift at 2913 cm$^{-1}$ and 2850 cm$^{-1}$, respectively, showing SRP generated a large (22.3%) modulation depth with DMSO as the sample.

Unlike SRS, both the pump and Stokes beams 202, 204 are intensity-modulated in the SRP microscope 200. SRS intensity is proportional to the product of the pump and Stokes peak power. With conserved average laser power, reduction of laser duty cycle leads to higher laser peak power, and hence more SRS energy deposition. As shown in the graph 240 of FIG. 6A, results confirmed this and showed much higher SRP signal intensity (graph line 242) with a lower duty cycle. In SRP imaging applications, the duty cycle was set to 5~10% as a compromise between signal intensity and laser power. Notably, match filtering can be applied to the low duty cycle SRP signal to further improve the SNR. Another key parameter is the modulation frequency. As shown in the graph 250 of FIG. 6B, lower frequency shows higher signal intensity (graph line 252) due to longer heat accumulation time but suffers more from the 1/f laser intensity noise. However, it also reduces the imaging speed and compromises the spatial resolution. 125 kHz was chosen to balance these factors.

For a pure liquid, under conditions of a 5% duty cycle and 125 kHz modulation frequency, the induced modulation on the probe beam 208 was so strong that we could directly measure the SRP signal in the direct current channel without any amplification (graph 260 of FIG. 2B). With reasonable laser powers on the sample 230 to excite the C-H symmetric stretching mode (2913 cm$^{-1}$) of DMSO, the modulation depth reached 22.3%. This is >500-fold higher than the SRS modulation depth (0.04%) with identical average power. The tremendously higher modulation depth lays the foundation for a better detection sensitivity.

The low duty cycle modulation also sharpened the waveform, and brought the signal to higher harmonics, where the conventional fundamental frequency lock-in demodulation method cannot fully appreciate the boosted signal intensity.

Figure 8:
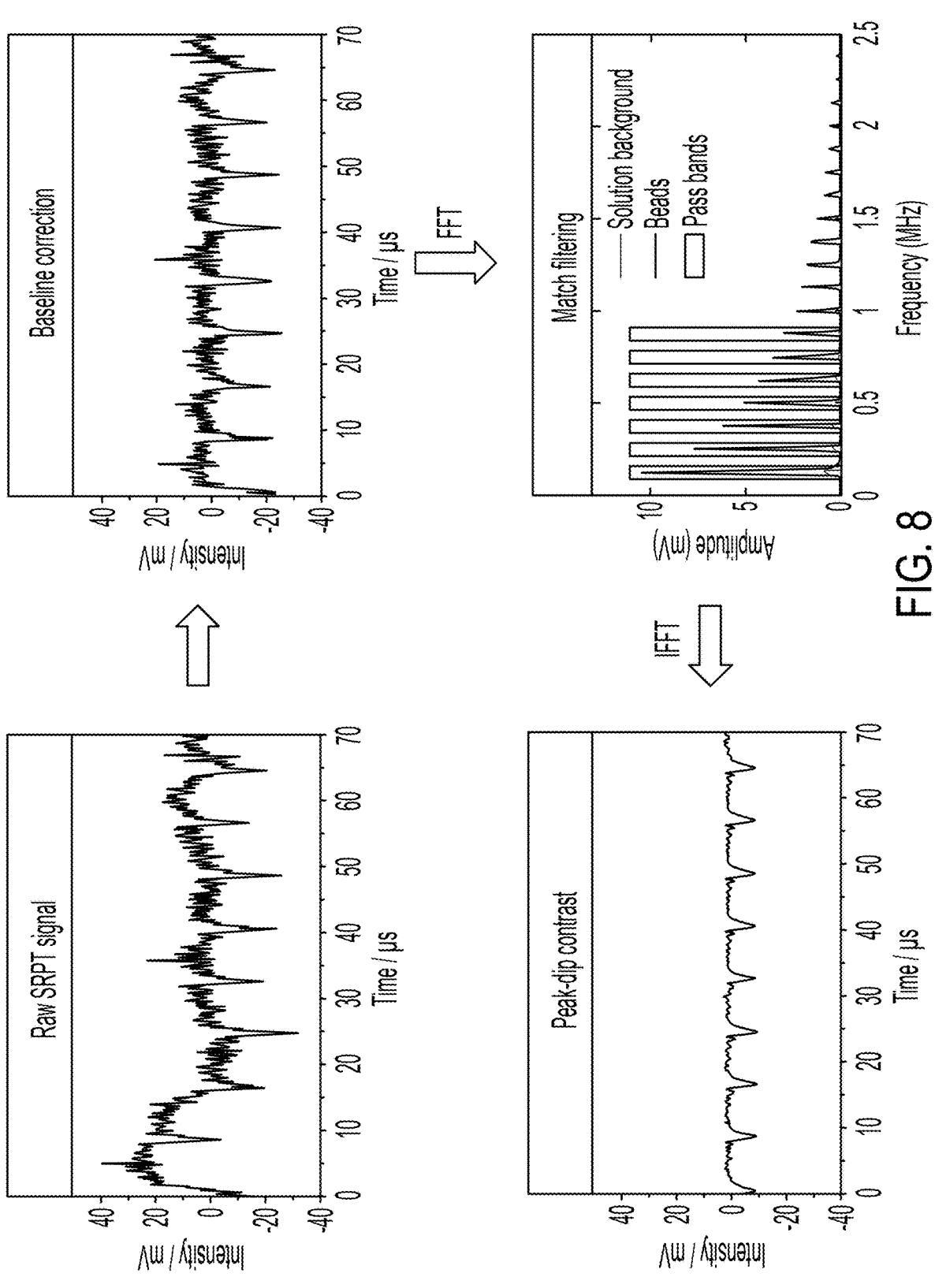
FIG. 8 shows typical thermal dynamic traces from SRPT measurement, and under different stages of data processing.

To recover more signal from the sharp waveform, a matched filtering method that was previously applied in photothermal dynamic imaging was used. As shown in FIG. 8, by digitally filtering with a comb-like passband at the fundamental frequency and its harmonics in frequency domain, the non-modulated noises were well-rejected, while the photothermal dynamic trace was well preserved.

Intensive studies have shown that medium can also be a factor affecting photothermal signal intensity. It has been formulated that the relationship between photothermal signal intensity ($\Sigma PT$), thermo-optic coefficient ($\partial n/\partial T$) and heat capacity ($C_P$) can be described as follows:

$$\sum_{PT} = n\left|\frac{\partial n}{\partial T}\right|\frac{1}{C_p}$$

The most common medium in biological samples, i.e. water, has an unfortunately low thermo-optic coefficient ($-1.13\times10^{-4}$)42 and relatively high heat capacity (4181 J·kg$^{-1}$·K$^{-1}$), thus SRP signal can be weak when a sample is in water. To avoid the signal loss caused by water medium, a few common liquid mediums were investigated, as shown in FIG. 9.

It was recognized that glycerol helped maintain the signal intensity very well. At the same time glycerol showed the best bio-compatibility, as it was widely used in the mounting medium or clearing agent in bio-imaging. Simulation of thermal lens comparison is shown in FIG. 10. This also agrees with the previous theories that the peak refractive index change in glycerol medium is ~2.5-fold as high as in water, with identical heat sources (100 nm PMMA nanoparticle under on-resonance SRP heating). Therefore, glycerol was chosen as a main component of the medium for various SRP experiments as described herein. Also, considering the Raman-active vibrational features of glycerol itself, deuterated glycerol (glycerol-d8) was applied for SRP measurement at C-H and fingerprint regions.

The performance of SRP microscopy was characterized with well-defined samples. The limit of detection (LOD) of bulk sample was measured first, focusing on the 2913 cm$^{-1}$ mode of DMSO. To keep the thermal and optical properties constant throughout the measurement, deuterated DMSO (DMSO-d6) was used as the solvent to dilute DMSO. As shown in FIG. 3A, the SRP spectrum was very clean and smooth with high concentration DMSO, and the signal was still observable with concentration as low as 15.4 mM. The LOD was calculated with equation: LOD=3σ/k, where σ was the standard deviation of the baseline, and k was the slope of the intensity-concentration linear calibration curve. Calculation yielded a sub-millimolar level LOD value of 0.93 mM, which was around 40-fold better the SRS LOD under identical average laser powers.

Referring to FIGS. 3A-3D, SRP spectroscopy and imaging performance characterizations are shown. Graphs 310, 320 show SRP signals and SRS signals, respectively, with gradient concentrations of DMSO dissolved in DMSO-d6. Each contain an insert (312, 322, respectively) which shows the signal intensity (314, 324, respectively) as a function of concentration. FIGS. 11A (SRP) 11B (SRS) show the complete data set for the LOD measurement shown in FIGS. 3A and 3B.

Figure 3C:
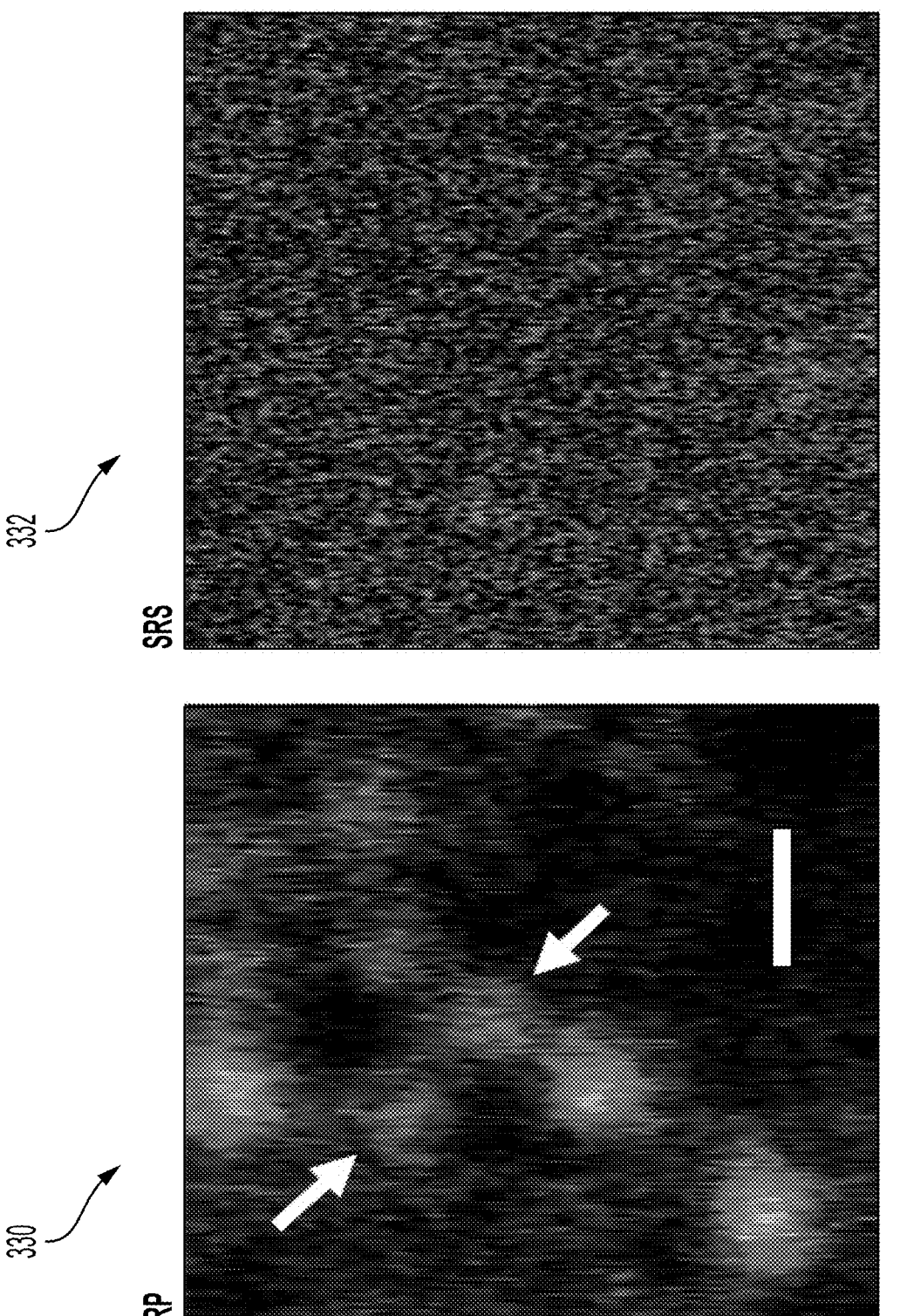
FIG. 3C shows SRP and SRS images obtained with a microscope in accordance with the subject technology.
Figure 3D:
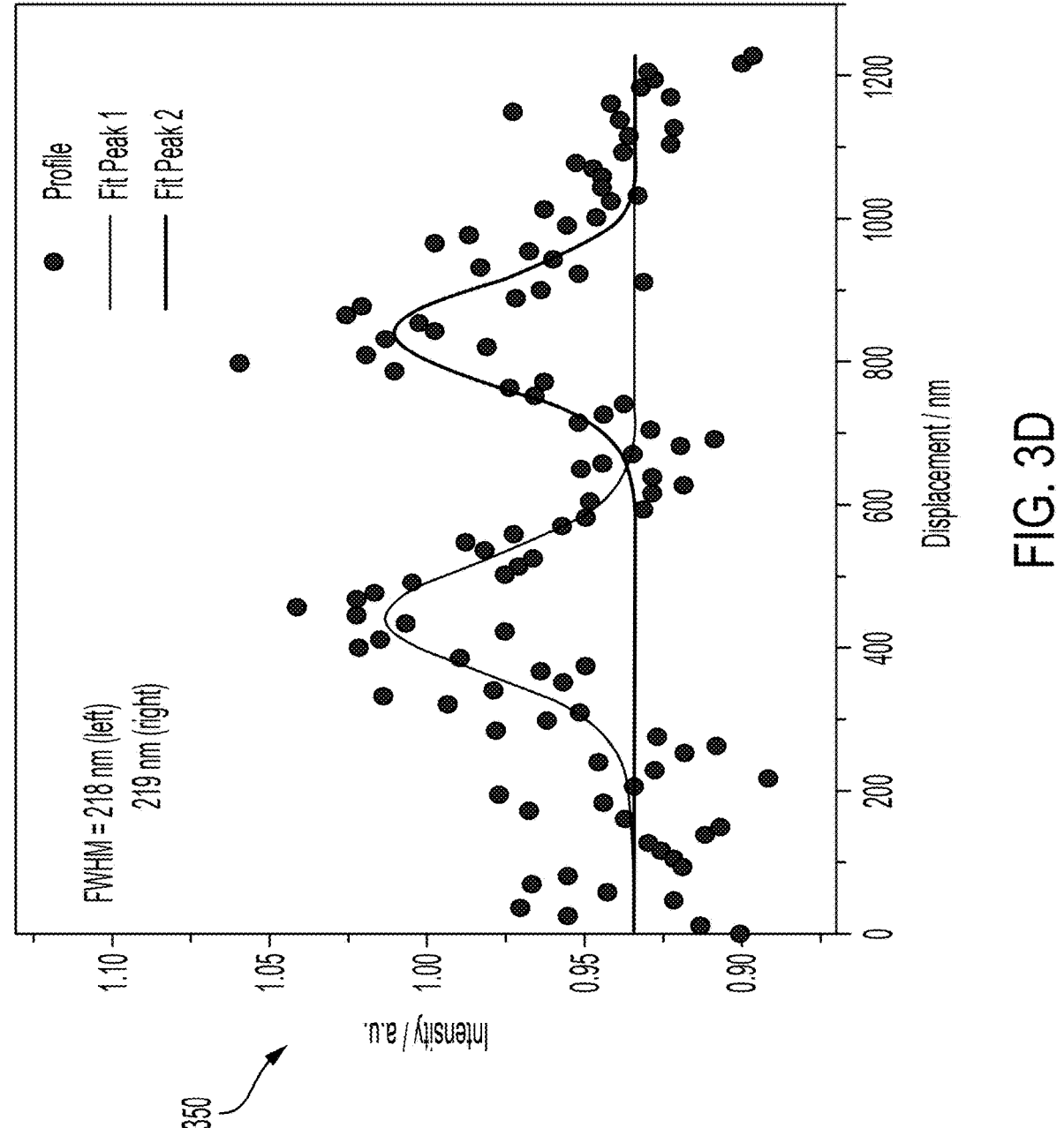
FIG. 3D is a graph of the Gaussian fitting full width at half maximum (FWHM) of a bead profile, obtained with a microscope in accordance with the subject technology.

FIG. 3C shows an SRP image 330 and an SRS image 332 of 100 nm PMMA beads at 2950 cm$^{-1}$ with the same average power, at the same field of view (Scale bar: 500 nm). The beads were immersed in d8-glycerol. FIG. 3D is a graph of the Gaussian fitting FWHM of bead profile (218 nm).

Similar experiments were also performed on 1,7-Octadiyne (FIGS. 12A-12D) and DMSO-d6 (FIGS. 13A-13D). In both cases, SRP showed superior sensitivity than SRS with conserved average power.

FIGS. 12A-12D show LOD of 1,7-Octadiyne in SRP and SRS measurement. SRP (FIG. 12A) or SRS (FIG. 12B) signal with gradient concentration is shown for 1,7-Octadiyne dissolved in DMSO with a concentration unit of mM. The respective inserts show the signal intensity as a function of concentration. FIGS. 12C and 12D show the complete data set of LOD measurement with SRP (FIG. 12C) and SRS (FIG. 12D).

FIGS. 13A-13D show LOD of DMSO-d6 in SRP and SRS measurement. SRP (FIG. 13A) or SRS (FIG. 13B) signal with gradient concentration is shown for DMSO-d6 dissolved in DMSO with a concentration unit of mM. The respective inserts show the signal intensity as a function of concentration. FIGS. 13C and 13D show the complete data set of LOD measurement with SRP (FIG. 13C) and SRS (FIG. 13D).

Sensitivity improvement was also significant for small particle samples. With an SRP microscope, hyperspectral images of 100 nm Poly(methyl methacrylate) (PMMA) beads were successfully acquired as shown in FIG. 3C. The acquired SRP spectrum showed Raman peak of PMMA at 2950 cm$^{-1}$ which was well-distinguished from the background spectrum, with an SNR ~7.0 after BM4D denoising. NIR SRS measurement showed no contrast of 100 nm beads on the same sample with identical average laser power. Collectively, SRP showed significantly improved sensitivity compared to SRS, both for bulk samples and for small samples.

In the meantime, the introduction of a third probe beam at a shorter wavelength also helped improve the resolution of the measurement. The intensity profile across a pair of 100 nm PMMA beads was plotted, with the Gaussian fitted FWHM found to be ~218 nm. Deconvolution with the beads size determined the point spread function (PSF) to be ~194 nm, which was smaller than the theoretical resolution limit of SRS under the same condition (~217 nm, FWHM of Airy disk). The FWHM was still larger than the theoretical resolution limit yielded from the product of all three PSFs (~167 nm), probably due to the imperfect overlap between the probe and SRS focus on axial axis. Overall, SRP showed better performance than conventional SRS in terms of both sensitivity and resolution.

Figure 4B:
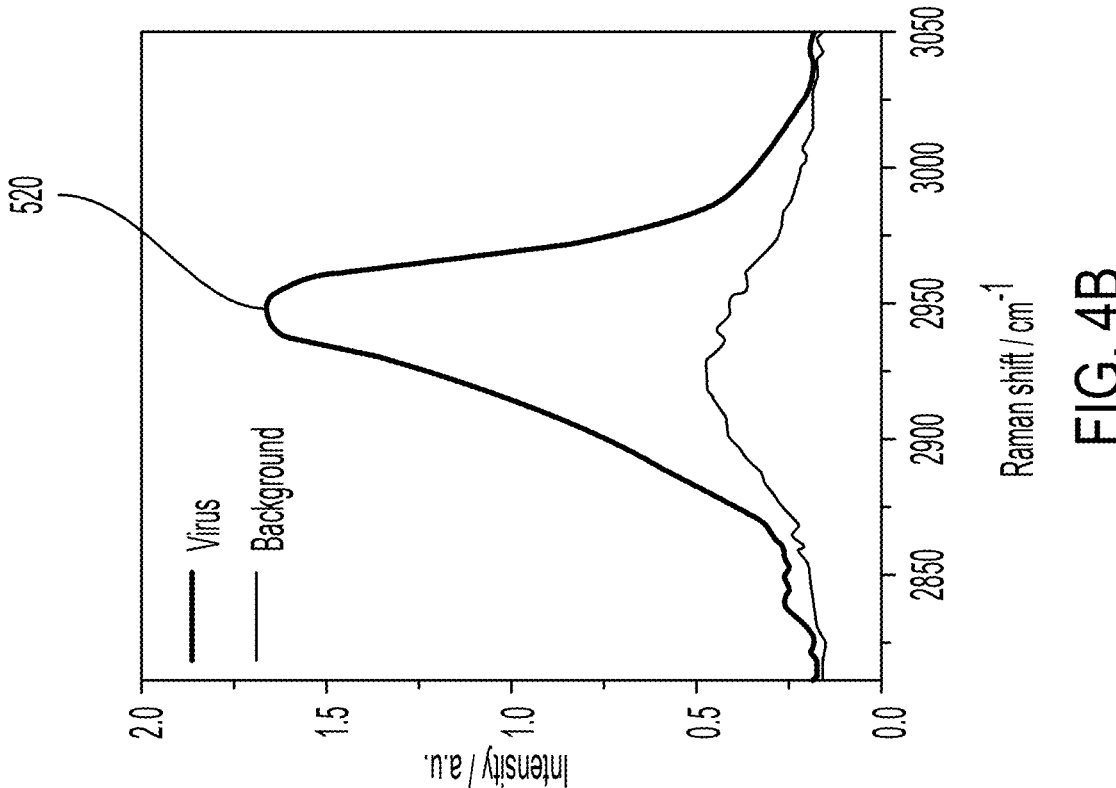
FIG. 4B shows single virus Raman spectrum at C-H region, acquired from a single virus in FIG. 4A.
Figure 4A:
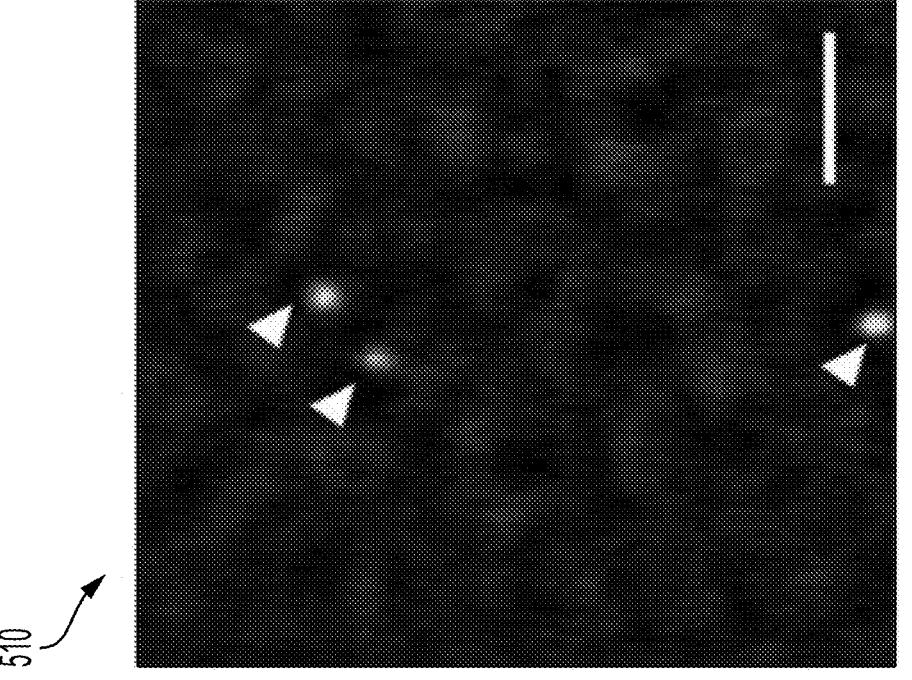
FIG. 4A shows SRP imaging of single varicella-zoster virus, 2950 cm$^{-1}$. Scale bar: 2 μm.

That outstanding performance encouraged exploration of the potential of SRP in bio-imaging applications. Inspired by the improved sensitivity on small particle samples, the capability of SRP in viral particle imaging was tested. As shown in image 510 of FIG. 4A, single varicella-zoster virus (diameter≈180 nm 43) could be clearly resolved from the background on an SRP microscope with an SNR ~20. The SRP spectrum of single virus (graph line 520 of FIG. 4B)) peaked at 2950 cm$^{-1}$, indicating strong contribution from the nucleotide at the core of the virus.

Figure 4D:
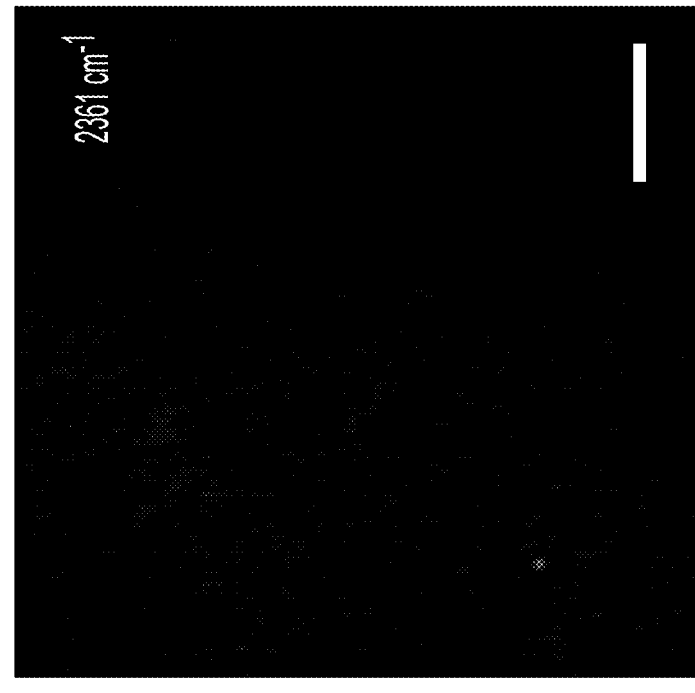
FIG. 4D shows C-D imaging of heavy water cultured Bacteroides at 2361 cm$^{-1}$ off-resonance. Scale bar: 3 μm.
Figure 4C:
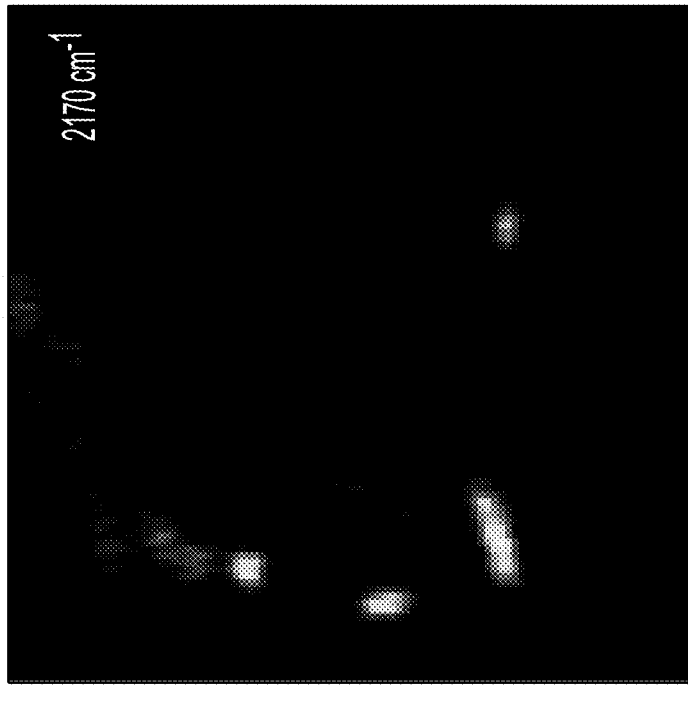
FIG. 4C shows C-D imaging of heavy water cultured Bacteroides at 2170 cm$^{-1}$ on-resonance. Scale bar: 3 μm.

SRP microscopy was also applicable in C-D region. Bacteroides cultured in heavy water were then tested as shown in FIGS. 4C and 4D. Decent contrast could be obtained in both regions, and off-resonance images showed little to no signal at the same field of view, confirming the Raman origin of the signals. Such results indicate the potential of SRP to be applied in metabolism imaging of bacteria.

Figure 4F:
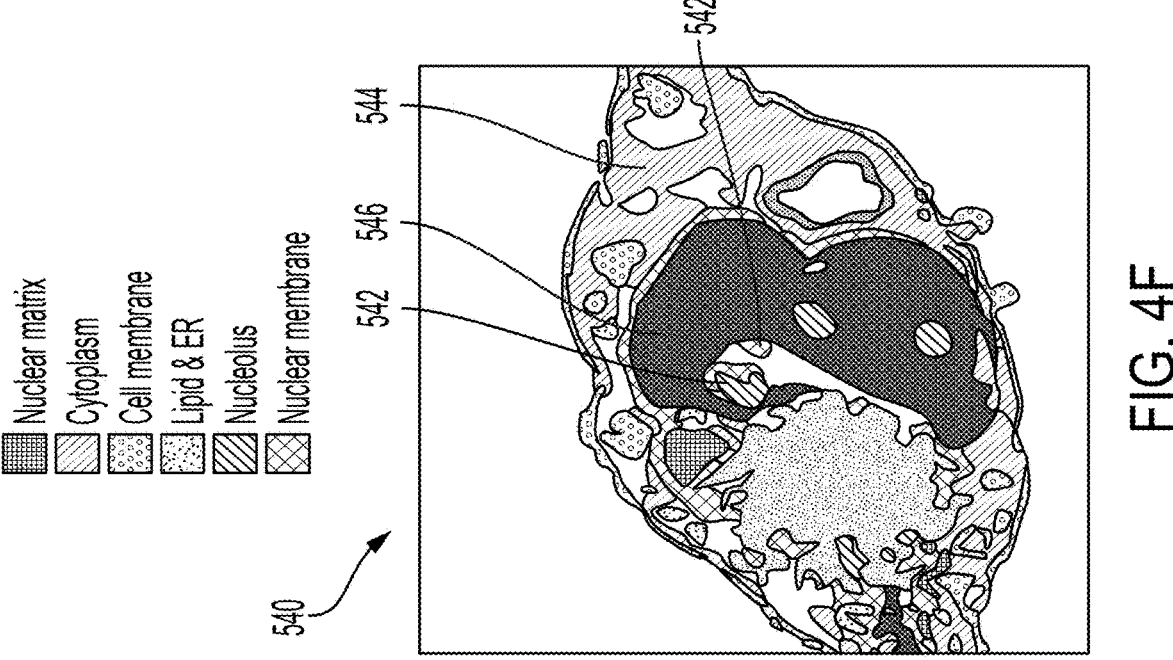
FIG. 4F shows a color-coded chemical map through manual phasor segmentation of FIG. 4E.
Figure 4E:
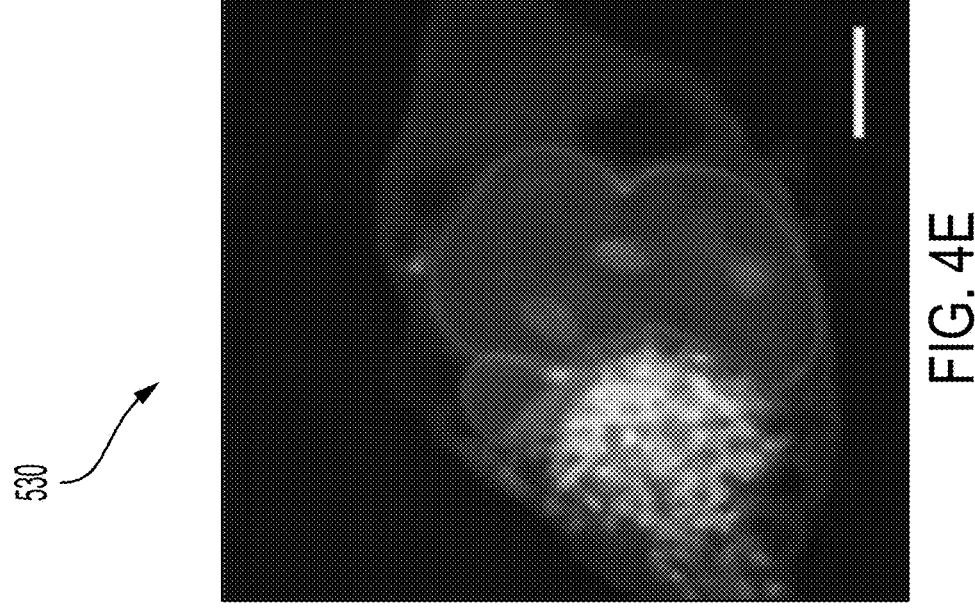
FIG. 4E shows an SRP image of a fixed Mia PaCa-2 cell immersed in glycerol-d8, at 2950 cm$^{-1}$, scale bar: 5 μm.

The signal improvement was better in lipid-rich region, hence the contrast from membrane is especially outstanding. MIA Paca-2 was selected as the test bed for cell imaging shown in image 530 of FIG. 4E. Glycerol-d8 was applied to replace the PBS buffer and immerse the cells to enhance the SRP contrast. With limited laser power, SRP provided very nice image contrast at C-H region. Phasor analysis was applied to segment the cellular compartments, where up to 6 different components could be well-separated out (as shown in image 540 of FIG. 4F). As shown FIG. 4F, the nuclear membrane 542 stood out from the cytoplasm 544 and the nuclear matrix 546, giving rise to the potential to apply SRP in membrane fine structure studies. This was probably due to the high thermos-optical coefficients and low heat capacities of membrane structures.

FIGS. 14A-14C show phasor analysis for SRP imaging of glycerol-d8 immersed Mia PACA-2 cells. FIG. 14A shows segmentation of the SRP image of glycerol-d8 immersed Mia PACA-2 cells in phasor domain. FIG. 14B shows mapping of each component from phasor analysis. FIG. 14C shows the SRP spectrum at C-H region for each component.

Figure 4H:
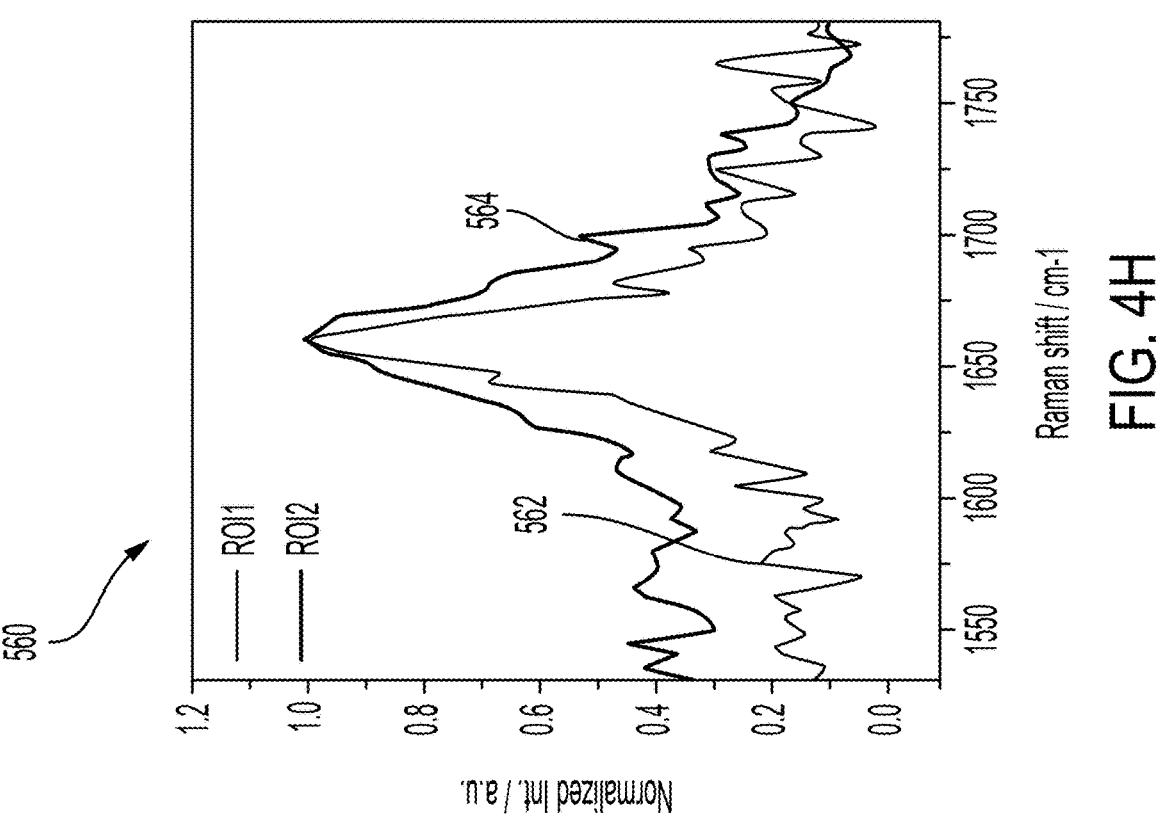
FIG. 4H shows single pixel spectrum at the circled region of interests (ROI) from FIG. 4G.
Figure 4G:
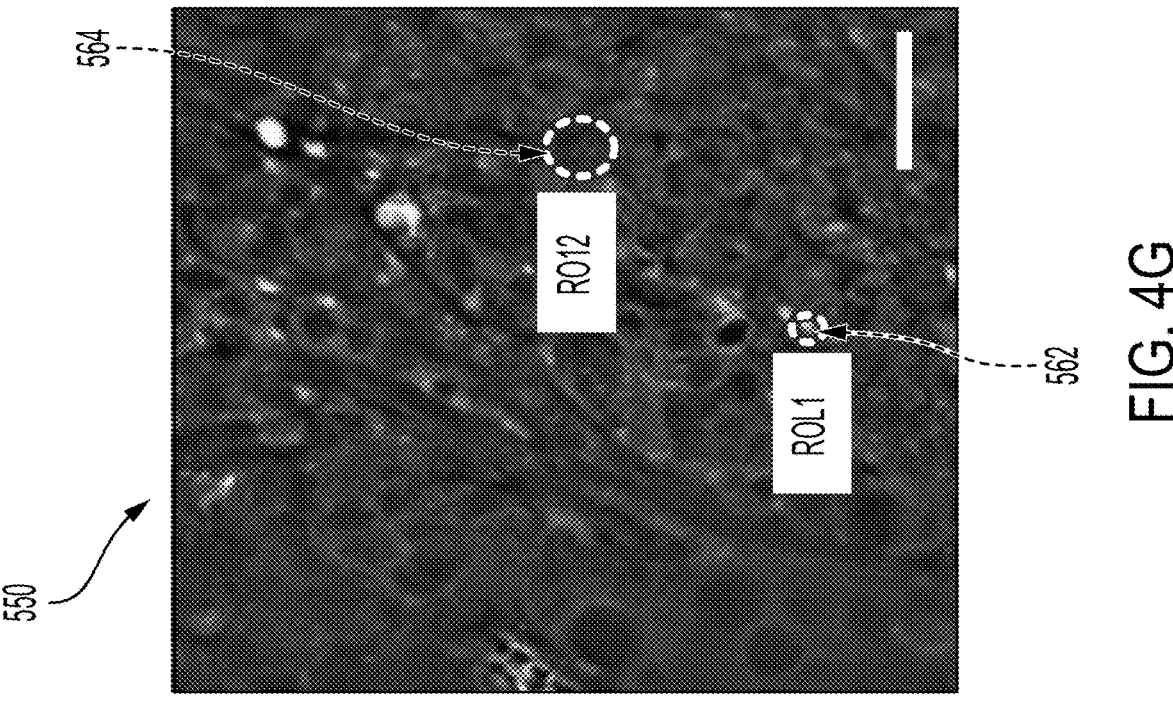
FIG. 4G shows SRP spectroscopic imaging of OVCAR-5 tissue, cleared with glycerol-d8, at 1650 cm$^{-1}$.

The high sensitivity of SRP also provided access to weak Raman bands, e.g. fingerprint region. FIG. 4G showed the SRP image 550 of a 10 μm thick OVCAR-5 tissue at 1650 cm$^{-1}$, targeting the Amide I and unsaturated lipid region. Despite the weak Raman signal at the fingerprint region, clear spectrum could still be resolved from the hyperspectral image stack and differentiate lipid (region of interests (ROI) 1) and protein (ROI2) species, as shown in graph 560 of FIG. 4H where the lipid (region of interest 1 (ROI 1), graph line 562) and protein (ROI 2, graph line 564) species are clearly differentiated.

Collectively, versatile bio-imaging applications have been demonstrated, scaling from single virus to large area tissues. SRP microscopy has been shown to provide superior detection sensitivity over conventional stimulated Raman imaging methods. The new method measured SRS signal from a completely different perspective of its Raman-induced photothermal effect. Starting from the physics of SRP process, the SRP heating and heat dissipation were accurately modeled and confirmed with fluorescence thermometer. An SRP microscope was built based on the principle of thermal lensing effect. Notably, exceptionally high (~22.3%) modulation depth was observed on SRP spectroscopy, which was >500-fold higher than on SRS (~0.04%). Such high modulation depth built the foundation for the high sensitivity of SRP. Measurements with very high sensitivity were achieved down to 0.93 mM DMSO or 100 nm PMMA nanoparticles, which were unreachable by conventional SRS. Versatile applications on bio-samples at different scales were also demonstrated. Collectively, SRP microscopy opens a new way to vibrational spectroscopic imaging with very high sensitivity.

Future refinement of SRP microscopy could bring even more sensitivity improvement. Most apparently, half of the total signal from thermal lensing was rejected at the detection end, which could certainly be recovered to boost the signal; also, in various embodiments, a shot-noise-limited CW laser may be used as the probe laser of SRP to help tremendously reduce the laser intensity noise in the measurement.

Recently developed stimulated Raman photothermal (SRP) microscopy, as described herein, is a highly sensitive chemical imaging technology. In SRP, a pump beam at $\omega p$ and a Stokes beam at $\omega s$ vibrationally excite the target molecules at the beating frequency ($\omega p$-$\omega s$). Subsequent vibrational relaxation on the picosecond time scale creates a thermal lens for a liquid specimen or thermal expansion for a particle specimen. Such thermal effect is detected with a probe beam at a different wavelength from the pump or the Stokes beam. Compared to SRS microscopy which measures intensity gain the Stokes beam or intensity loss in the pump beam, SRP offers a few advantages. First, SRP shows superior sensitivity over SRS, enabling a wide range of applications such as the chemical imaging of low concentration metabolites. Second, SRP is immune to the laser noise of ultrafast lasers through indirect measurement of the probe beam, bringing the flexibility to perform coherent Raman measurement with noisy ultrafast lasers. Third, unlike in SRS, SRP signal can be collected with low numerical aperture air condenser centimeters away from the sample, allowing direct SRP imaging of large format samples such as a cytometer or a 96-well plate.

The SRP signal intensity can be modeled with a ball lens model. Under the paraxial approximation, this model gives the proportionality of SRP signal intensity (ISRP) induced by a single pair of pump and Stokes pulses as:

$$I_{SRP} \propto N_{mol}\sigma_{SRS}\phi_{pump}\phi_{Stokes}\tau_{exc} \cdot \hbar\omega_{SRS} \cdot \frac{1}{V_{SRS}}\frac{1}{C_p n_0}\frac{dn}{dT}$$

Here, SRS is modeled as a two-photon vibrational excitation process. The first term ($N_{mol}\sigma_{SRS}\phi_{pump}\phi_{stokes}\tau_{exc}$) describes the number of SRS events, i.e. the number of vibrational excitations, where $N_{mol}$ is the number of molecules in the excitation volume, $\sigma_{SRS}$ is the SRS cross section (in $cm^4 \cdot s \cdot photon^{-1}$), $\phi_{pump}$ and $\phi_{stokes}$ are the photon flux of the pump and Stokes lasers, respectively (in $photon \cdot cm^{-2} \cdot s^{-1}$), and $\tau_{exc}$ is the laser pulse width (in s). The second term ($\hbar \omega_{SRS}$) is the energy of vibrational transition. The last term describes properties of the measurement environment, where $V_{SRS}$ is the SRS excitation volume, $C_p$ is the heat capacity, $n_0$ is the refractive index, and dn/dT is the thermo-optic coefficient. The product of the first and the second term gives the amount of energy deposition. The last term gives the rate of heat to refractive index conversion. This term is inversely proportional to the excitation volume and the heat capacity, and is linear to the thermo-optic coefficient. The environment properties term holds potential to improve the signal intensity, which is not applicable to SRS measurement.

Based on this model, if one reduces the repetition rate by n times and increases the pulse energy by n times in the meantime to keep the total laser energy the same, the SRP power should increase by n times. In current SRP microscopy, an Insight laser with 80 MHz repetition rate provides the pump and Stokes beams. If an OPA with 1 MHz repetition rate is used, one would expect an increase of SRP power by 80 times. Importantly, since SRP signal is measured by a third probe beam, the intensity fluctuation has a minimal impact on the noise in an SRP image.

Moreover, as the SRP signal at each pixel can be generated by a single pair of pump and Stokes beams provided by OPA, high imaging speed can be achieved.

In certain embodiments, a non-collinear optical parametric amplifier (NOPA)-SRP microscope 1501 is contemplated with NOPA as the laser source (FIG. 15).

A 1 MHz regenerative amplifier laser 1503 (Spirit30, spectraphysics) is used both to pump the NOPA system 1505 and to serve as the Stokes beam 1507 of SRS. A motorized delay stage 1509 is placed on Stokes beam 1507 to control the temporal delay between two laser pulses (1507, 1511). The output 1511 of NOPA 1505 (either signal or idler) is spectrally combined with the Stokes beam 1507, then both beams are temporally dispersed for spectral focusing purpose. A probe laser's 1513 (Cobolt 05-01) output 1515 is spectrally combined with the NOPA pump beam 1511 and the Stokes beam 1507 before the combined laser 1517 is sent to the microscope. The lasers 1517 are then focused to the sample, then collected with a condenser lens 1519. The collected light is spectrally filtered, then the probe laser is measured with a photodiode 1521, then amplified and digitized.

The performance of NOPA-SRP has been characterized (FIGS. 16A-16D). The limit of detection (LoD) of DMSO was measured, focusing on the 2913 $cm^{-1}$ mode. As shown in FIG. 16A, the spectral feature at 2913 $cm^{-1}$ can still be well captured at concentrations as low as 15.6 mM, and the LoD reaches 4.8 mM as determined using LoD=3$\sigma$/k ($\sigma$, standard deviation of baseline; k, slope of the intensity-concentration linear calibration curve).

NOPA-SRP imaging was performed using on PMMA nanoparticles of different sizes (500 nm and 200 nm). As shown in FIG. 16B, both 500 nm and 200 nm PMMA nanoparticles shows good SNR under NOPA-SRP (for 500 nm: SNR~120; for 200 nm: SNR~17). The SRP spectra of a single PMMA nanoparticle can be measured with high fidelity (FIG. 16C). The profile of the dotted line in FIG. 16B shows the FWHM of the signal from a 200 nm PMMA nanoparticle is ~280 nm and is depicted in FIG. 16D. After deconvolution with the particle size, a lateral resolution of ~200 nm is obtained with NOPA-SRP.

NOPA-SRP can also be applied to image biological samples (FIGS. 17A-17I). To explore the feasibility of NOPA-SRP in Raman silent window (2000-2300 $cm^{-1}$), the cellular uptake of deuterated palmitic acid (PA-d31) was studied. The NOPA-SRP image of PA-d31 cultured SJSA-1 cell (FIG. 17A) shows clear features of C-D accumulation in lipid droplets, while such features are absent in an uncultured group (FIG. 17B). NOPA-SRP spectra of lipid droplets in cultured or control SJSA-1 cells (FIG. 17C) shows very distinct characters, with good SBR (~5). The background is majorly arisen from the overtone absorption induced photothermal signal of a single excitation laser beam.

To further test NOPA-SRP on microbiome, it was performed on *C. albicans* cultured with $D_2O$. Under NOPA-SRP, the $D_2O$ cultured *C. albicans* (FIG. 17D) shows strong signal on the center lipid droplet, as well as relatively weak signal in the cytoplasm. While the uncultured *C. albicans* (FIG. 17E) shows overall weak background signal and much less pronounced lipid droplet signal than in cultured group. The spectrum of the center lipid droplet of the $D_2O$ cultured *C. albicans* (FIG. 17F) is relatively broad and featureless, but still quite distinct from the flat spectrum of uncultured ones.

Coherent Raman imaging at fingerprint region is a long-lasting challenge of the field due to the low Raman cross-section at fingerprint region (1100-1700 $cm^{-1}$). The imaging performance of NOPA-SRP was tested at fingerprint region by imaging the mouse brain at the amide I (also covering C=C) region at ~1650 $cm^{-1}$) as shown in FIGS. 17G-17H.

In FIG. 17G, the myelin sheath and neighboring cells are visualized, with strong spectral feature of unsaturated fatty acid (sharp peak at ~1650 $cm^{-1}$) can be resolved on myelin sheath. In FIG. 17H, densely packed cytoplasmic organelles were observed, with their spectra resembles the profile of protein (broad peak at ~1650 $cm^{-1}$). FIG. 17I shows NOPA-SRP spectra of different field of views of FIG. 17G (myelin) and FIG. 17H (cytoplasm), indicated by circles in those images. Collectively, the data show the potential of NOPA-SRP in chemical imaging of a broad spectrum of biological samples with high sensitivity.

Overall OPA lasers are a good match with SRP measurement, comparing with conventional OPO lasers. Their parameters are compared in Table 1, below:

TABLE 1

| Comparison between OPO and OPA parameters | | |
|---|---|---|
| | OPO | OPA |
| Original Peak power (kW) | 63 | 4300 |
| Noise | Low | High |
| Rep rate | 80 MHz | 1 MHz |
| Bandwidth | ~200 $cm^{-1}$ | ~400 $cm^{-1}$ |

On the pathway to fully realize the sensitivity potential of SRP microscopy, one promising method is radially balanced detection. As indicated by previous thermal lensing models, the angular spectrum of the outcoming light shows a bi-polar signature, where the polarity of the light intensity modulation at the inner core and at the outer ring segments are opposite. Meanwhile, the two parts of light carry the same laser relative intensity noise. Therefore, subtraction between the two parts of light could increase the signal intensity, meanwhile cancelling the laser relative intensity noise.

OPA-based microscopy has many potential benefits as described herein. In various embodiments, the modeled saturation behavior of SRS under high excitation peak power can support extensively chirping the pump laser to ~30 ps. Radially segmented balanced detection is also contemplated, which together with the high peak power of the OPA laser source, can allow for superior detection sensitivity in comparison to a conventional SRS microscope or an OPO-based SRP microscope. SRP imaging of multiple biological samples in aqueous and glycerol environments is also possible as described in the Examples below.

OPA-based SRP is superior in detection sensitivity. Thanks to the high laser peak power of an OPA laser, it excites the SRS transitions much more efficiently, which leads to high SRP signals. And the inherent 1 MHz measurement frequency also helps avoid the low frequency noise of the probe laser. Together with the implementation of radially segmented balanced detection which further suppress the noise floor of the probe laser, a sensitivity improvement of ~2.5-fold may be achieved compared to previously reported OPO-based SRP microscope, and ~30-fold improvement compared to a conventional SRS microscope. Notably, the difference in spectral bandwidth between the pump and Stokes lasers in the experimental configuration described below is a major reason that hinders the further sensitivity improvement. In the experimental setup described, the bandwidth of the pump laser beam is ~300 $cm^{-1}$, while the Stokes bandwidth is only ~60 $cm^{-1}$. As a result, after chirping, the pulse duration of the Stokes pulses is only ~⅕ of the pump laser pulses, and the majority part of the pump laser pulse is not temporally overlapped with the Stokes pulses, and the energy of this part only contributes to background and photodamage, but not improving the signal. In various embodiments, further improvement can be achieved if the bandwidth of the Stokes laser pulses is spectrally broadened to match the bandwidth of the pump laser beam, by focusing the Stokes laser into a nonlinear crystal or a photonic crystal fiber for example. A longer Stokes pulse can decrease the peak power of Stokes light, therefore reduce the photodamage. And the SRS excitation efficiency can be maximized as suggested by the simulation.

OPA-based SRP have shown great potential in high-speed imaging. Current demonstration of high speed OPA-based SRP imaging has reached ~10 FPS and 3 second per hyperspectral stack, which is very helpful for tracking the metabolic activity of live cells and tissues. This performance is, however, not limited by the laser source or SRP measurement, but limited by the bandwidth limit of the scanner. By replacing the galvo mirrors, of which the bandwidth is limited at 1 kHz, with a high-speed scanner, ideally video-rate SRP imaging up to 20~30 FPS can be achieved. In high speed OPA-based SRP measurement, one of the significant issues is the loss of SNR due to the short integration time. However, with conserved total acquisition time, the total amount of information should be conserved, therefore the SNR of images could be recovered with denoising algorithms.

With a matched bandwidth between the pump and Stokes laser pulses, along with a high-performance scanner, a further ~5-fold sensitivity improvement and ~3-fold speed improvement to the current version of OPA-based SRP microscope described in the Examples. With ~200 µM detection sensitivity and ~30 FPS imaging frame rate, the described OPA-based SRP imaging techniques can find many biological applications, such as studying the detailed structures of membrane domains.

EXAMPLES

Example 1: SRP Imaging

To understand the physical process of SRP, a model was built to simulate the heat deposition spatially and temporally. The SRS induced temperature change is dependent on the pulse width, the pulse energy, laser repetition rate, and the thermal properties (thermal conductivity, heat capacity, etc.)

of the sample and the surrounding medium. First, the deposited energy by SRS can be estimated by the modulation depth on pump or Stokes beam along with the pulse energy and the shot noise. Then, the time domain and spatial domain are divided to finite elements for the calculation of heat conduction according to the Fourier's law: $dQ=-kA \, dT/dr$, where dQ is the conducted heat energy in the time window, k is the thermal conductivity, A is the surface area, dT is the temperature difference between distance dr.

To simulate the SRS on-off process, there is also the according heat-cooling process in SRP. The heat transfer is happening during both heating and cooling process. Besides, the heating process has the SRS pulses deposit heat to the sample instantaneously with a Gaussian distribution as the vibrational excited state relaxation time is much faster compared to the simulation time grid. Finally, with the heating and thermal conduction, one can simulate the temperature spatially at each time point.

Figure 5A:
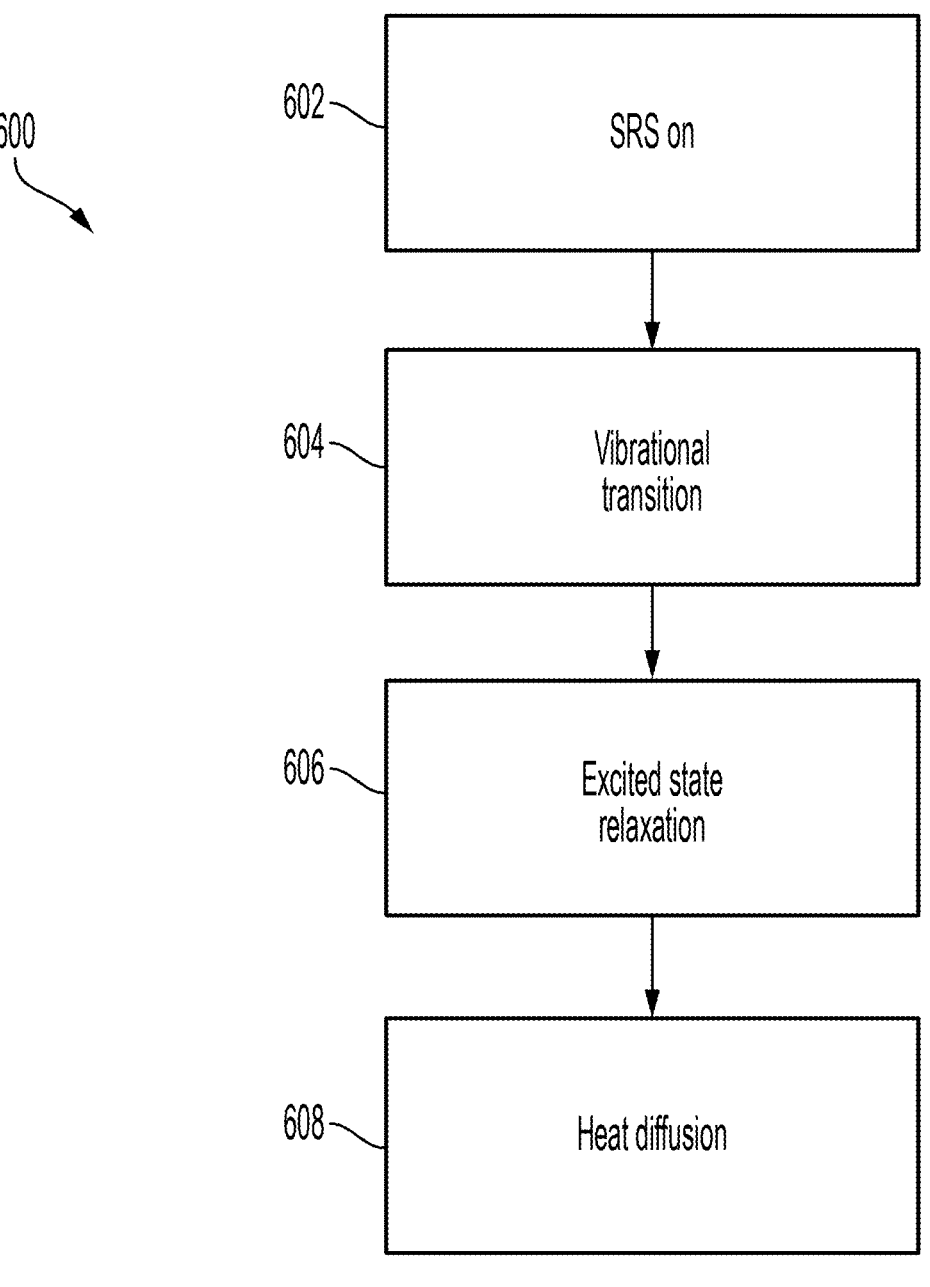
FIG. 5A is a flowchart of the thermal effect generation in an SRP microscope.
Figure 5B:
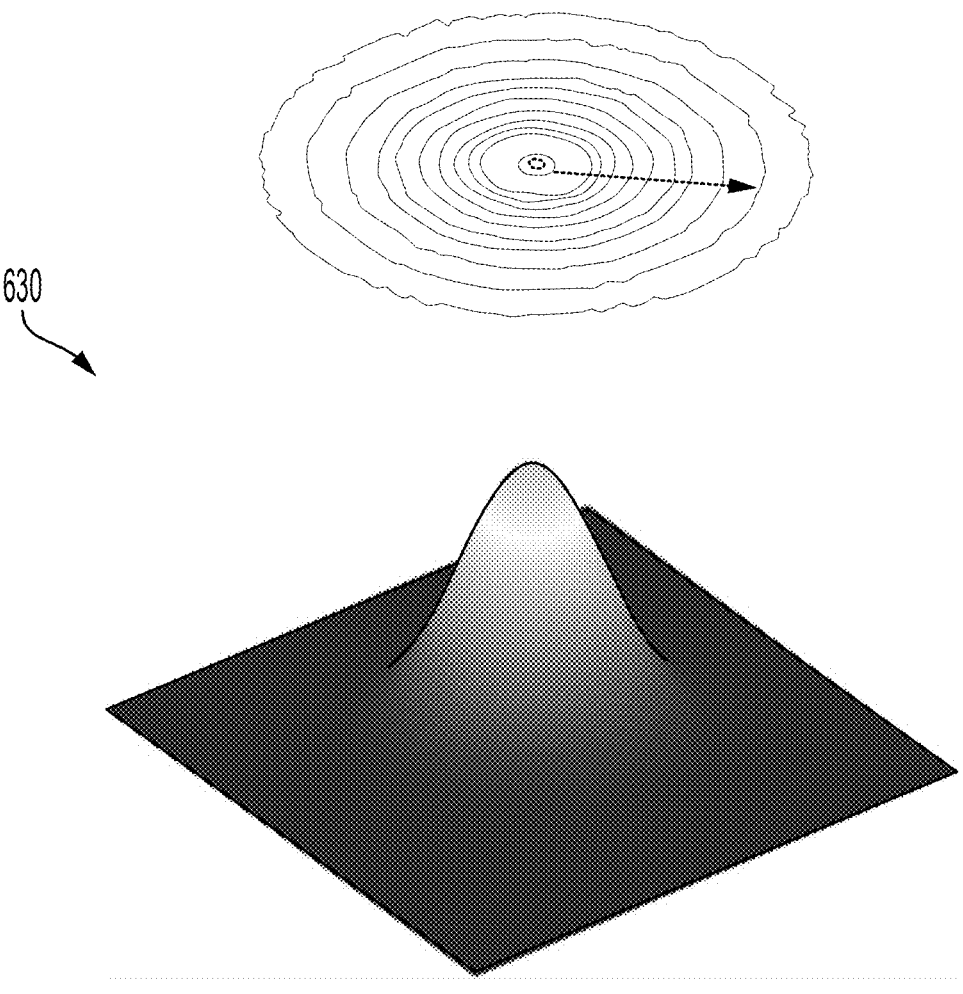
FIG. 5B is a schematic of a heat diffusion model for SRP induced thermal effect with a microscope as disclosed herein, with an arrow showing the thermal propagation direction.

For example, the commonly used liquid chemical, DMSO, is assumed to be a uniform medium. To simplify the model, an isotropic Gaussian SRS heating area is assumed. The simulation area is set to be a 48 layers model with increasing step size from center to the edge (FIGS. 5A and 5B). Time step is set to be 200 ps, which is much smaller than the heat propagation time to ensure a converge result. DMSO has a heat conductivity of 0.2 W/(m·K). The laser parameters are set to 50% duty cycle, 80 MHz repetition rate, according to the commonly used SRS setting. With 15 mW pump and 50 nm Stokes power on sample targeting 2913 cm$^{-1}$, DMSO could induce around 0.09% modulation depth, which is equivalent 18.8 fJ energy per pulse pair transferred to the sample. With the accumulating heat during the heating process, the final temperature rise could be as high as 12 K inside the focus region in DMSO (FIG. 9). This model could be used to estimate the temperature change induced by SRS and help the design of probing scheme to increase SRP imaging contrast.

To validate the temperature rise induced by SRS, we introduced a fluorescence thermometer, Rhodamine B to monitor the temperature change during SRS. Rhodamine B is a temperature sensitive dye, with a temperature induced fluorescence modulation of −2%/K 12. To test the temperature change induced by SRS at C-H vibration, a droplet of 80 M Rhodamine B dissolved in DMSO was prepared by sandwiching with two thin coverslips (No. 1; Thermo Fisher).

For the measurement setup, the SRS microscopy with an add-on silicon photon multiplier was used for measuring the two-photon fluorescence signal. A dual-output synchronized laser source (InSight X3; Spectra-Physics) provides pump and Stokes beam for SRS respectively. Stokes beam was then modulated by an acousto-optic modulator (1205c; Isomet Corporation) at 40 kHz with the first order beam to provide a 100% modulation depth. Then the pump and Stokes beams were chirped by 75 and 90 cm glass rods (SF57; Scott AG) respectively to implement hyperspectral SRS under spectral focusing scheme. The path length of the Stokes beams could be adjusted by a motorized delay line (X-LRM025A-KX13A, Zaber Technologies). The two beams were combined by a dichroic mirror (950 nm; Chroma) and then collinearly guided into a laboratory-built laser scanning microscope. To vibrationally excite the C-H bond in DMSO, the pump laser was set to 800 nm with the fixed Stokes beam at 1045 nm. These two beams could also simultaneously excite the two-photon fluorescence signal of Rhodamine B. The fluorescence intensity excited under on C-H resonance of the DMSO 2912 cm$^{-1}$ peak and off resonance were at similar level, as the timely overlap between the pump and Stokes were the close under these two conditions. A 40× water objective (numerical aperture (N.A.)=0.8; Olympus) focused two beams onto the sample, with a power of 25 mW for pump and 50 mW for Stokes. The output light was collected in the forward direction by an oil condenser (N.A.=1.4, Aplanat Achromat 1.4; Olympus) and a 75 mm focal A coating focal lens (Thorlabs). A silicon photomultiplier (C14455-3050GA; Hamamatsu) module with a bandpass optical filter (RT570/20×; Chroma) and two shorpass filters (1000SP, 775SP; Thorlabs) was used to detect the fluorescence signal from Rhodamine B. The output of silicon photomultiplier was recorded by a spectrometer (Moku: Lab; Liquid Instruments) for the analysis in FIG. 1C.

Based on the SRS setup described in the Temperature measurement by fluorescence thermometer section, both pump and Stokes beams were both modulated by two synchronized acousto-optic modulators with the first order beams and various duty cycle at 125 kHz. Besides, a 765 nm continuous probe laser (TLB6712-D; Spectral Physics) was added after the combining dichroic mirror by a polarized beam splitter to form a three beam copropagating colinear system (FIG. 2b). The three beams were guided to a two-dimensional galvo scanning unit (GVS002; Thorlabs), which was conjugated by a four-focal system to the back aperture of a 100□ oil objective (N.A.=1.49, UAPON100XOTIRF; Olympus) to enable a galvo scanning microscopy. The N.A. of the condenser was adjusted to 0.3 to enable the thermal lensing signal detection. The detector was changed to a broadband silicon photodiode (Hamamatsu) with 50-ohm resistance, a 22 kHz high pass radio freuqenct filer (Mini-circuits) and a 46 dB low noise amplifier (SA230-F5; Wayne). A tilted bandpass optical filter (FL780-10; Thorlabs) was mounted before on the detector to block out the SRS beams and enable solely detection of the probe beam. The output signal was digitized by a fast data acquisition card (Alazar card, ATS9462; Alazar Technologies) for the following data processing in the next section.

For a comparison with SRS, the probe laser was turned off and the N.A. of the condenser was tuned to 1.4. The modulation on pump was set to always on and the Stokes was modulated at around 2.25 MHz. The detector for SRS is a laboratory-built resonant amplifier used in our previous publication to provide a state-of-the-art performance. The filter before was two shortpass optical filter (900SP, Thorlabs) to detect the stimulated Raman loss signal. The output was sent to the lock-in amplifier (MFLI; Zurich) and the final intensity was recorded by the data acquisition card (NI DAQ card, PCI-6259; National Instruments).

Figure 7:
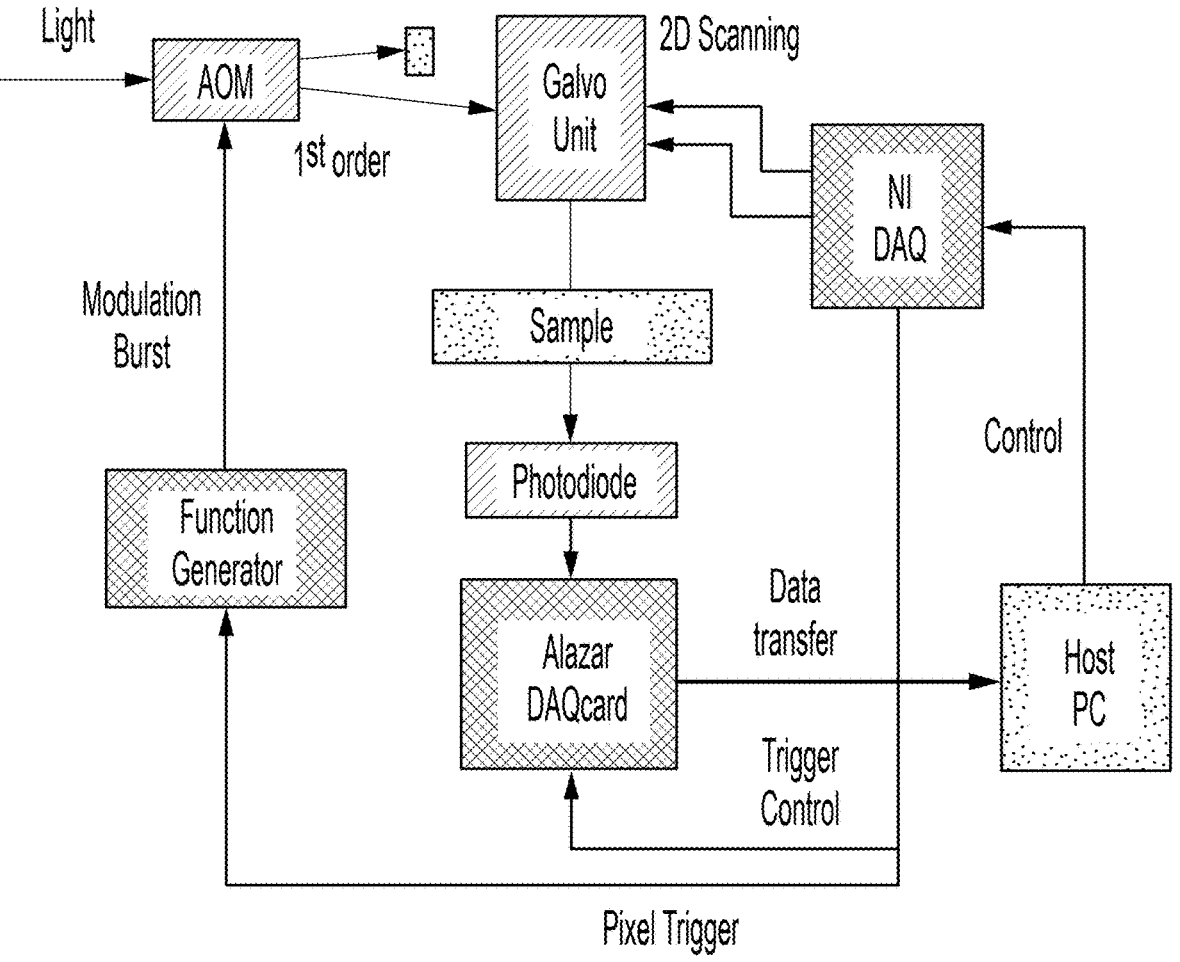
FIG. 7 shows electronic control and data acquisition flow in an exemplary SRP microscope.

The SRP system was mainly controlled and synchronized by NI DAQ card. The NI DAQ card will control the galvo scanning unit, generate the transistor-transistor logic trigger to control the sampling of the Alazar card and the pixel trigger to control the modulation of the pulse train by the function generator. The function generator generates rectangular waves with various duty cycle at 125 kHz in burst mode to control the two acousto-optic modulators to modulate the pump and Stokes pulse trains (FIG. 7). The amplified signal from the detector set was digitized by the Alazar card at a sampling frequency of 20 MHz and then sent to the host computer for further analyze.

After the signal from each pixel was recorded, Whittaker smoother was applied to remove the fluctuated baseline caused by variation in the transmission. We then applied Fourier transform on the baseline removed signal to acquire the signal spectrum. To reduce the out-of-frequency noise, we applied a match multi-bandpass filter at the up to seven harmonic frequencies of the modulation frequency over the signal spectrum. The width of single bandpass filter was set to 13.89 kHz when the pixel dwell time was 72 μs. This match filtered spectrum was then inverse Fourier transformed back to the time domain. Finally, the SPR signal intensity of each pixel was calculated from the average peak-dip contrast of the processed time domain data.

Cell culture and sample preparation: SKOV3 (Cat #: HTB-77) and Mia Paca2 (Cat #: CRL-1420) cells were purchased from the American Type Culture Collection (ATCC). Cells were cultured in high-glucose DMEM medium (Gibco) supplemented with 10% FBS and 100 units/mL penicillin/streptomycin and maintained in a humidified incubator with 5% $CO_2$ supply at 37° C. After overnight seeding in a sterile 35 mm glass-bottom dishes (Cellvis) or #1 cover glass (VWR), cells were fixed with 10% neutral buffered formalin for 30 min followed by 3 times PBS wash. Then the cells were covered with glycerol-d8 before scaling and imaging.

Tissue sample preparation: A fresh ovarian tumor section was extracted from NU/J mouse (4 weeks old female homozygous for Foxnlnu) purchased from the Jackson Laboratory inoculated with OVCAR5-cisR cells. The sections were immediately fixed in a 10% formalin solution. The extracted tissue section was then washed using PBS solution and cryopreserved by placing it in 15% sucrose solution for 12 hours, followed by placing it in 30% sucrose solution overnight at room temperature. The tissue section was frozen at –80° C. by embedding in OCT (Optimal Cutting Temperature) compound in a tissue mold. The tissue section was then sliced using the Microm HM525 cryostat at the Bio-Interface and Technologies Facility, Boston University, into 10 μm thick layers, each placed on separate glass slides and frozen at –80° C. until the experiment. To prepare the samples for imaging, the tissue slides were washed using PBS solution to wash off the OCT. The tissue slides were then covered with glycerol-d8 before placing a coverslip to seal the glycerol-d8 covered tissue layer.

Glycerol-agar (glycerol-d8-agar) medium preparation: 1% (w/w) agar (Sigma Aldrich) is mixed with glycerol (or glycerol-d8, Sigma Aldrich), then microwaved for 2 min to fully dissolve the agar.

Beads sample preparation: 10 μL solution of 100 nm PMMA nanoparticles was mixed with warm glycerol-d8-agar medium, then sandwiched between two No. 1 coverslips before imaging.

Bacteria sample preparation: 10 μL solution of fixed $D_2O$ cultured bacteroid was mixed with warm glycerol-agar medium, then sandwiched between two No. 1 coverslips before imaging.

Virus sample preparation: Varicella zoster virus solution (Fisher Scientific) was dropped onto a No. 1 coverslip and dried on top. The sample was covered with glycerol-d8, then sandwiched between two coverslips and sealed with nail polish before imaging.

Example 2: NOPA-SRP Imaging

For OPA based SRP imaging, a Spectra Physics Spirit30 and NOPA lasers were used as the SRS excitation laser source. as illustrated in FIG. 18. Briefly, the synchronized pump and Stokes pulse trains from the are spatial-temporally aligned, and chirped by glass rods. A 520 nm continuous wave (Samba 05-01; Cobolt) probe beam is collinearly aligned with the SRS beams. A pair of lenses adjust the collimation of the probe beam to make the probe laser focus axially off the SRS focus. The three beams are guided to a two-dimensional galvo scanning unit (GVS002; Thorlabs), which is conjugated by a four-focal system to the back aperture of a 60× oil objective (NA=1.20, UPLSAPO60XW; Olympus). Light is collected with a high NA oil condenser (U-AAC Achromatic; Olympus). The outcoming laser is radially segmented into two parts, i.e. the core and the ring, with a 12.7 mm elliptical mirror. A bandpass optical filter (FBH520-40; Thorlabs) is mounted before the detector to block the SRS beams and allow sole detection of the probe beam. Two fast photodiodes (S3590-08; Hamamatsu) detect the probe beam intensities at different segments, respectively, followed by a 100-ohm resistance (VT2, Thorlabs), a 22 kHz radio frequency high pass filter (EF123; Thorlabs) and a broadband amplifier (SA230-F5; Wayne) on each arm.

The SRP modulation induced by synchronized pump and Stokes pulses is digitized in real time by a high-speed digitization card (ATZ9462, AlazarTech) at a sampling rate of 50 MSPS, and the difference between two arms yields the signal trace of each pixel. Afterward, a matched filter with pure sample signal as the matched template is applied to the signal trace to extract the contrast.

FIG. 18 depicts an exemplary setup for an OPA-based SRP microscope design and characterization of SRP modulation depth as a function of duty cycle and modulation frequency where DM: dichroic mirror; DL: delay line; AOM: acousto-optic modulator; PBS: polarizing beam splitter; HWP: halfwave plate; SM: scanning mirror; OBJ: objective; COND: condenser; SP: spectral filter; PD: photodiode; HP: highpass filter; AMP: amplifier.

For video-rate SRP imaging, the galvo mirror was set to laterally scan the laser beam in a resonant trajectory. The middle section (~20%) of the scanning trace was cropped as the imaging FOV to avoid image distortion caused by uneven scanning speed with resonant scan. 500 kHz radio frequency high-pass filters (EF507, Thorlabs. Inc.) were inserted to the detection arms to avoid the signal leakage from laser intensity change caused by laser scanning. With the confinement factor being the scanning speed of the scanner, current version of video-rate SRP imaging reaches the speed of ~10 FPS, and 3 second per 30 frame hyperspectral stack.

Cell Culture: SJSA-1 cells (Cat #: CRL-2098) were from the American Type Culture Collection (ATCC). Cells were cultured in RPMI-1640 culture medium (Gibco), supplemented with 10% (v/v) fetal bovine serum (FBS) and 1% (v/v) penicillin/streptomycin (P/S). All cells were cultured under controlled conditions in a humidified incubator set at 37° C. with a 5% $CO_2$ supply. For the C-D labeled group, the cells were initially cultured until attaching to the glass bottom dishes, then incubated in RPMI-1640 medium containing de-lipid serum for 3 hours. Subsequently, the cells were incubated with 200 μM PA-d31 in the medium for 18 hours. Afterwards, cells were fixed with 10% neutral buffered formalin for 30 min followed by 3 times PBS washes before microscopic imaging.

HeLa cells (Cat #: CRL-2) were obtained from the American Type Culture Collection (ATCC). Cells were cultured in RPMI-1640 culture medium (Gibco), supplemented with 10% (v/v) fetal bovine serum (FBS) and 1% (v/v) penicillin/streptomycin (P/S). All cells were cultured under controlled conditions in a humidified incubator set at 37° C. with a 5% $CO_2$ supply. Afterwards, cells were fixed with 10% neutral buffered formalin for 30 min followed by 3 times PBS washes before microscopic imaging.

Tissue Sample Preparation: Mouse brain tissue sample: The mouse was euthanized and perfused transcardially with phosphate-buffered saline (PBS, 1×, PH 7.4, Thermo Fisher Scientific Inc.) solution and 10% formalin, allowing the fixative to circulate throughout the vasculature. After fixation, the brain was extracted and fixed in 10% formalin solution for 24 h to ensure complete fixation. Then, the mouse brain was submerged in a 1× PBS solution and then sliced horizontally into sections with a thickness of 100 μm using an Oscillating Tissue Slicer (OST-4500, Electron Microscopy Sciences).

Results: System characterization of OPA-based SRP microscope: The limit of detection (LOD) measurement was carried out for DMSO, focusing on the 2913 cm$^{-1}$ mode. To keep the thermal and optical properties constant throughout the measurement, deuterated DMSO (DMSO-d6) was used as the solvent to dilute DMSO. As shown in FIGS. 19A and 19B, the SRP spectrum was clean and smooth with a high concentration DMSO sample, and the signal was observable at a concentration as low as 1.7 mM. The LOD was calculated as 890 μM using LOD=3σ/k, where σ is the standard deviation of the baseline and k is the slope of the intensity-concentration linear calibration curve. In comparison, the LOD by an OPO-based SRP was found to be 2.3 mM. Thus, an OPA-based SRP measurement offers a ~2.5-fold improvement. The LODs for C-D bond was measured in DMSO media using DMSO-d6 (FIGS. 20A and 20B). Likewise, OPA-based SRP showed superior sensitivity to OPO-based SRP, with ~1.7-fold LOD increase from 8.4 mM to 5.2 mM.

SRP Imaging in an aqueous environment: To explore the applicability of OPA-based SRP imaging in the silent window, the cellular uptake of deuterated palmitic acid (PA-d31) was studied. FIGS. 17A-17C show the hyperspectral SRP images of SJSA-1 cells incubated with PA-d31. Directly from the SRP signal intensity at the Raman resonance of PA-d31 (2100 cm$^{-1}$), the distribution of PA-d31 formed clusters inside the cell, and the PA-d31 rich regions resembled the morphology of the lipid droplets and ER. The spectral profile (FIG. 17C) shows a peak at 2100 cm$^{-1}$, where the C-D stretch vibration resides. In the control sample without PA-d31 treatment, signal showed very weak contrast (FIG. 17B), and the corresponding SBR is ~5. This SBR value was much higher than previous result obtained with OPO-SRP (~1.3), which was largely attributed to the elevated peak power and consequently higher ratio between nonlinear and linear photothermal processes.

To demonstrate the feasibility of OPA-based SRP imaging for microbiology applications, *C. Albicans* metabolism activity was examined by measuring the bio-incorporation of heavy water. FIGS. 17D-17F show the hyperspectral SRP images of *C. Albicans* incubated with or without heavy water. In comparison, the treated group showed much stronger signal than the untreated group, especially at its core lipid droplet. The SRP spectrum of the treated group showed a broad peak at C-D stretching window, majorly from the metabolic product of D$_2$O incorporation. The SRP spectrum of control group was flat and featureless, suggesting the non-Raman origin of the signal. Notably, the intensity of the signal in control group decreased as the hyperspectral scanning continues, suggesting a pigment electronic absorption photothermal background. In principle this background could be reduced or eliminated by photobleaching before SRP imaging. During bleaching process, the bond-selective SRP signal is not affected.

The modulation-free measurement scheme also enabled high speed SRP imaging. As shown in FIGS. 21A-21C, the lipid droplets inside a live Hela cell were imaged. The SRP images were acquired at a speed of 10 FPS, or 3s per 30-frame hyperspectral stack. The circle highlighted a lipid droplet that was constantly moving during the 36 second data acquisition. With high-speed SRP imaging capability, the spectrum of this lipid droplet could be acquired with little motion artifacts, while it was not possible with OPO-based SRP which worked at ~3.5 second per frame.

The addition of glycerol could further enhance the detection sensitivity of SRP measurement, this principle also applies to OPA-based SRP. On top of that, the membrane structures, rich in lipid with a high thermo-optic coefficient, are also capable of enhancing the SRP signal and improve the contrast. As shown in FIGS. 22A and 22B, the fixed Hela cell was immersed in glycerol-d8 and the hyperspectral SRP images were acquired at the C-H stretching region. Besides the clearly resolved cellular structures such as ER, nuclear, it's also interesting to note that small granules are observed on the membrane of the cell. The spectrum of the granules showed lipid rich feature as suggested by the strong 2850 cm$^{-1}$ peak, and in addition the strong 2872 cm$^{-1}$ peak suggested the rich presence of cholesterol in the granules. Such granular structures might be assigned to endosome formed during caveolin-mediated endocytosis. The high contrast and abundant spectral features suggest great potential of OPA-based SRP in studying the fine membrane structures.

All references cited herein are incorporated by reference, as though fully set forth herein. All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A stimulated Raman photothermal (SRP) microscope for imaging a sample, comprising:
   a first optical source emitting a pump beam and lacking an optical resonator;
   a second optical source emitting a Stokes beam, wherein the Stokes beam is combined with the pump beam to form a combined beam, the combined beam being directed to the sample to induce a thermal effect caused by the stimulated Raman process;
   a third optical source emitting a probe beam, wherein the probe beam is directed to the sample;
   one or more optical detectors configured to detect modulation of the probe beam after modulation by the sample to measure an SRP signal; and
   a spectral filter operable to block the combined beam after modulation by the sample,
   wherein the optical detector detects the probe beam after modulation by the sample and filtering by the spectral filter.

2. The microscope of claim 1, wherein the first optical source comprises an optical parametric amplifier (OPA).

3. The microscope of claim 2, wherein the first optical source comprises a noncollinear OPA (NOPA).

4. The microscope of claim 1, wherein the pump beam has a repetition rate of 40 MHz or less.

5. The microscope of claim 4, wherein the pump beam has a repetition rate of 1 MHz or less.

6. The microscope of claim 1, wherein the first optical source has a peak power of 100 kW or more.

7. The microscope of claim 6, wherein the first optical source has a peak power of 1000 kW or more.

8. The microscope of claim 1, further comprising a motorized delay stage operable to control temporal delay of the Stokes beam.

9. The microscope of claim 1, further comprising at least one scanning mirror configured to scan the sample with the combined beam and the probe beam.

10. A stimulated Raman photothermal (SRP) microscope for imaging a sample, comprising:

a first optical source emitting a pump beam and lacking an optical resonator;

a second optical source emitting a Stokes beam, wherein the Stokes beam is combined with the pump beam to form a combined beam, the combined beam being directed to the sample to induce a thermal effect caused by the stimulated Raman process;

a third optical source emitting a probe beam, wherein the probe beam is directed to the sample;

one or more optical detectors configured to detect modulation of the probe beam after modulation by the sample to measure an SRP signal; and at least one lens positioned within an optical path of the combined beam and probe beam, wherein the probe beam is directed to the sample colinear with the combined beam and the at least one lens adjusts the collimation of the probe beam to make the probe beam focus axially off a focus of the combined beam.

11. A stimulated Raman photothermal (SRP) microscope for imaging a sample, comprising:

a first optical source emitting a pump beam and lacking an optical resonator;

a second optical source emitting a Stokes beam, wherein the Stokes beam is combined with the pump beam to form a combined beam, the combined beam being directed to the sample to induce a thermal effect caused by the stimulated Raman process;

a third optical source emitting a probe beam, wherein the probe beam is directed to the sample;

one or more optical detectors configured to detect modulation of the probe beam after modulation by the sample to measure an SRP signal, wherein the measured SRP signal is based on the local refractive index modulation of the sample, determined from the detected probe beam.

* * * * *